United States Patent
Moon et al.

(10) Patent No.: US 11,064,381 B2
(45) Date of Patent: *Jul. 13, 2021

(54) METHOD AND APPARATUS FOR GENERATING CELL MEASUREMENT INFORMATION IN A WIRELESS COMMUNICATION SYSTEM

(71) Applicant: Samsung Electronics Co., Ltd., Suwon-si (KR)

(72) Inventors: Jungmin Moon, Suwon-si (KR); Seunghoon Park, Seoul (KR); Byounghoon Jung, Seoul (KR); Jungsoo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/685,682

(22) Filed: Nov. 15, 2019

(65) Prior Publication Data

US 2020/0084653 A1 Mar. 12, 2020

Related U.S. Application Data

(63) Continuation of application No. 15/407,954, filed on Jan. 17, 2017, now Pat. No. 10,524,150.

(30) Foreign Application Priority Data

Sep. 29, 2016 (KR) .................. 10-2016-0125924
Jan. 16, 2017 (KR) .................. 10-2017-0007324

(51) Int. Cl.
*H04W 72/00* (2009.01)
*H04W 24/10* (2009.01)
(Continued)

(52) U.S. Cl.
CPC ............ *H04W 24/10* (2013.01); *H04B 7/065* (2013.01); *H04B 7/0695* (2013.01); *H04B 7/088* (2013.01);
(Continued)

(58) Field of Classification Search
None
See application file for complete search history.

(56) References Cited

U.S. PATENT DOCUMENTS 10,425,139 B2 9/2019 Guo et al.
10,512,008 B2 12/2019 Deenoo et al.
(Continued)

FOREIGN PATENT DOCUMENTS

CN 105103598 A 11/2015
EP 2 077 677 A1 7/2009
(Continued)

OTHER PUBLICATIONS

Extended European Search Report dated Jan. 7, 2019, issued in the European Application No. 17738708.1.
(Continued)

*Primary Examiner* — Sithu Ko
(74) *Attorney, Agent, or Firm* — Jefferson IP Law, LLP

(57) ABSTRACT

The present disclosure relates to a fifth generation (5G) or pre-5G communication system to be provided to support a higher data transmission rate since fourth generation (4G) communication systems like long term evolution (LTE). A method for generating cell measurement information is provided. The method includes receiving measurement configuration information associated with a beam reference signal that is a beamformed reference signal, receiving beam reference signals per a plurality of beam pairs consisting of a base station's (5G-NB's) beam and a user equipment's (UE's) beam, generating beam measurement information
(Continued)

based on the beam reference signals received per the plurality of beam pairs, and generating cell measurement information on a cell based on the beam measurement information.

20 Claims, 51 Drawing Sheets

Related U.S. Application Data

(60) Provisional application No. 62/278,629, filed on Jan. 14, 2016, provisional application No. 62/321,266, filed on Apr. 12, 2016, provisional application No. 62/325,059, filed on Apr. 20, 2016, provisional application No. 62/329,562, filed on Apr. 29, 2016, provisional application No. 62/350,404, filed on Jun. 15, 2016.

(51) Int. Cl.
  *H04W 16/28* (2009.01)
  *H04L 5/00* (2006.01)
  *H04W 48/16* (2009.01)
  *H04B 7/06* (2006.01)
  *H04B 7/08* (2006.01)

(52) U.S. Cl.
  CPC .......... *H04L 5/0048* (2013.01); *H04W 16/28* (2013.01); *H04W 48/16* (2013.01)

(56) References Cited

U.S. PATENT DOCUMENTS

| | | |
|---|---|---|
| 2009/0316811 A1 | 12/2009 | Maeda et al. |
| 2011/0211490 A1 | 9/2011 | Nikula et al. |
| 2012/0039197 A1 | 2/2012 | Jang et al. |
| 2012/0108281 A1 | 5/2012 | Niu et al. |
| 2012/0115463 A1 | 5/2012 | Weng et al. |
| 2012/0208541 A1 | 8/2012 | Luo et al. |
| 2013/0059619 A1 | 3/2013 | Kim et al. |
| 2013/0231058 A1 | 9/2013 | Ramachandran et al. |
| 2013/0301454 A1 | 11/2013 | Seol et al. |
| 2014/0044044 A1 | 2/2014 | Josiam et al. |
| 2014/0105042 A1 | 4/2014 | Cui et al. |
| 2014/0146863 A1 | 5/2014 | Seol et al. |
| 2014/0161103 A1 | 6/2014 | Sirotkin et al. |
| 2014/0198681 A1 | 7/2014 | Jung et al. |
| 2014/0241274 A1 | 8/2014 | Lee et al. |
| 2014/0268133 A1* | 9/2014 | McManus ............... G01J 3/443 356/316 |
| 2014/0341310 A1 | 11/2014 | Rahman et al. |
| 2015/0146618 A1 | 5/2015 | Ko et al. |
| 2015/0236774 A1 | 8/2015 | Son et al. |
| 2015/0358064 A1* | 12/2015 | Benjebbour ........... H04B 7/065 370/329 |
| 2016/0006122 A1 | 1/2016 | Seol et al. |
| 2016/0029350 A1 | 1/2016 | Kishiyama et al. |
| 2016/0044518 A1 | 2/2016 | Centonza et al. |
| 2016/0049997 A1* | 2/2016 | Onodera ............... H04W 76/10 370/329 |
| 2016/0095102 A1* | 3/2016 | Yu ........................ H04B 7/0617 455/452.2 |
| 2016/0142189 A1 | 5/2016 | Shin et al. |
| 2016/0149679 A1* | 5/2016 | Frenne ................... H04L 5/005 370/329 |
| 2016/0157267 A1 | 6/2016 | Frenne et al. |
| 2016/0277954 A1* | 9/2016 | Frenne ................ H04W 72/082 |
| 2016/0373915 A1 | 12/2016 | Kim et al. |
| 2016/0381610 A1 | 12/2016 | Pu et al. |
| 2017/0034730 A1* | 2/2017 | Zhang ................... H04W 36/30 |
| 2018/0123669 A1* | 5/2018 | Xi ........................ H04W 72/121 |
| 2018/0199328 A1 | 7/2018 | Sang et al. |
| 2019/0319686 A1 | 10/2019 | Chen, IV et al. |

FOREIGN PATENT DOCUMENTS

| | | |
|---|---|---|
| EP | 2 882 110 A1 | 6/2015 |
| EP | 2 790 440 B1 | 4/2016 |
| KR | 10-2012-0016583 A | 2/2012 |
| KR | 10-2015-0098324 A | 8/2015 |
| WO | 2010/052519 A1 | 5/2010 |
| WO | 2015-080645 A1 | 6/2015 |
| WO | 2015-109153 A1 | 7/2015 |
| WO | 2015-190648 A1 | 12/2015 |
| WO | 2017/123079 A1 | 7/2017 |
| WO | 2018-017840 A1 | 1/2018 |
| WO | 2018-034698 A1 | 2/2018 |
| WO | 2018-056728 A1 | 3/2018 |
| WO | 2018-126876 A1 | 7/2018 |

OTHER PUBLICATIONS

Extended European Search Report dated Aug. 19, 2019, issued in the European Application No. 17738707.3.
European Office Action dated Jul. 7, 2020, issued in a counterpart European Application No. 17 738 707.3-1220.
U.S. Office Action dated Mar. 11, 2021, issued by the U.S. Patent and Trademark Office; U.S. Appl. No. 16/390,751.
Indian Office Action dated May 11, 2021, issued in a counterpart Indian Application No. 201817026157.

* cited by examiner

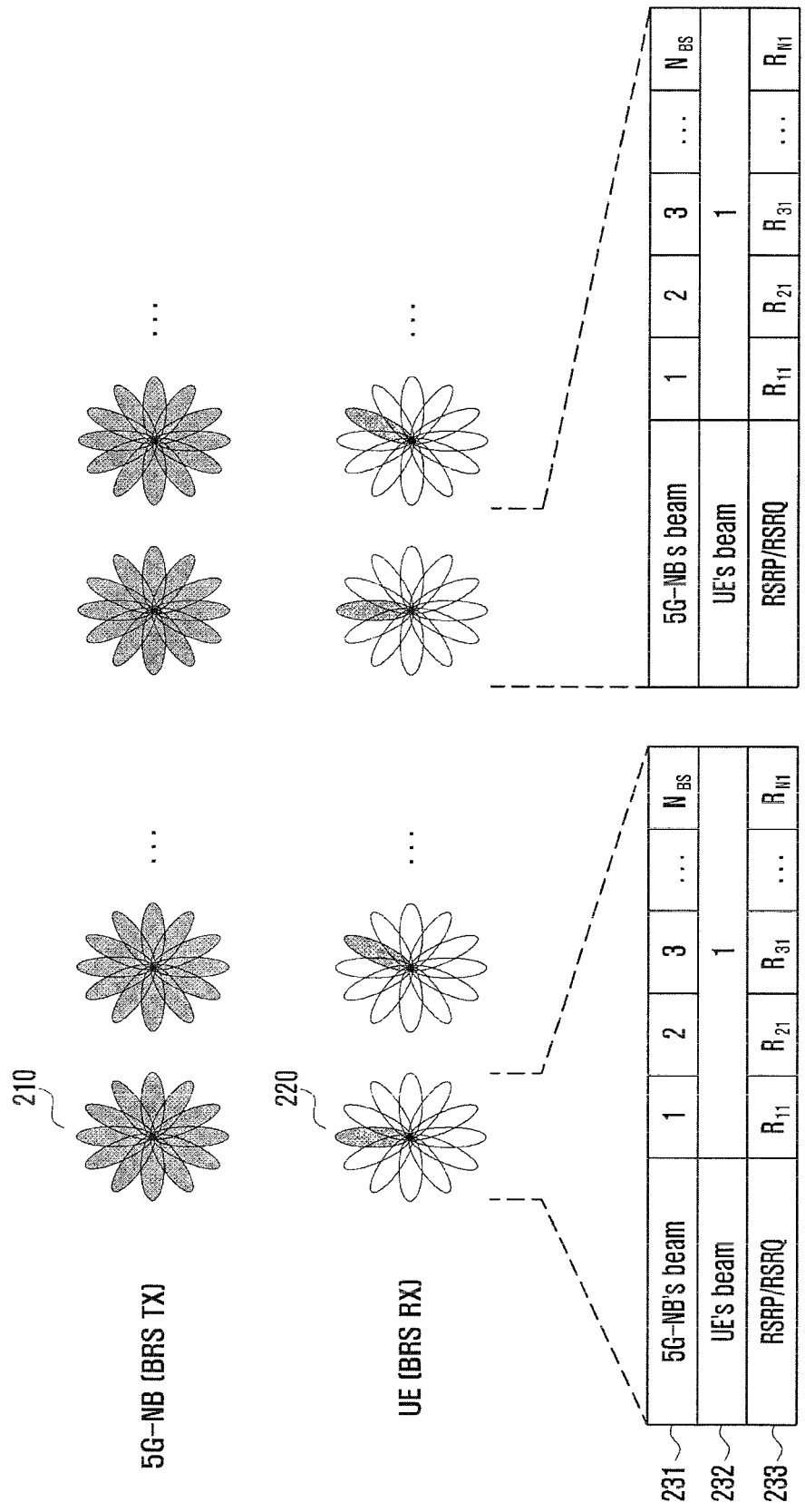

FIG. 2B

| Full sweep interval 1 | Tx beam | 1 | 2 | 3 | ... | $N_{TX}$ | 1 | 2 | 3 | ... | $N_{TX}$ | ... | 1 | 2 | 3 | ... | $N_{TX}$ |
|---|---|---|---|---|---|---|---|---|---|---|---|---|---|---|---|---|---|
| | Rx beam | | | 1 | | | | | 2 | | | | | | $N_{RX}$ | | |
| | RSRP | | | | | | | | | | | | | | | | |

| Full sweep interval 2 | Tx beam | 1 | 2 | 3 | ... | $N_{TX}$ | 1 | 2 | 3 | ... | $N_{TX}$ | ... | 1 | 2 | 3 | ... | $N_{TX}$ |
|---|---|---|---|---|---|---|---|---|---|---|---|---|---|---|---|---|---|
| | Rx beam | | | 1 | | | | | 2 | | | | | | $N_{RX}$ | | |
| | RSRP | | | | | | | | | | | | | | | | |

| Full sweep interval K | Tx beam | 1 | 2 | 3 | ... | $N_{TX}$ | 1 | 2 | 3 | ... | $N_{TX}$ | ... | 1 | 2 | 3 | ... | $N_{TX}$ |
|---|---|---|---|---|---|---|---|---|---|---|---|---|---|---|---|---|---|
| | Rx beam | | | 1 | | | | | 2 | | | | | | $N_{RX}$ | | |
| | RSRP | | | | | | | | | | | | | | | | |

FIG. 2C

| Full sweep interval 1 | Tx beam | 1 | | | | | 2 | | | | | ... | $N_{TX}$ | | | | |
|---|---|---|---|---|---|---|---|---|---|---|---|---|---|---|---|---|---|
| | Rx beam | 1 | 2 | 3 | ... | $N_{RX}$ | 1 | 2 | 3 | ... | $N_{RX}$ | ... | 1 | 2 | 3 | ... | $N_{RX}$ |
| | RSRP | | | | | | | | | | | | | | | | |

| Full sweep interval 2 | Tx beam | 1 | | | | | 2 | | | | | ... | $N_{TX}$ | | | | |
|---|---|---|---|---|---|---|---|---|---|---|---|---|---|---|---|---|---|
| | Rx beam | 1 | 2 | 3 | ... | $N_{RX}$ | 1 | 2 | 3 | ... | $N_{RX}$ | ... | 1 | 2 | 3 | ... | $N_{RX}$ |
| | RSRP | | | | | | | | | | | | | | | | |

| Full sweep interval K | Tx beam | 1 | | | | | 2 | | | | | ... | $N_{TX}$ | | | | |
|---|---|---|---|---|---|---|---|---|---|---|---|---|---|---|---|---|---|
| | Rx beam | 1 | 2 | 3 | ... | $N_{RX}$ | 1 | 2 | 3 | ... | $N_{RX}$ | ... | 1 | 2 | 3 | ... | $N_{RX}$ |
| | RSRP | | | | | | | | | | | | | | | | |

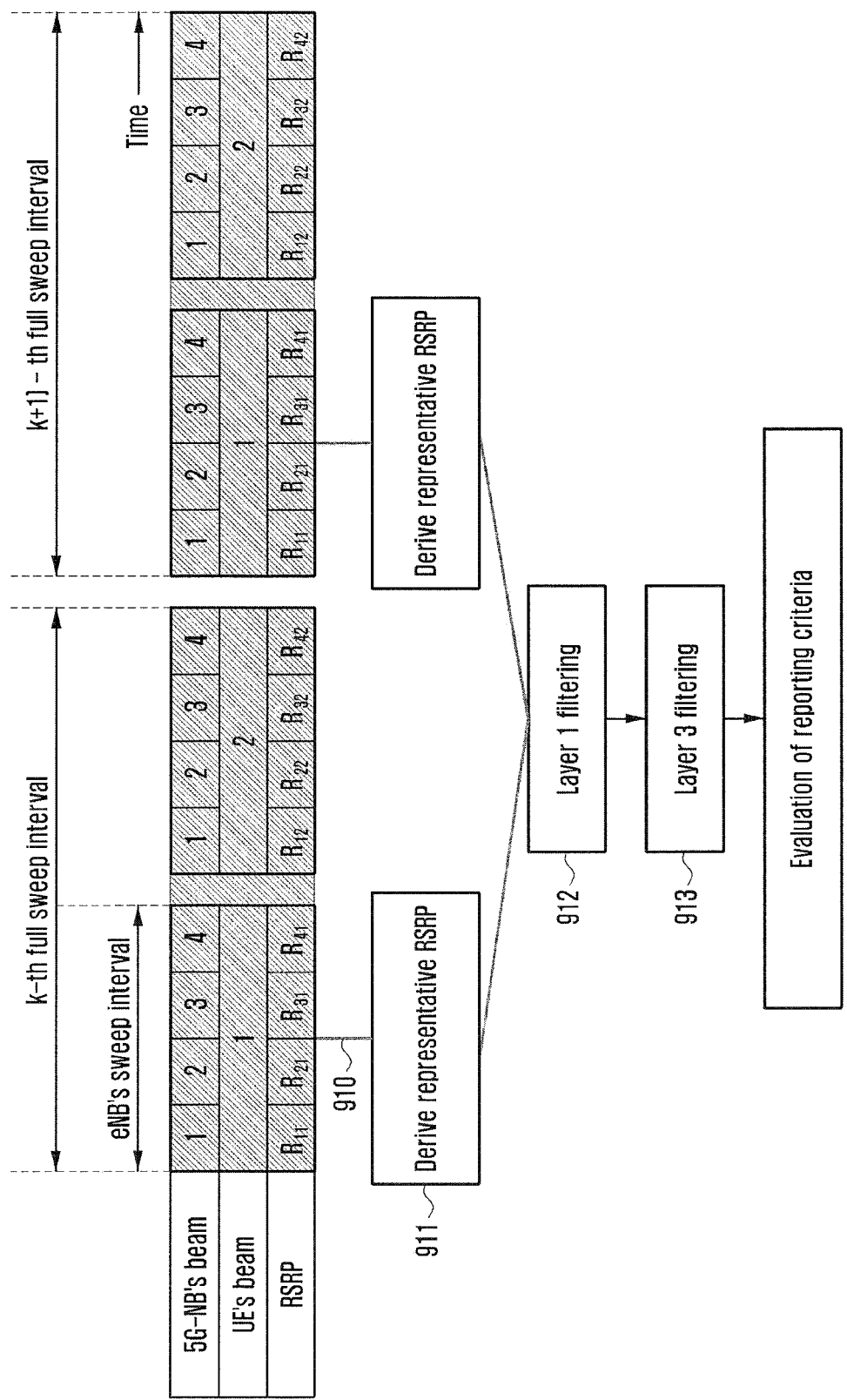

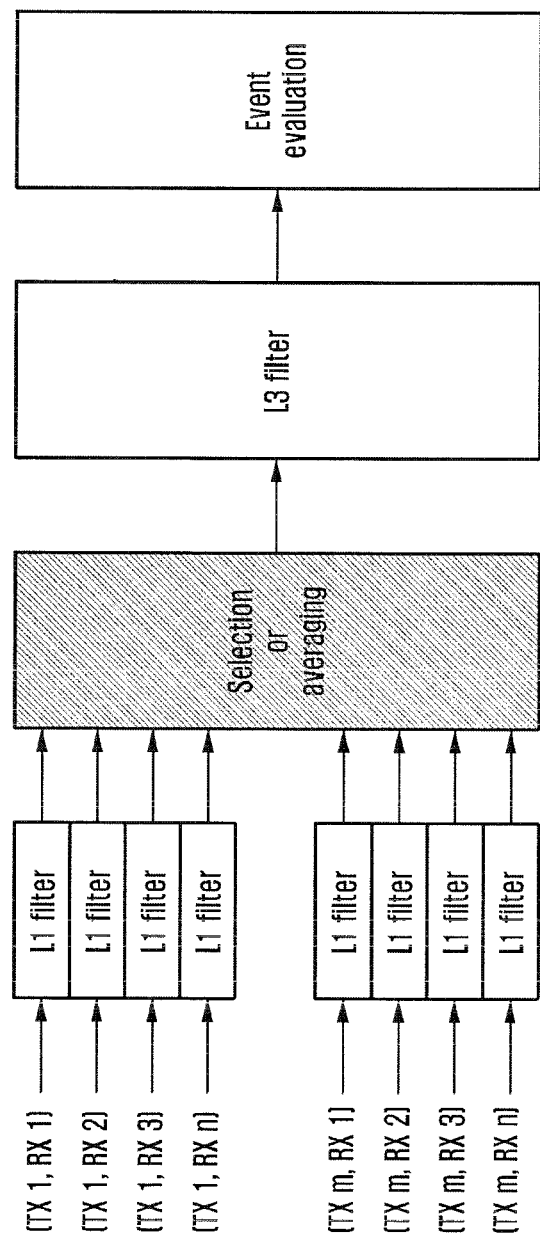

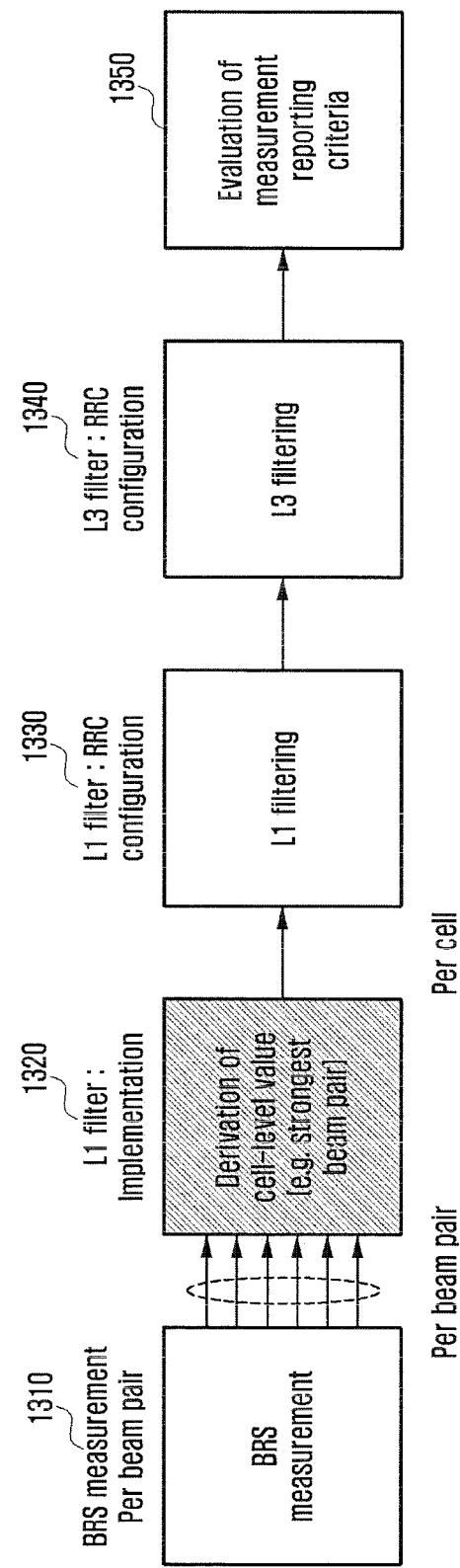

Handover success rate

METHOD AND APPARATUS FOR GENERATING CELL MEASUREMENT INFORMATION IN A WIRELESS COMMUNICATION SYSTEM

CROSS-REFERENCE TO RELATED APPLICATION(S)

This application is a continuation application of prior application Ser. No. 15/407,954, filed on Jan. 17, 2017, which was based on and claimed priority under 35 U.S.C. § 119(e) of a U.S. provisional patent application filed on Jan. 14, 2016 in the U.S. Patent and Trademark Office and assigned Ser. No. 62/278,629, and of a U.S. provisional patent application filed on Apr. 12, 2016 in the U.S. Patent and Trademark Office and assigned Ser. No. 62/321,266, and of a U.S. provisional patent application filed on Apr. 20, 2016 in the U.S. Patent and Trademark Office and assigned Ser. No. 62/325,059, and of a U.S. provisional patent application filed on Apr. 29, 2016 in the U.S. Patent and Trademark Office and assigned Ser. No. 62/329,562, and of a U.S. provisional patent application filed on Jun. 15, 2016 in the U.S. Patent and Trademark Office and assigned Ser. No. 62/350,404, and under 35 U.S.C. § 119(a) of a Korean patent application filed on Sep. 29, 2016 in the Korean Intellectual Property Office and assigned Serial number 10-2016-0125924, and of a Korean patent application filed on Jan. 16, 2017 in the Korean Intellectual Property Office and assigned Serial number 10-2017-0007324, the entire disclosure of each of which is hereby incorporated by reference.

TECHNICAL FIELD

The present disclosure relates to a wireless communication system. More particularly, the present disclosure relates to a method and an apparatus for generating beam and cell measurement information in a wireless communication system.

BACKGROUND

To meet a demand for radio data traffic that is on an increasing trend since commercialization of a fourth generation (4G) communication system, efforts to develop an improved fifth generation (5G) communication system or a pre-5G communication system have been conducted. For this reason, the 5G communication system or the pre-5G communication system is called a communication system beyond 4G network or a system since the post long term evolution (LTE).

To achieve a high data transmission rate, the 5G communication system is considered to be implemented in a super high frequency (mmWave) band (for example, like 60 GHz band). To relieve a path loss of a radio wave and increase a transfer distance of a radio wave in the super high frequency band, in the 5G communication system, beamforming, massive multiple input multiple output (MIMO), full dimensional MIMO (FD-MIMO), array antenna, analog beamforming, and large scale antenna technologies have been discussed.

Further, to improve a network of the system, in the 5G communication system, technologies, such as an advanced small cell, cloud radio access network (cloud RAN), ultra-dense network, device to device communication (D2D), wireless backhaul, moving network, cooperative communication, coordinated multi-points (CoMP), and interference cancellation have been developed.

In addition to this, in the 5G system, hybrid frequency shift keying (FSK) and QAM modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) which are an advanced access technology, and so on have been developed.

Meanwhile, the 5G communication system may use the beamforming and a terminal (user equipment (UE)) may measure signal strength of a beam (hereinafter, may be mingled with a beam) transmitted from a base station and may use the measured signal to manage mobility, such as a handover, a cell addition, a cell release, and a cell change. More specifically, the base station may transmit a beam reference signal that is a beamformed reference signal and the UE may measure strength, quality, or the like of the beam reference signal and report the measured strength, quality, or the like to the base station. In an embodiment of the present disclosure, the information generated by measuring, by the UE, the beam reference signal is called beam measurement information. Therefore, the base station may use the received beam measurement information for the mobility management, such as the handover, the cell addition, the cell release, and the cell change.

However, in the 5G communication system, the base station may use an array antenna, or the like to form a plurality of beams and use the formed beams to transmit the plurality of beam reference signals. Therefore, the UE may use the plurality of received beam reference signals to generate the plurality of beam measurement signals. However, the mobility management, such as the handover, the cell addition, the cell release, and the cell change is performed in a cell unit, and therefore a method for supporting mobility management performed in a cell unit using a plurality of beam measurement information is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for generating beam information to allow a user equipment (UE) to support mobility management performed in a cell unit using beam measurement information generated based on a plurality of beam reference signals.

Another aspect of the present disclosure is to provide a method and an apparatus for generating, by a UE, cell measurement information that is measurement information on a cell to be used for mobility management using a plurality of beam measurement information.

Another aspect of the present disclosure is to provide a method of a UE, comprising receiving measurement configuration information associated with a beamformed reference signal, receiving the reference signal per a plurality of beam pairs including a beam of a base station and a beam of the UE, generating beam measurement information based on the reference signal received per the plurality of beam pairs, and generating cell measurement information for a cell based on the beam measurement information.

Another aspect of the present disclosure is to provide a method of a base station, comprising transmitting, to a UE, measurement configuration information associated with a beamformed reference signal, transmitting the reference signal to the UE based on the measurement configuration information, and receiving generated cell measurement information based on the reference signal, wherein the cell measurement information is generated based on the beam measurement information measured per a plurality of beam pairs including a beam of the base station and a beam of the UE.

Another aspect of the present disclosure is to provide a UE, comprising a transceiver configured to transmit and receive a signal, and at least one processor configured to receive measurement configuration information associated with a beamformed reference signal, receive the reference signal per a plurality of beam pairs including a beam of a base station and a beam of the UE, generate beam measurement information based on the reference signal received per the plurality of beam pairs, and generate cell measurement information for a cell based on the beam measurement information.

Another aspect of the present disclosure is to provide a base station, comprising a transceiver configured to transmit and receive a signal and at least one processor configured to transmit, to a UE, measurement configuration information associated with a beamformed reference signal, transmit the reference signal to the UE based on the measurement configuration information, and receive generated cell measurement information based on the beam reference signal, wherein the cell measurement information is generated based on the beam measurement information measured per a plurality of beam pairs including a beam of base station and a beam of the UE.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2A, 2B, and 2C are diagrams illustrating a method for receiving, by a UE, a beam reference signal (BRS) to generate beam measurement information according to various embodiments the present disclosure;

FIGS. 9A and 9B are diagrams illustrating a method for generating, by a UE, cell measurement information according to various embodiments of the present disclosure;

FIGS. 11A, 11B, 11C, and 11D are diagrams illustrating a method for generating, by a UE, cell measurement information by performing per-beam pair filtering according to various embodiments of the present disclosure;

FIGS. 13A and 13B are diagrams illustrating a method for generating, by a UE, beam measurement information by performing per-cell filtering according to various embodiments of the present disclosure;

Throughout the drawings, it should be noted that like reference numbers are used to depict the same or similar elements, features, and structures.

DETAILED DESCRIPTION

Figure 1:
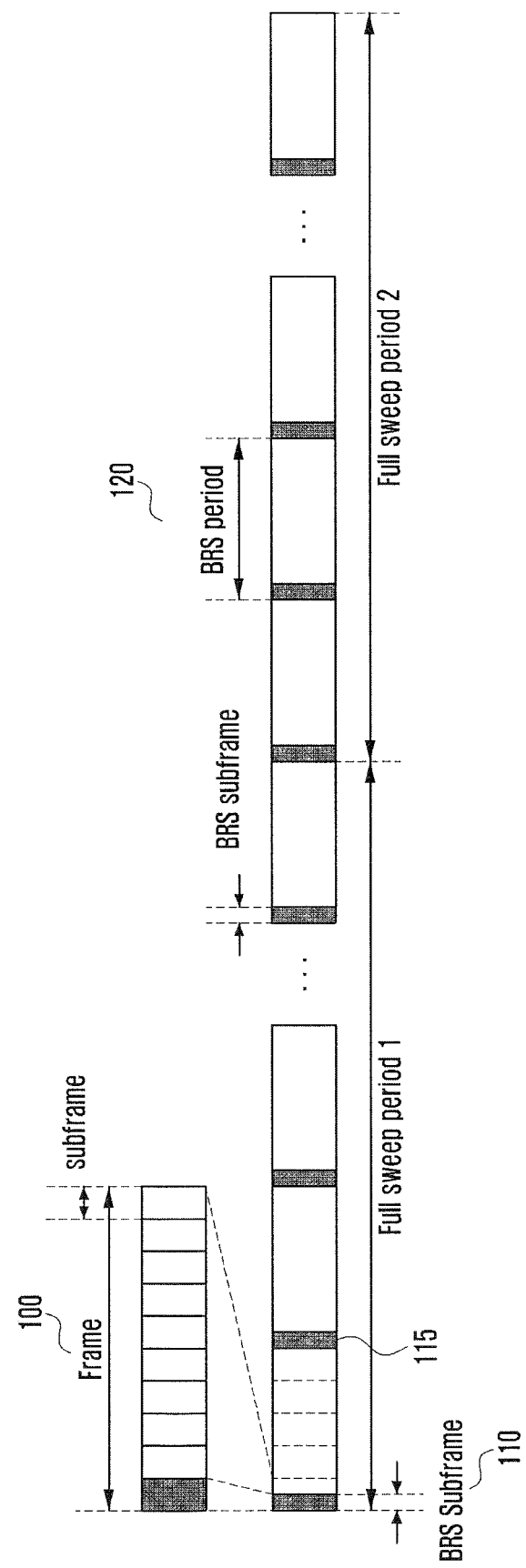
FIG. 1 is a diagram illustrating a method for receiving, by a user equipment (UE), a beam reference signal according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary.

Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In describing the embodiments of the present disclosure, a description of technical contents which are well known to the art to which the present disclosure belongs and are not directly connected with the present disclosure will be described. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

In describing the various embodiments of the present disclosure in the present specification, a description of technical contents which are well known to the art to which the present disclosure belongs and are not directly connected with the present disclosure will be described. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of embodiments of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in a processor of a general computer, a special computer, or other programmable data processing apparatuses, these computer program instructions executed through the process of the computer or the other programmable data processing apparatuses create means performing functions described in each block of the flow chart. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in each block of the flow chart. Since the computer program instructions may also be mounted on the computer or the other programmable data processing apparatuses, the instructions performing a series of operation on the computer or the other programmable data processing apparatuses to create processes executed by the computer, thereby executing the computer or the other programmable data processing apparatuses may also provide operations for performing the functions described in each block of the flow chart.

In addition, each block may indicate some of modules, segments, or codes including one or more executable instructions for executing a specific logical function (specific logical functions). Further, it is to be noted that functions mentioned in the blocks occur regardless of a sequence in some alternative embodiments. For example, two blocks that are continuously shown may be simultaneously performed in fact or be performed in a reverse sequence depending on corresponding functions sometimes.

Here, the term '-unit' used in the present embodiment means software or hardware components, such as field programmable gate array (FPGA) or application specific integrated circuit (ASIC) and the 'unit' performs any roles. However, the meaning of the 'unit' is not limited to software or hardware. The 'unit' may be configured to be in a storage medium that may be addressed and may also be configured to reproduce one or more processor. Accordingly, for example, the 'unit' includes components, such as software components, object oriented software components, class components, and task components and processors, functions, attributes, procedures, subroutines, segments of program code, drivers, firmware, microcode, circuit, data, database, data structures, tables, arrays, and variables. The functions provided in the components and the 'units' may be combined with a smaller number of components and the 'units' or may further separated into additional components and 'units'. In addition, the components and the 'units' may also be implemented to reproduce one or more central processing units (CPUs) within a device or a security multimedia card.

An embodiment of the present disclosure relates to a method for measuring, by a user equipment (UE), signal strength of a beam transmitted from a base station (5G-NB) in a mobile communication system based on beamforming. In an embodiment of the present disclosure, the base station can be referred to a 5G-NB. The UE may measure the signal strength of the beam transmitted from the 5G-NB and use the measurement result to perform the following operations.

The UE may measure the signal strength of the beam transmitted from the 5G-NB and use the measurement result to perform handover.

The UE may measure the signal strength of the beam transmitted from the 5G-NB and use the measurement result to perform a cell addition, a cell release, a cell switch, and a cell change.

The UE may measure the signal strength of the beam transmitted from the 5G-NB and may use the measurement result to perform beam measurement information feedback (from the UE to the 5G-NB) transmitted to the 5G-NB and switch a beam used for communication.

Meanwhile, the environment considered in an embodiment of the present disclosure is as follows.

The 5G-NB may use an array antenna, or the like to form $N_{BS}$ beams and use the formed $N_{BS}$ beams for communication with the UE. For example, when transmitting downlink (DL) data to the UE, the 5G-NB may select some beams suitable for DL communication with the UE among the $N_{BS}$ beams to transmit the DL data and when receiving uplink (UL) data from the UE, select some beams suitable for UL communication with the UE among the $N_{BS}$ beams to receive the UL data.

Here, the beam used when the 5G-NB transmits the DL data to the UE may equal to or different from the beam used when the 5G-NB receives the UL data from the UE. Further, the number of beams selected for the 5G-NB to transmit the DL data and the number of beams selected for the 5G-NB to receive the UL data may also be one or more.

The UE may use the array antenna, or the like to form $N_{UE}$ beams and use the formed $N_{UE}$ beams for communication with the 5G-NB. For example, when transmitting the UL data to the 5G-NB, the UE may select some beams suitable for the UL communication with the 5G-NB among the $N_{UE}$ beams to transmit the UL data and when receiving the DL data from the 5G-NB, select some beams suitable for the DL communication with the UE among the $N_{UE}$ beams to receive the DL data.

Here, the beam used when the UE transmits the UL data to the 5G-NB may equal to or different from the beam used when the UE receives the DL data from the 5G-NB. Further, the number of beams selected for the UE to transmit the UL data and the number of beams selected for the UE to receive the DL data may also be one or more.

As described above, the 5G-NB and the UE may select some beams suitable for communication among a plurality of beams to transmit and receive data. For the beam selection, in the mobile communication system based on beamforming, the 5G-NB may transmit a beam reference signal (BRS) that is a reference signal beamformed at a certain time interval or whenever the need arises. The beam reference signal may be a reference signal transmitted per 5G-NB's beam and in an embodiment of the present disclosure, may be interchangeably used with the BRS.

As such, the 5G-NB may transmit the BRS through all beams or some beams and the UE may receive the BRS through all the beams or some beams and generate the beam measurement information using the BRS. At this point, the beam measurement information may mean channel status information between the beam that the 5G-NB transmits and the UE and may mean, for example, the signal strength, the signal quality, or the like of the beam that the 5G-NB transmits. At this time, the signal strength of the beam may include referenced signal received power (RSRP) and the signal quality of the beam may include referenced signal received quality (RSRQ). Further, in an embodiment of the present disclosure, the beam measurement information may be interchangeably used with terms, such as BRS measurement information, BRS signal strength, BRS signal quality, and BRS measurement sample. As described above, the UE uses the BRS received through the 5G-NB's beam and the UE's beam to generate the beam measurement information, and thus the UE may determine through what beam the 5G-NB transmits data to the UE and through what beam the UE receives the data for implementing best communication. Further, the UE notifies the 5G-NB of the BRS measurement information, and thus the 5G-NB may select a beam to be used when performing the communication with the UE.

Further, after the UE measures the BRS, if it is determined that beams of neighbor 5G-NBs provides the higher signal strength or quality than the serving 5G-NB's beam, the UE may notify the 5G-NB of the determination result. The 5G-NB receiving the information may perform an operation of handing over the UE to the neighbor 5G-NBs. Further, when the UE measures the BRS and then determines that a beam of a neighbor 5G-NB provides a higher RSRP or a higher RSRQ than a beam of a serving 5G-NB, the UE may notify the 5G-NB of the situation.

Alternatively, the UE measures the BRS and then may derive cell quality from beam quality of the serving 5G-NB and neighbor 5G-NBs. As a result, if it is determined that the cell quality of the serving 5G-NB is higher than that of the neighbor 5G-NBs, the determined result may be notified to the 5G-NB. The 5G-NB receiving such information may perform an operation for handing over the UE to the neighbor 5G-NB.

Further, the UE measures the BRS that the serving 5G-NB and the neighbor 5G-NBs transmit and then may form gathering of the 5G-NBs having the received signal strength equal to or greater than a certain level and notify the 5G-NB of the formed gathering of the 5G-NBs. The 5G-NB receiving the information may select one of the plurality of 5G-NBs belonging to the gathering of the 5G-NBs when communicating with the UE to perform transmission and reception.

Hereinafter, a process of transmitting, by a 5G-NB, BRS and receiving, by a UE, the BRS will be described.

FIG. 1 is a diagram illustrating a method for receiving, by a UE, a beam reference signal according to an embodiment of the present disclosure.

In an embodiment of the present disclosure, it is assumed that the 5G-NB forms $N_{BS}$ beams and selects all or some of the $N_{BS}$ beams to communicate with the UE. Further, it is assumed that the UE forms $N_{UE}$ beams and selects all or some of the $N_{UE}$ beams to communicate with the 5G-NB. Therefore, a total of $N_{BS}*N_{UE}$ beam pairs (hereinafter, beam pair) consisting of the 5G-NB's beam and the UE's beam are present between the 5G-NB and the UE and the UE may select the best beam pair in terms of the received signal strength if all BRS received signal strengths for the $N_{BS}*N_{UE}$ beam pairs are measured.

Referring to FIG. 1, in an embodiment of the present disclosure, the BRS that the 5G-NB transmits may not be transmitted per subframe like a cell-specific reference signal (CRS) of long-term evolution (LTE) but may be transmitted only in a periodically allocated subframe. For example, as illustrated in FIG. 1, the 5G-NB may transmit the BRS in one subframe 110 included in one radio frame 100. Alternatively, the 5G-NB may transmit the BRS in a plurality of subframes included in one radio frame 100. However, the BRS may be transmitted every subframe and may also be transmitted aperiodically.

Further, the 5G-NB may transmit the BRS through one beam or at least one beam in a symbol (or a plurality of symbols) unit depending on the number of antennas, and therefore the number of beams that may the BRS in one subframe is restrictive. Therefore, in order for the UE to measure all the signal strengths for the $N_{BS}*N_{UE}$ beam pairs, the measurement may also need to be performed for several subframes depending on $N_{BS}$, $N_{UE}$, the number of symbols per subframe, the number of antennas, or the like.

In FIG. 1, the subframe in which the BRS is transmitted may be named a BRS subframe 110, a period at which the BRS subframe is allocated may be called a BRS period 120, and time taken for the UE to measure all of the $N_{BS}*N_{UE}$ beam pairs may be named beam measurement periods (hereinafter, may be interchangeably used with the term 'full sweep period', 'full sweep interval') 130 and 140.

In an embodiment of the present disclosure, the 5G-NB may first transmit the BRS while sweeping a transmit beam and the UE may receive the BRS that the 5G-NB transmits in the state in which it fixes a receive beam. If the UE receives the BRS for all the 5G-NB's beams through a specific receive beam, the UE changes the receive beam to perform the same operation.

For example, the UE may use a first beam to receive the BRS that the 5G-NB transmits in the BRS subframe 110. After the 5G-NB receives all the transmitted BRSs, the UE may use a second beam in a subsequent BRS subframe 115 to receive the BRS that the 5G-NB transmits. When the user equipment forms the $N_{UE}$ beams, the UEs may use all or some of the beams to receive each BRS that each of the 5G-NBs transmits. The present drawing describes, by way of example, the case in which each of the UEs uses one beam in one BRS subframe to receive the BRSs that the 5G-NBs transmits, but the present disclosure is not limited thereto. For example, the 5G-NB may transmit the BRS while sweeping the beam in the plurality of BRS subframes and the UE may also use one beam in the plurality of BRS subframes to receive the BRSs.

By the method, the UE may measure all the BRS signal strengths for the $N_{BS}*N_{UE}$ beam pairs for the full sweep period.

FIGS. 2A, 2B, and 2C are diagram illustrating a method for receiving, by a UE, BRS to generate beam measurement information according to various embodiments of the present disclosure.

Referring to FIG. 2A, the 5G-NB may form $N_{BS}$ beams 210 and transmit the $N_{BS}$ beams to the UE.

Further, the UE may form $N_{UE}$ beams 220, use a UE's beam to receive the BRS, and generate the beam measurement information.

For example, referring to FIG. 2A, the UE may use a first beam 232 while the 5G-NB sweeps 231 the beam to transmit $N_{BS}$ BRSs 231 to generate the beam measurement information (for example, RSRP, RSRQ) 233.

Referring to FIG. 2B, the UE may receive $N_{TX}$ BRSs received from the 5G-NB for the first beam to generate the beam measurement information and repeat the operation up to a $N_{RX}$-th beam.

Meanwhile, in an embodiment of the present disclosure, the 5G-NB may be called a transmitter (TX) or 5GNB, the UE may be called a receiver (RX), and the 5G-NB's beam may be called a transmit beam and the UE's beam may be a receive beam. Further, the $N_{BS}$ and the $N_{TX}$ may mean the number of 5G-NB's beams and the $N_{UE}$ and the $N_{RX}$ may mean the number of the UE's beams.

Further, the 5G-NB may transmit the BRS in the state in which it fixes the transmit beam and the UE may also consider the situation in which it receives the BRS transmitted by the 5G-NB while sweeping the receive beam.

Referring to FIG. 2C, if the UE receives a BRS for a specific transmit beam of the 5G-NB as all the receive beams to measure all the BRS signal strengths, the 5G-NB may change the transmit beam to perform the same operation. By the method, the UE may measure all the BRS signal strengths for the $N_{BS}*N_{UE}$ beam pairs. Here, the UE may measure the BRS RSRP or the BRS RSRQ for each beam pair (transmit beam i of the 5G-NB and receive beam j of the UE).

Meanwhile, when the UE uses one array antenna to measure the RSRP or the RSRQ for each beam pair, only one measurement value is present. However, when the UE uses a plurality of antenna arrays to measure the RSRP or the RSRQ for each beam pair, the measurement values for each array antenna may be present, and as a result a method for determining measurement information (representative value) on a cell is required. Therefore, an embodiment of the present disclosure may use the following method.

The UE may set a highest value, a lowest value, or a median among the BRS signal strengths measured by the plurality of array antennas as the cell measurement information (representative value).

The UE may set a mean of the BRS signal strengths measured by the plurality of array antennas as the cell measurement information (representative value).

The UE may receive the BRSs through the plurality of array antennas and combine the BRSs to set the result as the cell measurement information (representative value). At this time, maximum ratio combining, or the like may be applied. A method for defining cell measurement information will be described below.

As described above, the UE may perform the following operations, or the like using a procedure of transmitting, by a 5G-NB, BRS and receiving and measuring, by a UE, the BRS.

1. Short-Term Beam Measurement Feedback

The short-term beam measurement feedback may determine a beam to be used by the 5G-NB or the UE for transmission and reception at the time of scheduling and may be used to change the beam.

2. Long-Term Beam Measurement Report

The long-term measurement report may determine a target 5G-NB for the handover, the cell addition, the cell release, the cell switch, the cell change, or the like and may be used to perform the determination.

Here, even though the terms 'feedback and the report' are separately used, these terms may basically correspond to an operation of notifying, by a UE, a 5G-NB of a beam measurement result. Further, although the terms 'short-term and long-term' are separately used, there is no clear division of the short-term and the long-term. However, the short-term beam measurement report and the long-term beam measurement report are used for different purposes as described above, and therefore in an embodiment of the present disclosure, the operations of short-term beam measurement report and the long-term beam measurement report will be described separately.

The short-term beam measurement may be mainly used to change, at appropriate timing, the beam pair at which the serving 5G-NB and UE transmit and receive control information and data depending on fading of a wireless channel, a rotation of the UE, or the like.

Hereinafter, the long-term beam measurement will be described.

Figure 3:
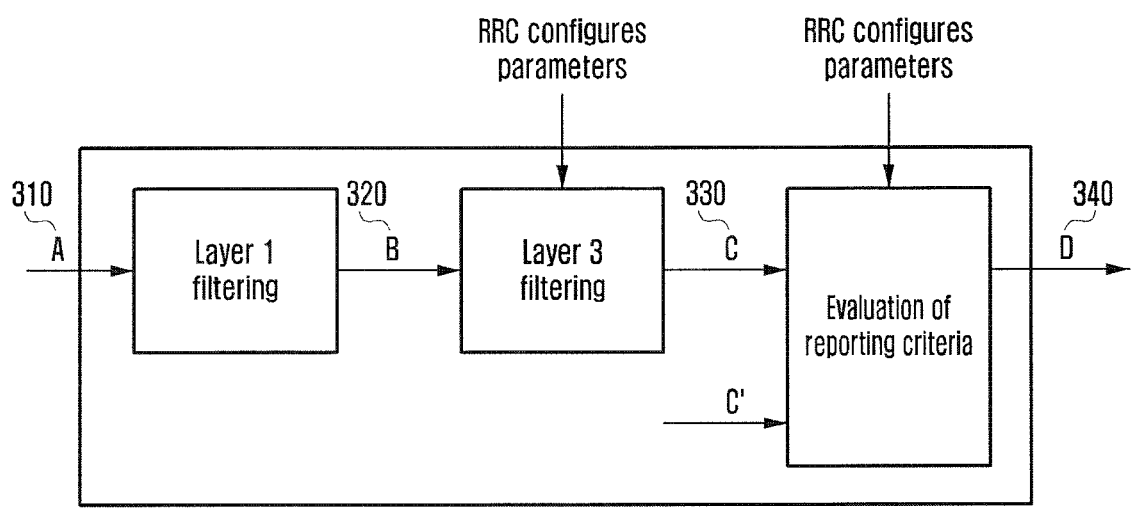
FIG. 3 is a diagram illustrating a process of generating beam measurement information according to an embodiment of the present disclosure.

FIG. 3 is a diagram illustrating a process of generating beam measurement information according to an embodiment of the present disclosure.

Like the LTE, a mobile communication system based on analog beamforming using a high frequency band may also perform the handover, the cell addition, the cell release, the cell switch, the cell change, or the like based on radio resource management (RRM) measurement.

For this purpose, the UE may perform the beam measurement while receiving the BRS that the 5G-NB transmits, in which the UE may perform layer 1 and layer 3 filtering. This is to allow the UE to perform the handover, the cell addition, the cell release, the cell switch, the cell change, or the like with the 5G-NB, depending on an average channel gain rather than a momentary channel gain.

Referring to FIG. 3, the UE may sequentially perform layer 1 sampling, layer 1 filtering, layer 3 filtering, and reporting criteria evaluation.

At this time, A 310 that is an input value may mean the beam measurement information obtained from the beam measurement result for each beam pair by the UE (more accurately, physical layer of the UE). In an embodiment of the present disclosure, the beam measurement information may be interchangeably used with the term 'beam measurement sample, RSRP or RSRQ sample'.

Further, B 320 is a result obtained by performing the layer 1 filtering on n measurement samples obtained from the A 310.

C 330 is a result obtained by performing the layer 3 filtering on the results of the layer 1 filtering obtained from the B 320. At this time, a filtering coefficient is required to perform the layer 3 filtering and the 5G-NB may transmit the filtering coefficient to the UE while including the filtering coefficient in measurement configuration information transmitted through radio resource control (RRC) signaling.

D 340 is an indicator that confirms whether the results of the layer 3 filtering satisfy the measurement reporting conditions and if satisfied, indicates the measuring reporting to the layer 3. The measurement reporting condition may also be included in the measurement configuration information that the 5G-NB transmits to the UE.

Meanwhile, in an embodiment of the present disclosure, the layer 1 filtering and the layer 3 filtering each may be interchangeably used with the terms L1 filtering, L3 filtering, or the like. Further, the process of confirming whether to satisfy the reporting condition may be interchangeably used with the terms evaluation of reporting criteria, reporting event evaluation, or the like.

Figure 4:
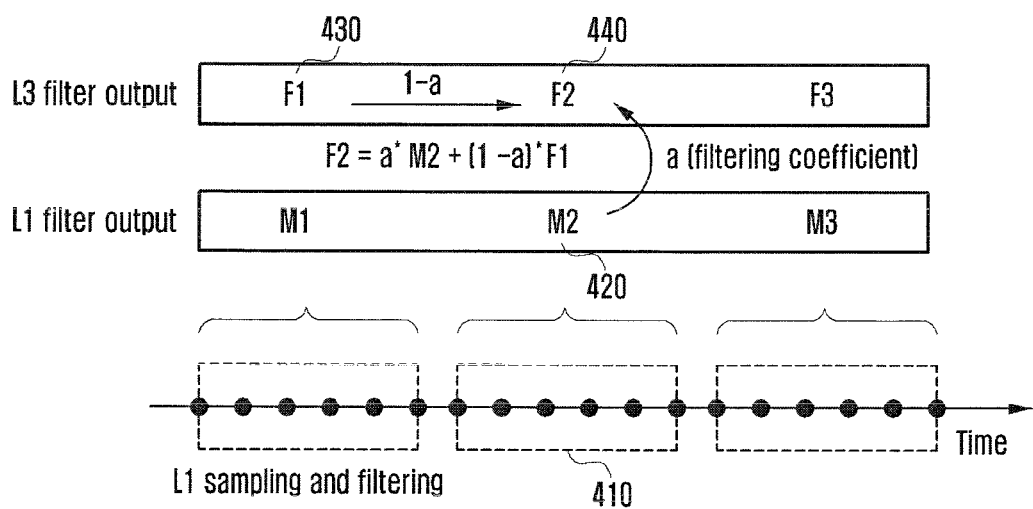
FIG. 4 is a diagram illustrating a filtering process according to an embodiment of the present disclosure.

FIG. 4 is a diagram illustrating a filtering process according to an embodiment of the present disclosure.

Referring to FIG. 4, the UE may perform a weighted sum of the results of the layer 1 filtering of the BRS measurement sample and the results of the layer 3 filtering performed up to now. Here, the 5G-NB may notify the UE of a filtering coefficient corresponding to the weight through an RRC message.

Describing the Layer 3 filtering by way of example, the UE may obtain M2 420 that is an output value obtained by performing the layer 1 filtering on a measurement sample 410 and F2 440 may be generated by performing a weighted sum of F1 430 that is the results of the layer 3 filtering performed up to now and M2. At this point, the weight a value may be transmitted to the UE through the RRC message.

Figure 5:
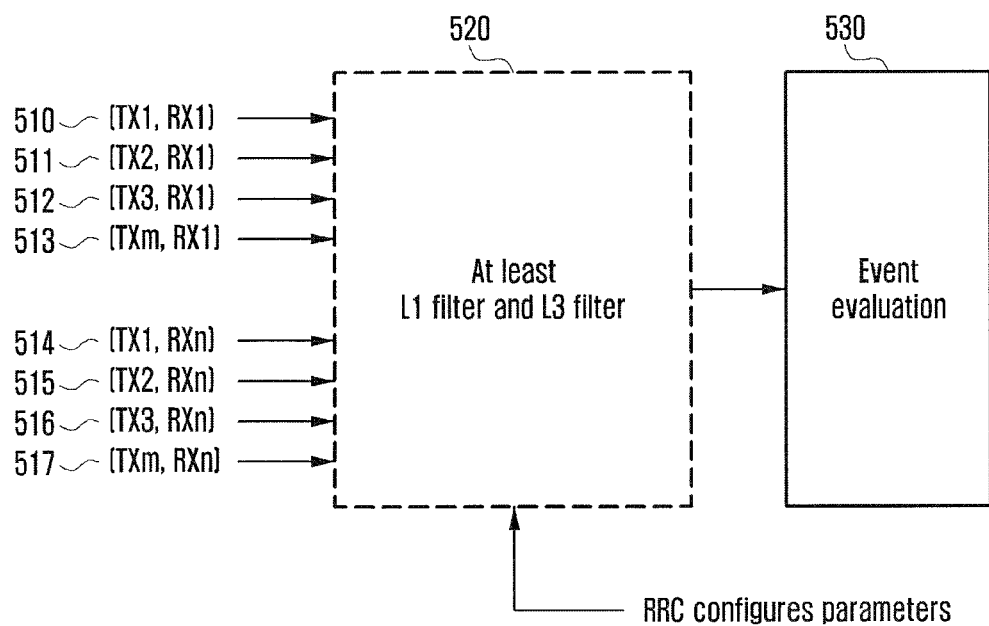
FIG. 5 is a diagram illustrating a process of generating cell measurement information according to an embodiment of the present disclosure.

FIG. 5 is a diagram illustrating a process of generating cell measurement information according to an embodiment of the present disclosure.

The biggest difference between the mobile communication system based on analog beamforming operated in a high frequency band and the LTE in terms of the RRM measurement is that the mobile communication system based on analog beamforming derives the BRS measurement sample in a transmit and receive beam pair unit of the 5G-NB and the UE, while the LTE does not have a beam pair concept and therefore derives a CRS measurement sample in a cell unit.

Referring to FIG. 5, in the mobile communication system based on analog beamforming, a plurality of transmit and receive beam pairs may be present in one cell. Further, the UE may generate the BRS measurement samples per a plurality of transmit and receive beam pairs 510 to 517. However, the operations performed by using, by the UE and the 5G-NB, the RRM measurement are performed in the cell unit, such as the handover, the cell addition, the cell release, the cell switch, and the cell change. Therefore, it is necessary to define how to use the BRS measurement sample derived in the beam pair unit to support the operation performed in the cell unit.

Therefore, an embodiment of the present disclosure proposes a method of generating cell measurement information in a cell unit by performing layer 1 filtering and layer 3 filtering 520 on BRS measurement samples generated per a plurality of beam pairs.

An embodiment of the present disclosure proposes various embodiments that derive the information (for example, layer 1 filtering input value, layer 1 filtering output, layer 3 filtering input, layer 3 filtering output, or the like for a cell) of the cell level in each step of performing layer 1 filtering and layer 3 filtering on the BRS measurement results generated by beam pair to generate the cell measurement information. At this point, the information of the cell level derived in each step may be collectively called a cell representative value or a cell representative metric. For example, the value for the cell may be derived prior to performing the layer 1 filtering on the BRS measurement results generated by beam pair, which may be called the L1 filtering input value, the cell representative value, or the cell representative metric for the cell. Therefore, when the representative value for the cell is derived after the layer 3 filtering, it is obvious that the cell representative value or the cell representative metric may be the cell measurement information 530.

Figure 6:
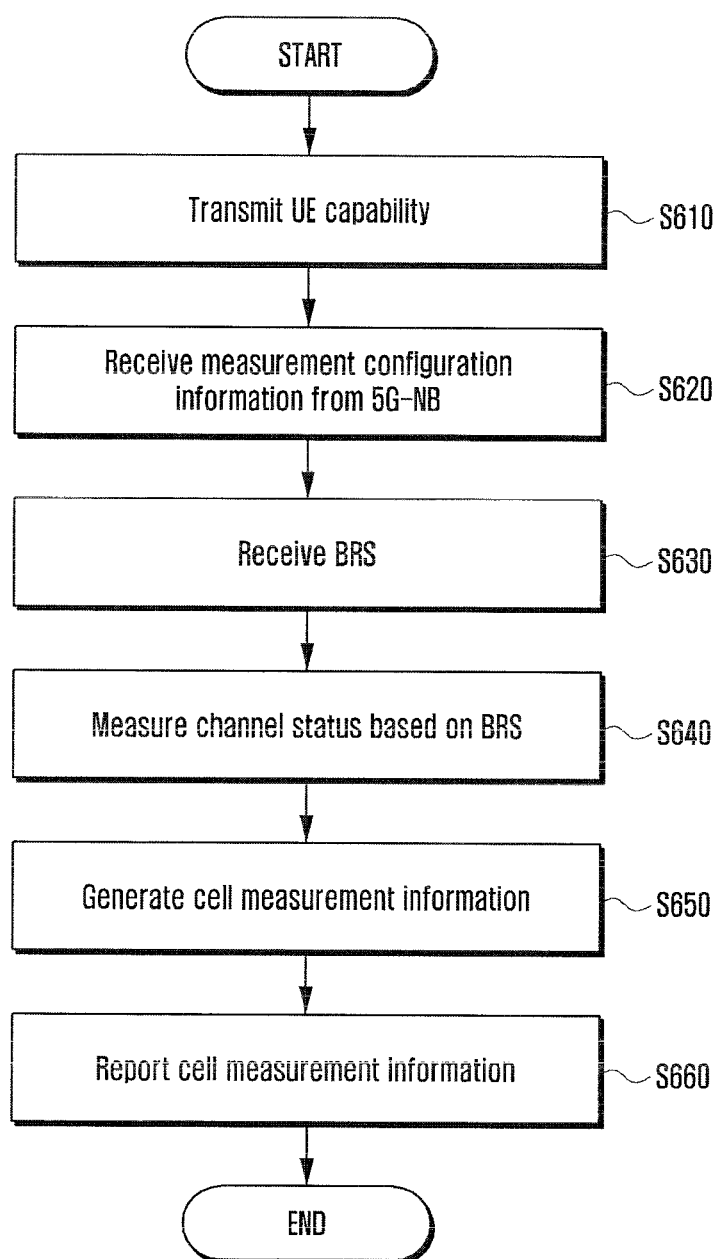
FIG. 6 is a flow chart illustrating a method for generating, by a UE, cell measurement information according to an embodiment of the present disclosure.

FIG. 6 is a flow chart illustrating a method for generating, by a UE, cell measurement information according to an embodiment of the present disclosure.

Referring to FIG. 6, the UE may transmit UE capability to the 5G-NB in operation S610. The UE may notify the 5G-NB of the number of the UE's beams based on the UE capability. Further, the UE capability may include beam information, a beam pattern, the number of the UE's beams, beam overlapping related information indicating whether adjacent beams overlap in X dB, the beam sweeping information indicating whether to perform the beam sweeping for the BRS measurement, or the like. Further, the UE capability may include information that the UE transmits to the 5G-NB. However, in an embodiment of the present disclosure, the operation S610 may be omitted. For example, the UE may perform the operation of an embodiment of the present disclosure without transmitting the UE capability to the 5G-NB.

In operation S620, the UE may receive the measurement configuration information from the 5G-NB. More specifically, the UE may receive the measurement information associated with the beam reference signal from the 5G-NB.

For example, the measurement information may include information associated with a method for deriving a filtering coefficient for layer 3 filtering, a filtering mode, the number of transmit beams and receive beams to be filtered, the number of beam pairs to be filtered, cell measurement information and a method for deriving transmit beam level measurement information that is a representative value of beam measurement information on a transmit beam or receive beam level measurement information that is a representative value of beam measurement information on a receive beam.

Further, the configuration information received by the UE may include the information (hereinafter, reporting related information) associated with the report of the cell measurement information. At this point, the report related information may include reporting timing of the cell measurement information, conditions for reporting the cell measurement information, or the like.

Further, the configuration information may include information that the 5G-NB transmits to the UE.

In operation S630, the UE may receive the BRS. The UE may receive the BRS based on the configuration information received from the 5G-NB. At this point, as described above, each of the 5G-NBs may form a plurality of beams and may transmit the BRSs per beam and the UE may form a plurality of beams and receive the BRSs per beam pair consisting of the 5G-NB's beam and the UE's beam.

Further, in operation S640, the UE may measure the channel status based on the BRS. The UE may measure the channel statuses per beam pair to generate the beam measurement information. At this point, the beam measurement information may include the signal strength of the BRS, the signal quality of the BRS, or the like.

After the beam measurement information is generated, in operation S650, the UE may generate the cell measurement information. The UE may filter the generated beam measurement information and may use a method for performing a mean, a sum, a weighted sum, a weighted mean, or the like on all or some of beam measurement information generated per a plurality of beam pairs to generate cell measurement information.

Further, the UE may use a method for performing the mean, the sum, the weighted sum, the weighted mean, or the like on all or some of a plurality of beam measurement information generated per beam pair to generate measurement information on a transmit beam level or measurement information on a receive beam level.

At this time, the process of generating the cell measurement information and the process of generating the measurement information on the transmit beam level or the measurement information on the receive beam level may be performed before and after the layer 1 filtering and before and after the layer 3 filtering and the content thereof will be described below.

In operation S660, the UE may determine whether to satisfy the reporting condition and if the reporting condition is satisfied, may report the generated cell measurement information to the 5G-NB. Therefore, the 5G-NB may use the beam measurement information to determine whether to perform the operations of the handover, the cell addition, the cell change, or the like using the beam measurement information.

Figure 7A:
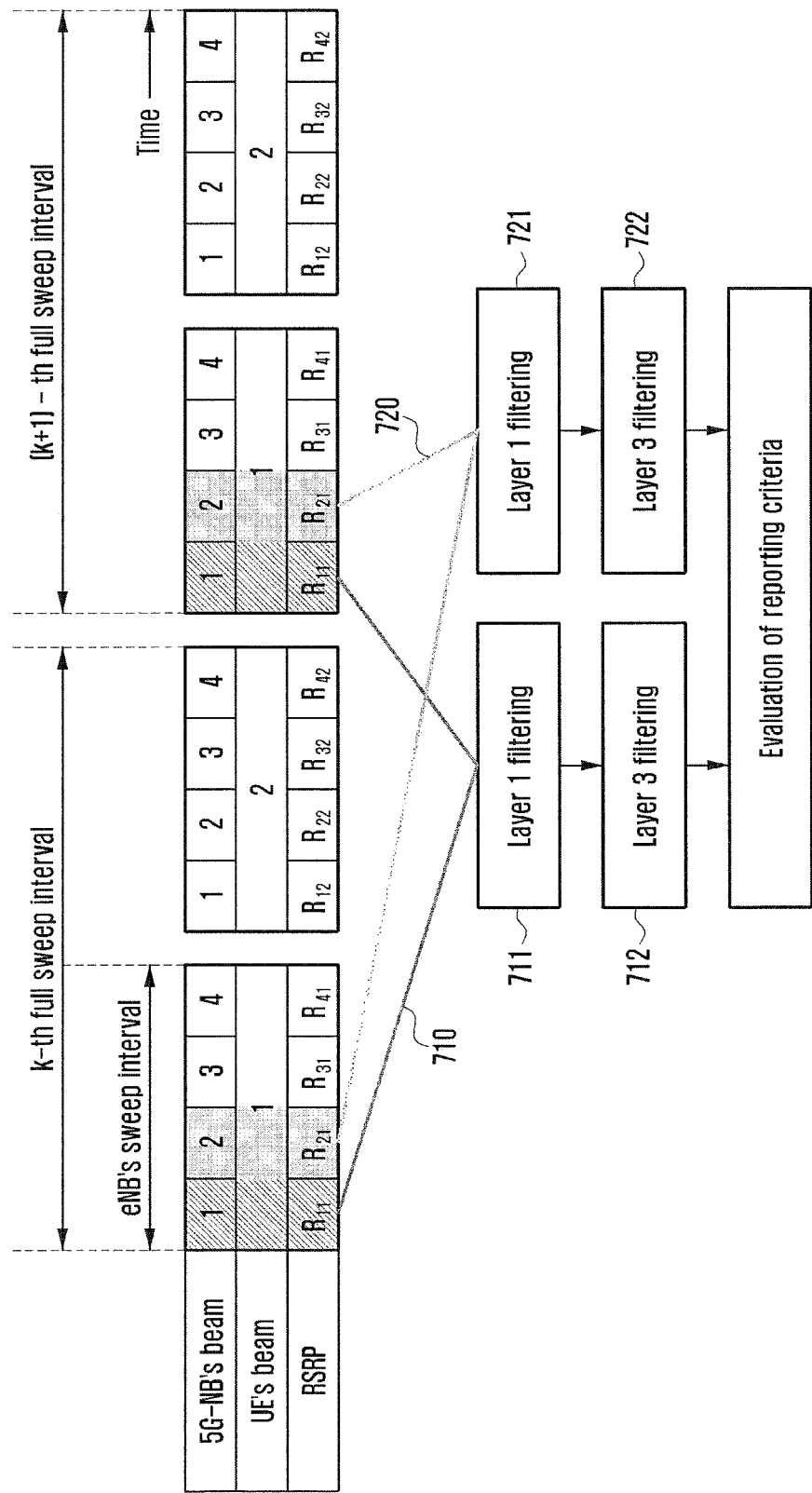
FIGS. 7A and 7B are diagrams illustrating a method for generating, by a UE, cell measurement information according to various embodiments of the present disclosure.
Figure 7B:
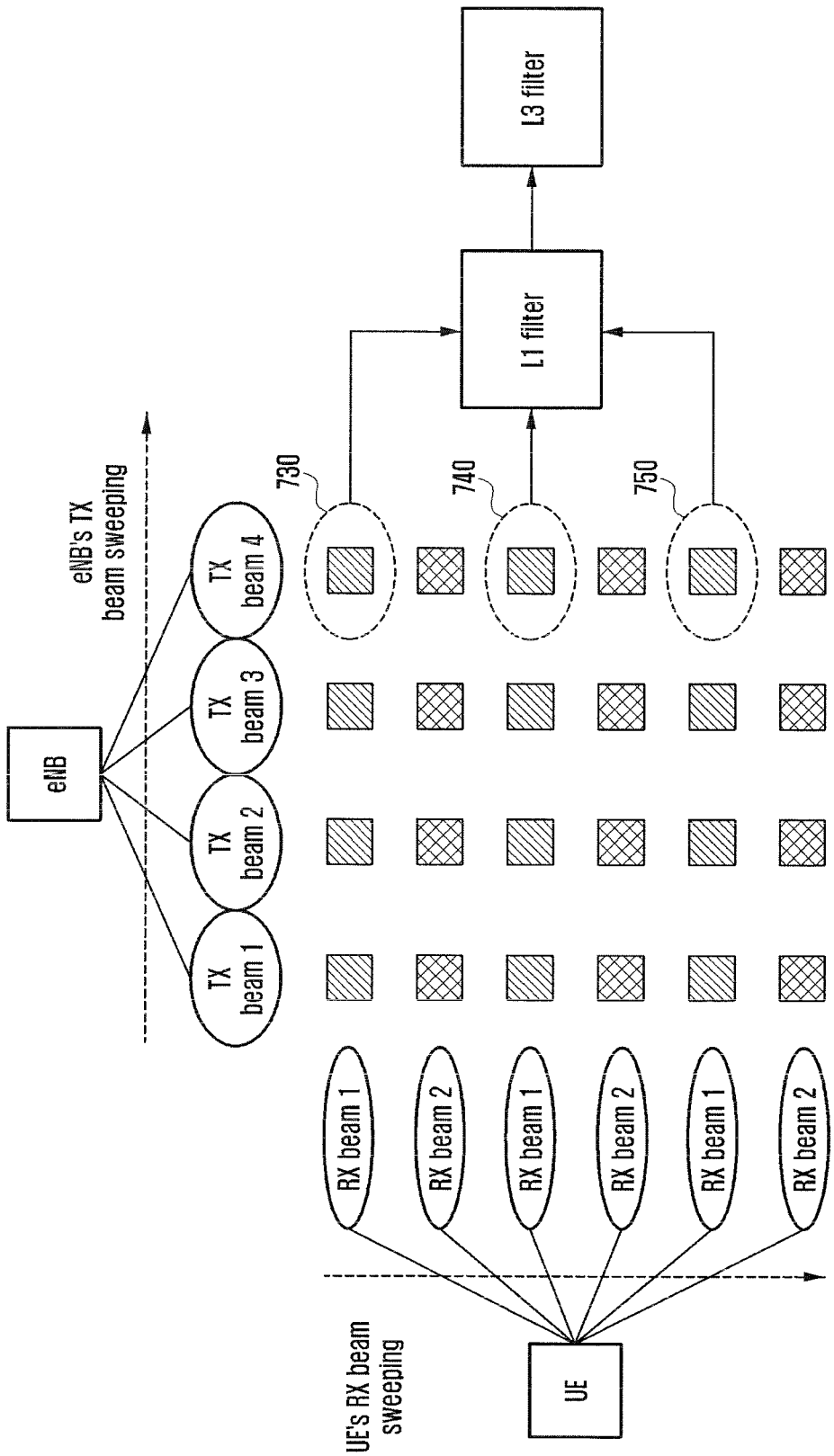

FIGS. 7A and 7B are diagrams illustrating a method for generating, by a UE, cell measurement information according to various embodiments of the present disclosure.

As described above, the 5G-NB may transmit the BRS while sweeping the 5G-NB' beam for one BRS subframe and the UE may receive the BRS in the state in which it fixes the UE's beam within one BRS subframe and receive the BRS while changing the UE's beams per BRS subframe to generate the beam measurement information, such as the RSRP, the RSRQ, or the like.

Referring to FIGS. 7A and 7B, a method for performing, by a UE, per-beam pair layer 1 and layer 3 filtering is suggested. For example, if it is assumed that the BRS measurement sample (RSRP or RSRQ) measured at time t using 5G-NB's beam X and UE's beam Y, the method for performing per-beam pair layer 1 and layer 3 filtering may be defined as follows.

The UE may generate m BRS measurement samples, that is, {XY[t−(m−1)T], . . . , XY[t−2T], XY[t−T], XY[t]} that are measured by using the 5G-NB's beam X and the UE's beam Y at an interval of a sampling period T to perform the layer 1 filtering.

Here, the BRS measurement sample XY[t] measured by using the 5G-NB's beam X and the UE's beam Y and the BRS measurement sample X*Y*[t] measured by using 5G-NB's beam X* and UE's beam Y* (here, X and X* are different and Y and Y* are also different) may separately suffer from the layer 1 filtering.

The UE may perform the weighted sum of the current layer filtering result for the XY[t] and the past layer 3 filtering result for the XY[t] to derive the current layer 3 filtering result.

Here, the current layer 1 filtering result for the XY[t] and the past layer 3 filtering result for the X*Y*[t] suffer from the layer 3 filtering separately. For example, they do not perform the weighted sum on each other.

A method for performing per-beam pair layer 1 and layer 3 filtering is illustrated in FIG. 7A.

Referring to FIG. 7A, the UE may perform layer 1 filtering 711 and layer 3 filtering 712 on a BRS measurement sample 710 measured by using 5G-NB's beam 1 and UE's beam 1. The case in which the UE generates the RSRP using the BRS measurement sample is described, by way of example, in the present drawings but the scope of the present disclosure is not limited thereto.

Further, the UE may perform layer 1 filtering 721 and layer 3 filtering 722 on a BRS measurement sample 720 measured by using 5G-NB's beam 2 and the UE's beam 1. As such, each of the UEs may perform the per-beam pair layer 1 filtering. Further, the BRS measurement sample measured by using the 5G-NB's beam 1 and the UE's beam 1 and the BRS measurement sample measured by using the 5G-NB's beam 2 and the UE's beam 1 may suffer from the layer 1 and layer 3 filtering independent of each other.

If the layer 1 filtering and the layer 3 filtering are performed per beam pair as proposed in an embodiment of the present disclosure, the UE acquires layer 3 filtering outputs for each beam pair. Since the UE uses the layer 3 filtering outputs for the handover, the cell addition, the cell release, the cell switch, the cell change, or the like, the UE has to derive the cell measurement information that is metric (hereinafter, may be interchangeably used with metric) standing for a cell based on the layer 3 filtering outputs for each beam pair.

An embodiment of the present disclosure proposes the following method as the method for deriving metric or parameters standing for a cell.

The UE may measure all the 5G-NB's beams operated in each cell using all the UE's beams and then select one beam pair (pair of one 5G-NB's beam and one UE's beam) having the greatest RSRP or RSRQ (for BRS). The RSRP or RSRQ of the so selected beam pair may be defined as the metric standing for the corresponding cell.

Alternatively, the UE may measure all the 5G-NB's beams operated in each cell using all the UE's beams and then select N beam pairs in order of the RSRP or the RSRQ from largest to smallest. The mean (or sum) of the RSRP or the RSRQ of the so selected N beam pairs may be derived, which may be defined as the metric standing for the corresponding cell. Here, N may be any integer and may be set by the 5G-NB.

Alternatively, the UE may measure all the 5G-NB's beams operated in each cell using all the UE's beams and then select all the beam pairs having the RSRP or the RSRQ that is equal to or greater than the given threshold. The mean (or sum) of the RSRP or the RSRQ of the so selected beam pairs may be derived, which may be defined as the metric standing for the corresponding cell. Here, the 5G-NB may notify the UE of the threshold through the RRC message, or the like.

Alternatively, the UE may measure all the 5G-NB's beams operated in each cell using all the UE's beams and then select all the beam pairs having the RSRP or the RSRQ that is equal to or greater than the given threshold. The number of selected beam pairs may be defined as the metric standing for the corresponding cell. As described above, the 5G-NB may notify the UE of the threshold through the RRC message, or the like. Further, the UE may select the 5G-NB in which there is the largest number of beam pairs having the RSRP or the RSRQ equal to or greater than the threshold.

The method for determining metric standing for the corresponding cell is only an example and therefore other methods may also be used.

If the metric standing for the cell is derived based on the layer 3 filtering outputs based on each beam pair, the UE may use the derived metric to confirm the conditions for determining whether to perform the measurement reporting to the 5G-NB. For example, the UE may use the following conditions defined in the LTE.

Event A1: When the measurement information of the serving cell is larger than the threshold (serving becomes better than threshold).

Event A2: When the measurement information of the serving cell is smaller than the threshold (serving becomes worse than threshold).

Event A3: When the measurement information of neighbor cells is larger by offset than primary cell (PCell)/primary secondary cell (PSCell) measurement (neighbor becomes offset better than PCell/PSCell).

Event A4: When the measurement information of neighbor cells is larger than the threshold (neighbor becomes better than threshold).

Event A5: When the measurement information of PCell/PSCell is smaller than a first threshold and the measurement information of neighbor cells is larger than a second threshold (PCell/PSCell becomes worse than threshold1 and neighbor becomes better than threshold2).

Event A6: When the measurement information of neighbor cells is larger by offset than the measurement information of SCell (neighbor becomes offset better than SCell).

Referring to FIG. 7B, the 5G-NB may transmit the BRS while sweeping all the 5G-NB's beams and the UE may receive the BRS while sweeping all the UE's beams. Further, the UE may perform the per-beam pair layer 1 and layer 3 filtering. For example, the UE may generate BRS measurement samples 730, 740, and 750 measured by using a beam pair of 5G-NB's beam 4 and the UE's beam 1 at the sampling period interval and perform the layer 1 filtering and the layer 3 filtering on the generated BRS measurement samples. As such, the UE may filter the BRS measurement samples measured per beam pair and then derive the cell measurement information. At this time, the cell measurement information may be performed before and after the layer 1 filtering and before and after the layer 3 filtering and the content thereof will be described below.

Further, an embodiment of the present disclosure proposed operations based on other layer 1 filtering and other layer 3 filtering besides the operation of performing the per-beam pair layer 1 filtering and the layer 3 filtering.

Figure 8A:
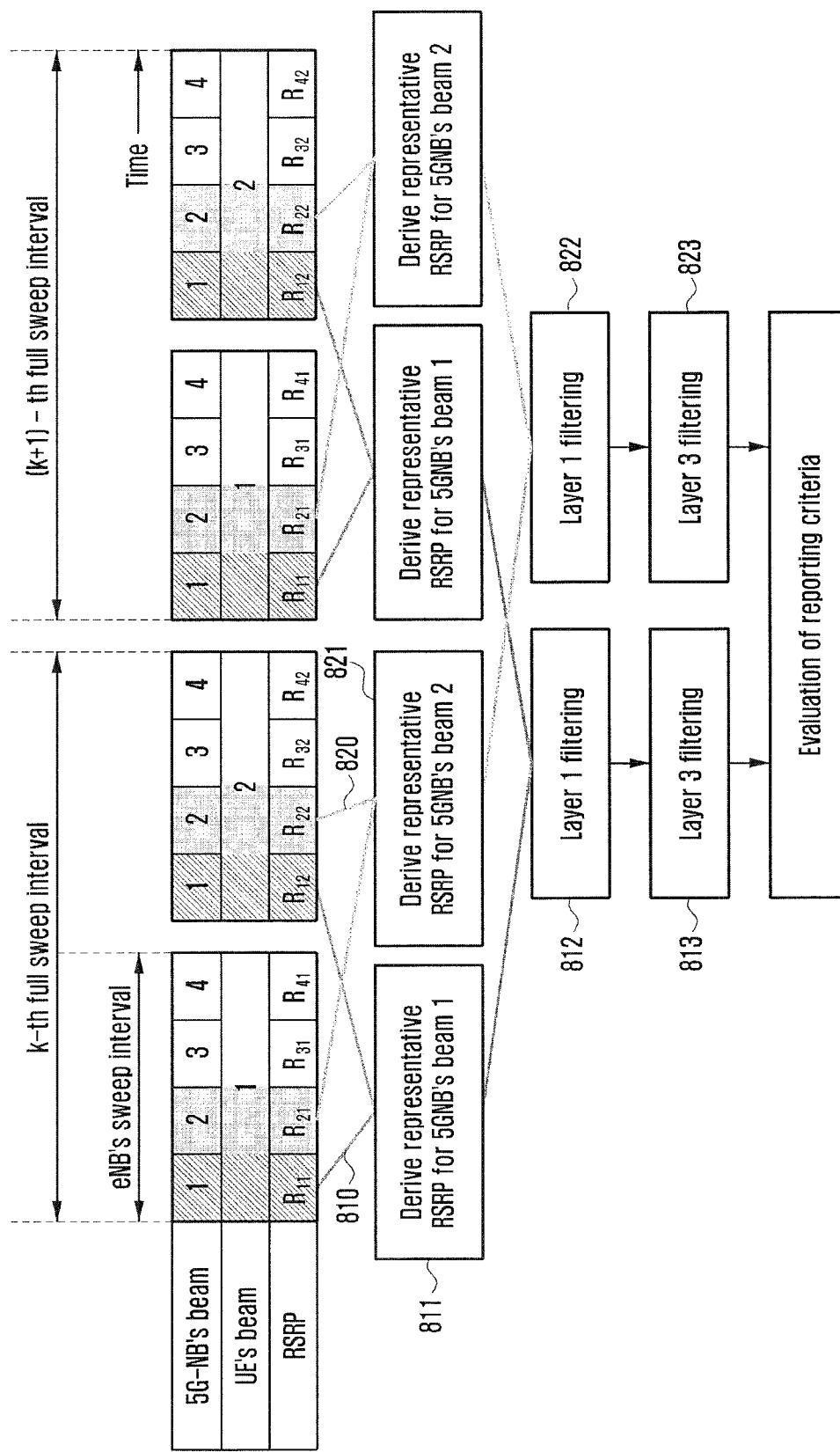
FIGS. 8A and 8B are diagrams illustrating a method for generating, by a UE, cell measurement information according to various embodiments of the present disclosure.
Figure 8B:
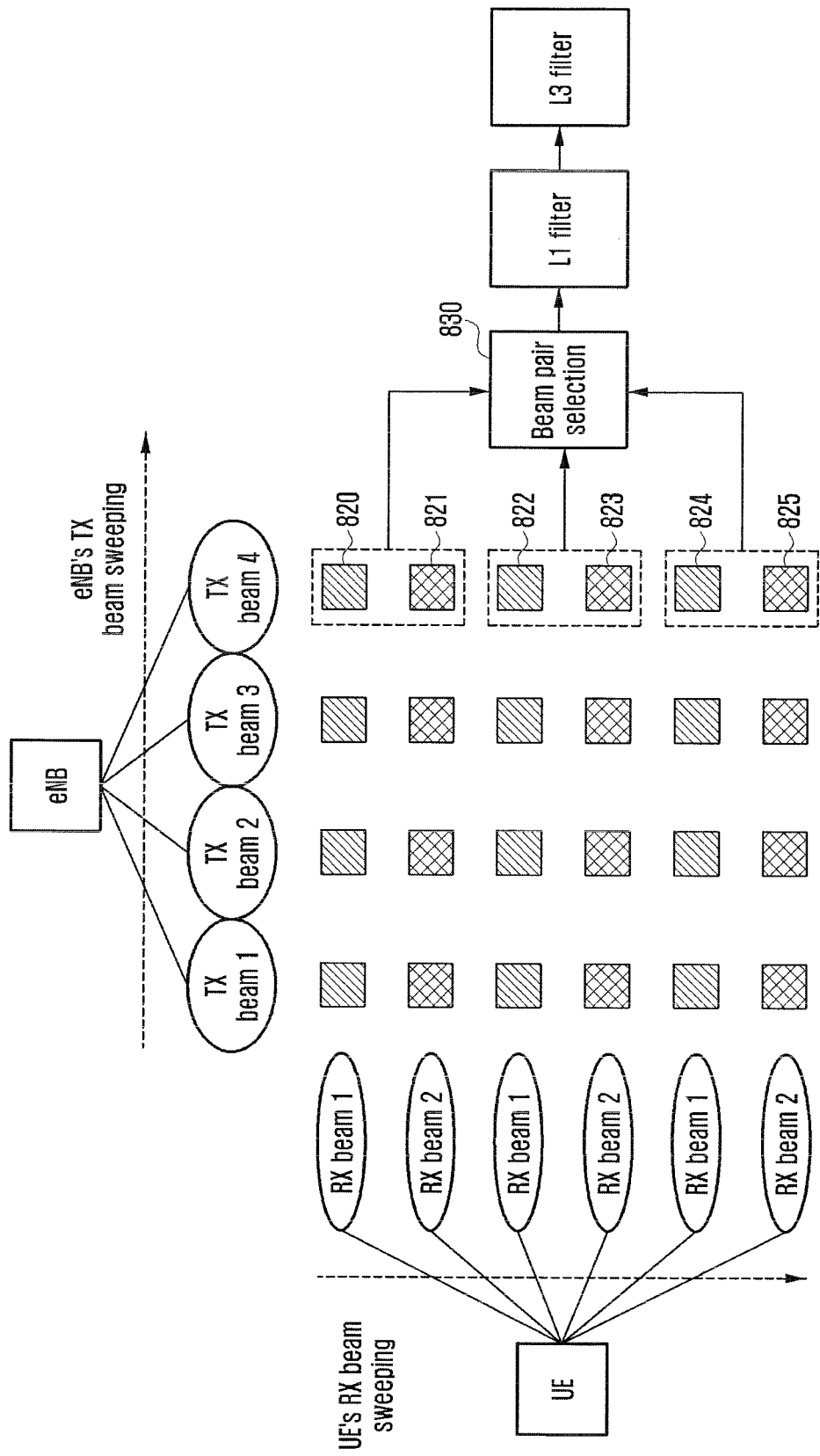

FIGS. 8A and 8B are diagrams illustrating a method for generating, by a UE, cell measurement information according to various embodiments of the present disclosure.

FIGS. 8A and 8B illustrate an operation of performing per-5G-NB's beam layer 1 filtering and layer 3 filtering independent of the UE's beam when the UE performs the layer 1 filtering and the layer 3 filtering.

Referring to FIG. 8A, the UE may perform the BRS measurement per beam pair to acquire BRS measurement samples 810 per beam pair. At this time, the BRS measurement sample may be an input value of the layer 1 filtering and may be called a layer 1 sample.

The UE may derive TX beam level measurement information 811 and 821 that are metric standing for each TX beam based on the BRS measurement samples (layer 1 sample) secured per beam pair.

For example, if the UE measures the 5G-NB's beam X using UE's beams Ya, Yb, and Yc, the UE may synthesize {XYa, XYb, XYc} that are the BRS measurement samples to derive the metric standing for the 5G-NB's beam X and if the UE measures the 5G-NB's beam X* using the UE's beams Ya, Yb, and Yc, the UE may synthesize {X*Ya, X*Yb, X*Yc} to derive the metric standing for the 5G-NB's beam X*.

Here, if the 5G-NB's beams X and X* are different, they may be processed independently. For example, the measurement value for the beam X* is not reflected at the time of deriving the metric standing for the beam X.

At this point, as the method for synthesizing {XYa, XYb, XYc, . . . } to derive metric standing for a 5G-NB's beam X, various methods may be considered.

The greatest RSRP or RSRQ among {XYa, XYb, XYc, . . . }

The mean (or sum) RSRP or RSRQ for N beam pairs in order having a large value among {XYa, XYb, XYc, . . . }

The mean (or sum) RSRP or RSRQ for all the beam pairs having the RSRP or the RSRQ equal to or greater than the threshold among {XYa, XYb, XYc, . . . }

Further, besides the foregoing method, other methods may also be possible

The UE uses the metric standing for each 5G-NB's beam as described above as the layer 1 filtering inputs to perform layer 1 filtering 812 and 822 and layer 3 filtering 813 and 823. Here, the method for performing layer 1 filtering and layer 3 filtering is the same described above and therefore the description thereof will be omitted.

When the UE performs the per-5G-NB's beam layer 1 filtering and the layer 3 filtering as described in an embodiment of the present disclosure, the results of the layer 3 filtering for each 5G-NB's beam may be acquired. Therefore, the UE may derive the cell measurement information that is the metric standing for the cell as follows based on the results of the layer 3 filtering.

The UE may select one 5G-NB's beam having the greatest RSRP or RSRQ among the results of the layer 3 filtering for all the 5G-NB's beams operated in each cell. Therefore, the UE may define the RSRP or the RSRQ of the selected 5G-NB's beam as the metric standing for the corresponding cell.

The UE may select N 5G-NB's beams in order of the RSRP or the RSRQ from largest to smallest among the results of the layer 3 filtering for all the 5G-NB's beams operated in each cell. Therefore, the UE may derive the mean (or sum) of the RSRP or the RSRQ of the selected N 5G-NB's beams and may define the derived means as the metric standing for the corresponding cell.

The UE may select all the 5G-NB's beams having the RSRP or the RSRQ equal to or greater than the given threshold among the results of the layer 3 filtering for all the 5G-NB's beams operated in each cell. Therefore, the UE may derive the mean (or sum) of the RSRP or the RSRQ of the selected 5G-NB's beams and may define the derived mean as the metric standing for the corresponding cell.

The UE may select all the 5G-NB's beams having the RSRP or the RSRQ equal to or greater than the given threshold among the results of the layer 3 filtering for all the 5G-NB's beams operated in each cell. Therefore, the UE may define the number of selected 5G-NB's beams as the metric standing for the corresponding cell. Further, the UE may transmit the number of 5G-NB's beams to the 5G-NB by including the number of 5G-NBs beams in the measurement report.

The method for determining metric standing for the corresponding cell is only an example and therefore other methods may also be used.

The UE may confirm the measurement reporting condition for confirming whether to perform the measurement reporting and the operation thereof is the same as above and therefore the additional description thereof will be omitted.

Referring to FIG. 8B, as described above, the 5G-NB may transmit the BRS while sweeping all the 5G-NB's beams and the UE may receive the BRS while sweeping all the UE's beams.

The UE may perform the BRS measurement per beam pair to generate the BRS measurement samples per beam pair and may derive the TX beam level measurement reporting per TX beam.

For example, the UE may generate BRS measurement samples 820, 822, and 824 using the beam pair of the 5G-NB's beam 4 and the UE's beam 1 at the sampling period interval and may generate BRS measurement samples 821, 823, and 825 using a beam pair of the 5G-NB's beam 4 and the UE's beam 2. Further, the UE may use the BRS measurement samples 820 to 825 to derive the measurement information on the 5G-NB's beam 4 (830).

The UE may use the TX beam level measurement information to derive the layer 1 filtering and the layer 3 filter and the UE may derive the cell measurement information.

At this time, the 5G-NB's level measurement information and the cell measurement information may be performed before and after the layer 1 filtering and before and after the layer 3 filtering and the content thereof will be described below.

Figure 9B:
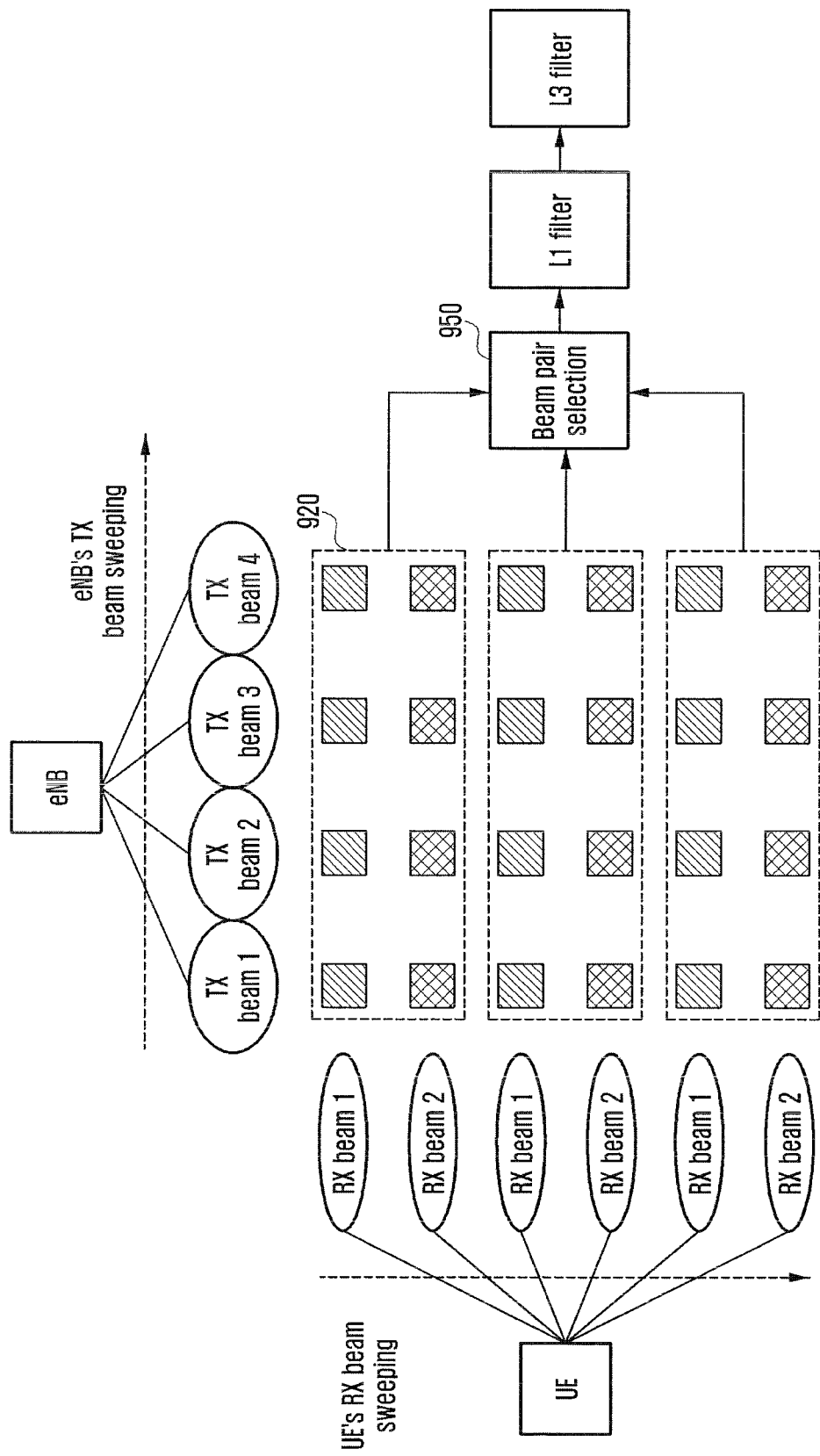

FIGS. 9A and 9B are diagrams illustrating a method for generating, by a UE, cell measurement information according to various embodiments of the present disclosure.

FIGS. 9A and 9B illustrate an operation of performing per-cell layer 1 filtering and layer 3 filtering without limiting the beam pair of the UE and the 5G-NB when the UE performs the layer 1 filtering and the layer 3 filtering.

Referring to FIGS. 8A and 8B, a method for performing, by a UE, per-5G-NB's beam layer 1 and layer 3 filtering is suggested.

Referring to FIG. 9A, the UE may perform the BRS measurement per beam pair to acquire BRS measurement samples (layer 1 sample) 910 per beam pair.

The UE may derive the representative metric standing for each cell 911 based on the BRS measurement samples (layer 1 sample) secured per beam pair.

For example, if the 5G-NB's beams Xa, Xb, and Xc are measured by the UE's beams Ya, Yb, and Yc, the UE may synthesize {XaYa, XaYb, XaYc, XbYa, XbYb, XbYc, XcYa, XcYb, XcYc} that are the BRS measurement samples to derive the representative metric standing for the cell 911.

At this point, as the method for synthesizing deriving {XaYa, XaYb, XaYc, XbYa, XbYb, XbYc, XcYa, XcYb, XcYc} to derive metric standing for a cell, various methods may be considered.

The greatest RSRP or RSRQ among {XaYa, XaYb, XaYc, XbYa, XbYb, XbYc, XcYa, XcYb, XcYc}

The mean (or sum) RSRP or RSRQ for N beam pairs in order having a large value among {XaYa, XaYb, XaYc, XbYa, XbYb, XbYc, XcYa, XcYb, XcYc}

The mean (or sum) RSRP or RSRQ for all the beam pairs having the RSRP or the RSRQ equal to or greater than the threshold among {XaYa, XaYb, XaYc, XbYa, XbYb, XbYc, XcYa, XcYb, XcYc}

Further, besides the foregoing method, other methods may also be possible.

The UE may use the metric standing for the cell described above as the layer 1 filtering inputs to perform layer 1 filtering 912 and layer 3 filtering 913. Here, the method for performing layer 1 filtering and layer 3 filtering is the same described above and therefore the description thereof will be omitted.

When the UE performs the per-cell layer 1 filtering and the layer 3 filtering as described in an embodiment of the present disclosure, the results of the layer 3 filtering for the cell may be acquired.

The UE may confirm the measurement reporting condition for confirming whether to perform the measurement reporting and the operation thereof is the same as above and therefore the additional description thereof will be omitted.

Referring to FIG. 9B, as described above, the 5G-NB may transmit the BRS while sweeping all the 5G-NB's beams and the UE may receive the BRS while sweeping all the UE's beams.

Referring to FIG. 9B, the UE may perform the BRS measurement per beam pair to generate the BRS measurement samples per beam pair and derive the representative metric for each cell.

For example, the UE may use the beam pair of the UE's beams 1 and 2 for the 5G-NB's beams 1-4 at the sampling period interval to generate the BRS measurement sample. Further, the UE may derive the representative metric for the cell in a BRS measurement sample 920 generated for the cell (950). The representative metric for the cell may mean the representative value for the BRS measurement sample for the cell generated using the BRS measurement sample generated for each beam pair as described above. The representative metric for the cell may mean various values, such as the L1 filtering input value for the cell and the L3 filtering input value for the cell depending on a location where the representative value for the cell is derived. In an embodiment of the present disclosure, the metric for the cell may mean the BRS measurement sample for the cell derived using the BRS measurement sample. More specifically, the UE may determine the BRS measurement sample for the cell using the method of any one of the sum, the mean, the weighted sum, and the weighted mean of the BRS measurement samples generated for the beam pair. The content is as the above.

The UE may use the derived metric to perform the layer 1 filtering and the layer 3 filtering and the UE may derive the cell measurement information by the above process. The content is as the above.

Figure 10A:
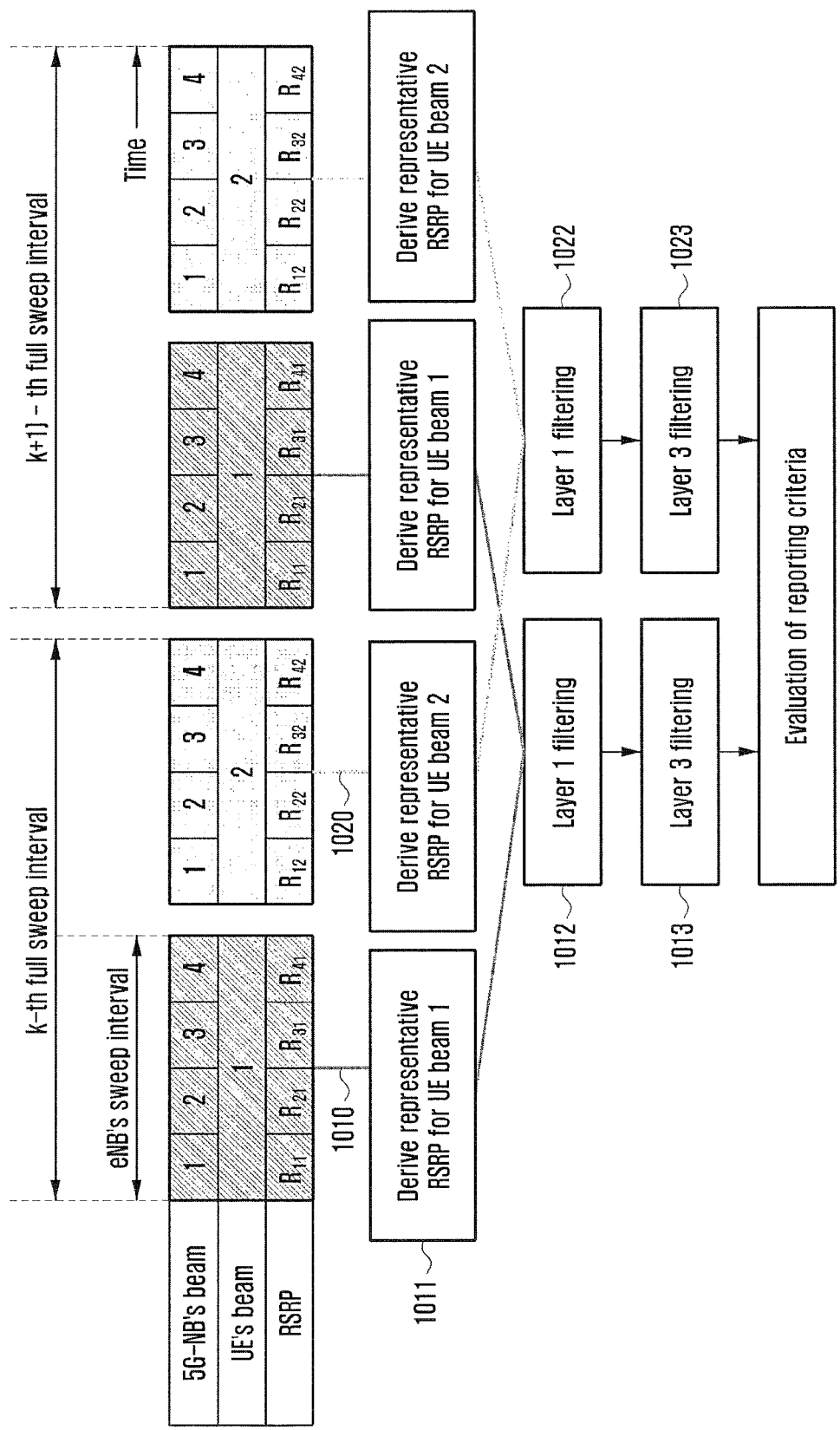
FIGS. 10A and 10B are diagrams illustrating a method for generating, by a UE, cell measurement information according to various embodiments of the present disclosure.
Figure 10B:
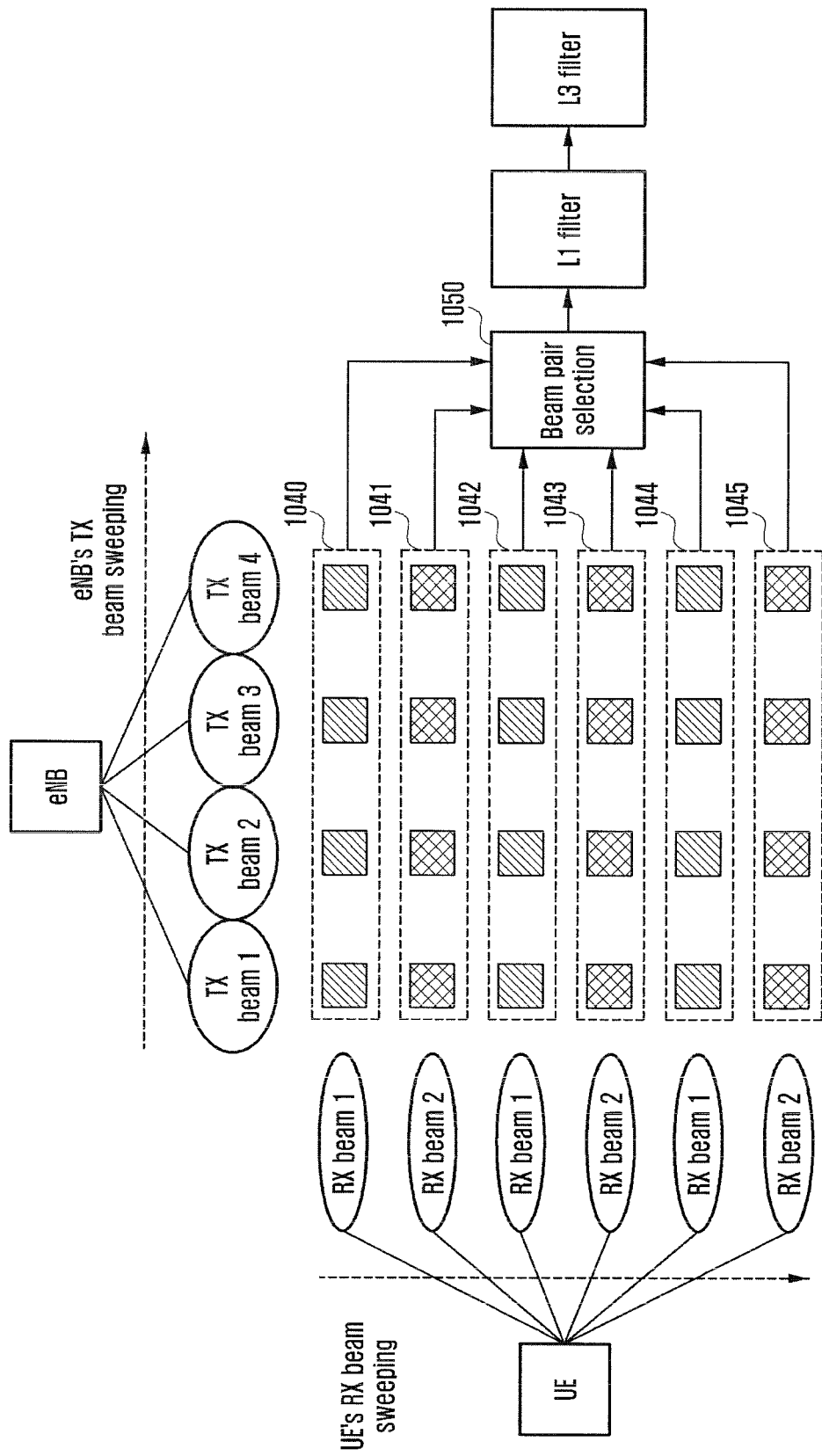

FIGS. 10A and 10B are diagrams illustrating a method for generating, by a UE, cell measurement information according to various embodiments of the present disclosure.

FIGS. 10A and 10B illustrate an operation of performing per-UE's beam layer 1 filtering and layer 3 filtering independent of the 5G-NB's beam when the UE performs the layer 1 filtering and the layer 3 filtering.

Referring to FIG. 10A, the UE may perform the BRS measurement per beam pair to acquire BRS measurement samples (layer 1 sample) 1010 per beam pair.

The UE may derive RX beam level measurement information that is metric standing for each UE's beam (i.e., 1011 for UE beam 1 and 1020 for UE beam 2) based on the BRS measurement samples (layer 1 sample) secured per beam pair.

For example, if the UE measures the UE's beams Xa, Xb, and Xc using the UE's beam Y, the UE may synthesize {XaY, XbY, XcY} to derive the metric standing for the UE's beam Y and if the UE measures the 5G-NB's beams Xa, Xb, and Xc using the UE's beam Y*, the UE may synthesize {XaY*, XbY*, XcY*} to derive the metric standing for the UE's beam Y*.

Here, if the UE's beams Y and Y* are different, they may be processed independently. For example, the measurement value for the beam Y* is not reflected at the time of deriving the metric standing for the beam Y.

At this point, as the method for synthesizing {XaY, XbY, XcY, ... } to derive metric standing for the UE's beam Y, various methods may be considered.

The greatest RSRP or RSRQ among {XaY, XbY, XcY, ... }

The mean (or sum) RSRP or RSRQ for N beam pairs in order having a large value among {XaY, XbY, XcY, ... }

The mean (or sum) RSRP or RSRQ for all the beam pairs having the RSRP or the RSRQ equal to or greater than the threshold among {XaY, XbY, XcY, ... }

Further, besides the foregoing method, other methods may also be possible.

The UE uses the metric standing for each UE's beam as described above as the layer 1 filtering inputs to perform layer 1 filtering 1012 and 1022 and layer 3 filtering 1013 and 1023. Here, the method for performing layer 1 filtering and layer 3 filtering is the same described above and therefore the description thereof will be omitted.

When the UE performs the per-UE's beam layer 1 filtering and the layer 3 filtering as proposed in an embodiment of the present disclosure, the results of the layer 3 filtering for each UE's beam may be acquired. Therefore, the UE may derive the cell measurement information that is the metric standing for the cell as follows based on the results of the layer 3 filtering.

The UE may select one UE's beam having the greatest RSRP or RSRQ among the results of the layer 3 filtering for all the UE's beams. Therefore, the UE may define the RSRP or the RSRQ of the selected UE's beam as the metric standing for the corresponding cell.

The UE may select N UE's beams in order of the RSRP or the RSRQ from largest to smallest among the results of the layer 3 filtering for all the UE's beams. The mean (or sum) of the RSRP or the RSRQ of the so selected N UE's beam pairs may be derived, which may be defined as the metric standing for the corresponding cell.

The UE may select all the UE's beams having the RSRP or the RSRQ equal to or greater than the given threshold among the results of the layer 3 filtering for all the UE's beams. Therefore, the UE may derive the mean (or sum) of the RSRP or the RSRQ of the selected UE's beams and define the derived mean as the metric standing for the corresponding cell.

The UE may select all the UE's beams having the RSRP or the RSRQ equal to or greater than the given threshold among the results of the layer 3 filtering for all the UE's beams. Therefore, the UE may define the number of selected UE's beams as the metric standing for the corresponding cell. Further, the UE may transmit the selected number of 5G-NB's beams by including the number of selected 5G-NB's beams in the measurement report. This may also be applied to other embodiments of the present disclosure.

The method for determining metric standing for the corresponding cell is only an example and therefore other methods may also be used.

The UE may confirm the measurement reporting condition for confirming whether to perform the measurement reporting and the operation thereof is the same as above and therefore the additional description thereof may be omitted.

Referring to FIG. 10B, as described above, the 5G-NB may transmit the BRS while sweeping all the 5G-NB's beams and the UE may receive the BRS while sweeping all the UE's beams.

The UE may perform the BRS measurement per beam pair to generate the BRS measurement samples per beam pair and may derive the UE's beam level measurement reporting per UE's beam.

For example, the UE may generate BRS measurement samples 1040, 1042, and 1044 using the beam pair of the UE's beam 1 for the 5G-NB's beams 1 to 4 at the sampling period interval and may generate BRS measurement samples 1041, 1043, and 1045 using the beam pair of the UE's beam. Further, the UE may use the BRS measurement sample to derive the measurement information on the UE's beam 1 and the measurement information on the UE's beam, respectively (1050).

The UE may use the derived measurement information to derive the layer 1 filtering and the layer 3 filter and the UE may derive the cell measurement information. At this time, the 5G-NB's level measurement information and the cell measurement information may be performed before and after the layer 1 filtering and before and after the layer 3 filtering and the content thereof will be described below.

In an embodiment of the present disclosure, the UE performs the BRS measurement per beam pair, and therefore as described above, may derive the cell measurement information that is the metric standing for the cell after the layer 1 filtering and the layer 3 filtering. The UE may use the so derived metric to confirm the conditions for confirming whether to perform the measurement reporting.

An entering condition for performing the measurement reporting may include, for example, the case in which the signal strength of the target 5G-NB is larger for a specific interval as a comparison result of the signal strength of the serving 5G-NB with the target 5G-NB. At this time, the specific interval may be called measurement reporting related time-to-trigger (TTT).

Meanwhile, since the 5G-NB periodically transmits the BRS, the 5G-NB may continuously update the results of the layer 3 filtering. Therefore, although the entering condition for performing the measurement reporting is satisfied, the metric standing for the cell for the transmission time interval (TTI) may be changed or the results of the layer 3 filtering may be changed. At this time, an operation of determining whether to maintain or initialize the TTT is required.

For this purpose, in an embodiment of the present disclosure, the UE may be operated as follows.

1. When the metric (for example, beam pair showing the greatest RSRP, 5G-NB's beam showing the greatest RSRP, UE's beam showing the greatest RSRP, or the like) standing for the cell for the TTI is changed.

When the changed beam pair or the results (RSRP/RSRQ) of the layer 3 filtering of the 5G-NB's beam or the UE's beam is applied to the entering condition for the measurement reporting that triggers the currently operating TTT, if the entering condition is still satisfied, the UE may maintain the TTT.

Or, when the changed beam pair or the results (RSRP/RSRQ) of the layer 3 filtering of the 5G-NB's beam or the UE's beam is applied to the entering condition for the measurement reporting that triggers the currently operating TTT, if the entering condition is still satisfied, the state in which the TTT is triggered is maintained but a timer value is initialized, and as a result the TTT newly starts.

When the changed beam pair or the results (RSRP/RSRQ) of the layer 3 filtering of the 5G-NB's beam or the UE's beam is applied to the entering condition for the measurement reporting that triggers the currently operating TTT, if the corresponding leaving condition is satisfied, the UE may confirm whether the corresponding leaving condition is satisfied for the newly starting TTT.

Or, when the changed beam pair or the results (RSRP/RSRQ) of the layer 3 filtering of the 5G-NB's beam or the UE's beam is applied to the entering condition for the measurement reporting that triggers the currently operating TTT, the UE immediately stops the TTT when the leaving condition is satisfied.

When the changed beam pair or the results (RSRP/RSRQ) of the layer 3 filtering of the 5G-NB's beam or the UE's beam is applied to the entering condition for the measurement reporting that triggers the currently operating TTT, if the UE does not satisfy both of the entering condition and the leaving condition (the situation may occur due to hysteresis), the state in which the TTT is triggered is maintained but the timer value is initialized, and as a result the TTT may newly start.

Or, when the changed beam pair or the results (RSRP/RSRQ) of the layer 3 filtering of the 5G-NB's beam or the UE's beam is applied to the entering condition for the measurement reporting that triggers the currently operating TTT, if the UE does not satisfy both of the entering condition and the leaving condition (the situation may occur due to hysteresis), the TTT may be maintained.

Or, when the changed beam pair or the results (RSRP/RSRQ) of the layer 3 filtering of the 5G-NB's beam or the UE's beam is applied to the entering condition for the measurement reporting that triggers the currently operating TTT, if the UE does not satisfy both of the entering condition and the leaving condition (the situation may occur due to hysteresis), the TTT may immediately stop.

An embodiment of the present disclosure proposes various methods for RRM measurement performed in an RRC layer. More specifically, (a) beam pair-specific filtering, (b) TX beam-specific filtering, (C) cell-specific filtering, (d) RX beam-specific filtering are proposed.

Hereinafter, in the method, the embodiment of the method for determining cell measurement information will be described.

Further, the 5G-NB may use a measurement configuration information element, or the like of a configuration information (for example, RRC connection reconfiguration) message to instruct the UE to perform the RRM measurement using which of the methods. Further, the parameters required for each method using the same message and information element, or the like may also be notified to the UE. The content will be described below.

FIGS. 11A, 11B, 11C, and 11D are diagrams illustrating a method for generating, by a UE, cell measurement information by performing per-beam pair filtering according to various embodiments of the present disclosure.

Figure 11A:
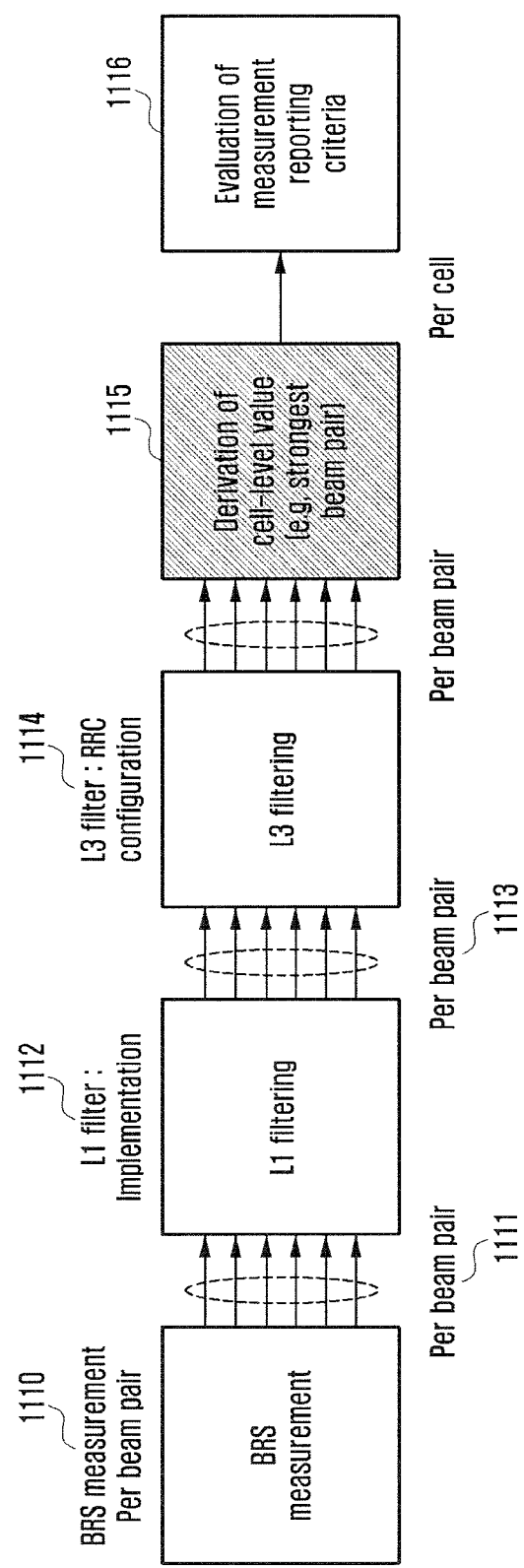

Referring to FIG. 11A, the 5G-NB may instruct the UE to perform beam pair-specific filtering.

At this time, the 5G-NB may instruct the UE to perform the beam pair-specific filtering on several beam pairs (or on at least several beam pairs). Further, the 5G-NB may notify the UE of an L3 filtering coefficient, or the like required for the layer 3 filtering.

Referring FIG. 11A, when the UE is instructed to perform the filtering from the 5G-NB, the UE may measure (1110) the BRSs per beam pair to generate the BRS measurement sample and may input (1111) the generated BRS measurement samples to a per-beam pair L1 filter to perform (1112) the L1 filtering. Further, each of the UEs may input (1113) the L1 filtering results of the beam pair to an L3 filter to perform (1114) the L3 filtering. At this time, the UE may use the L3 filtering coefficient received from the 5G-NB through the RRC configuration to perform the L3 filtering.

Therefore, the L3 filtering outputs are generated as many as the number of beam pairs and therefore the 5G-NB may instruct the UE to perform a method for deriving cell measurement information that is a cell-level value. As the method for deriving cell measurement information, as described above, (a) a maximum value, a sum, a weighted sum, or a weighted mean of L3 filter outputs, (b) a sum, a mean, a weighted sum, or a weighted mean of upper k L3 filter outputs in order of the larger value of the L3 filter outputs, and (c) a maximum value, a sum, a mean, a weighted sum, or a weighted mean of the L3 filter outputs equal to or greater than the threshold, or the like may be used. If the weighted sum (or weighted mean) is used, the 5G-NB may notify the UE of the weight. For example, when the third largest L3 filter output is RSRPi, the weighted sum may be represented like w1RSRP1+w2RSRP2+w3RSRP3+ . . . , in which the 5G-NB may notify the UE of wi. At this point, the 5G-NB may in advance notify the UE of the method for deriving cell measurement information and the information (k value, threshold, or the like) used to derive the cell measurement information through the RRC message, or the like. The 5G-NB may transmit the information to the UE by including the information in the configuration information transmitted through the RRC message. This may also be applied to other embodiments.

Therefore, the UE may derive (1115) the cell measurement information according to the method received from the 5G-NB and confirm (1116) whether to satisfy the measurement reporting criteria for each cell to report the cell measurement information to the 5G-NB.

Meanwhile, in the case of the beam pair-specific filtering per beam pair, the UE may generate the cell measurement information after the L1 filtering and the L3 filtering.

Referring to FIG. 11B, each of the UEs may perform the per-beam pair L1 filtering then use the L1 filtering outputs generated per beam pair to determine the L1 filtering outputs (or L3 filtering inputs for the cell) for the cell. In this case, the L1 filtering outputs for the cell may be determined by the sum, the mean, the weighted mean, and the weighted sum of the L1 filtering outputs for each beam pair, the sum, the mean, and the weighted mean of some of the L1 filtering outputs for each beam pair, or the like. The content is the same as the foregoing methods and therefore will be omitted below.

Therefore, the UE may determine the L1 filtering outputs for the cell and perform the L3 filtering on the determined L1 filtering outputs to generate the cell measurement information. The UE may confirm whether to satisfy the measurement reporting criteria for each cell to report the cell measurement information to the 5G-NB.

Figure 11C:
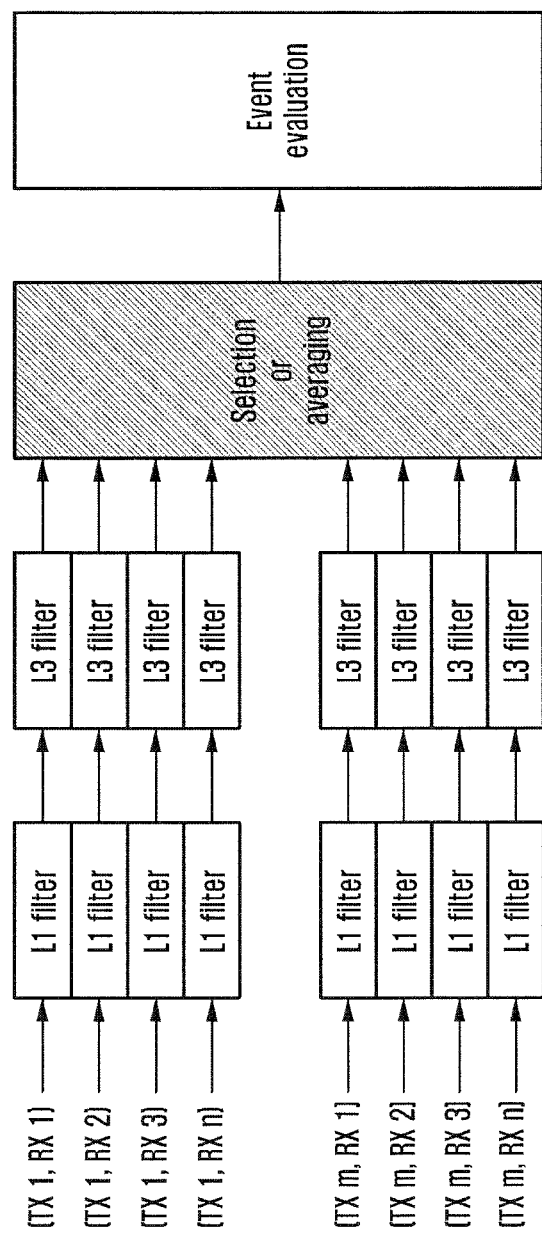

Meanwhile, referring to FIG. 11C, each of the UEs may perform the per-beam pair L1 filtering and then perform the L3 filtering on the L1 filtering outputs generated per beam pair. Further, the UE may use the L3 filtering outputs generated per beam pair to determine the cell measurement information. The method is the same as the foregoing methods and therefore will be omitted below.

At this time, one of the methods for deriving cell measurement information (cell representative value), the weighted sum of the L1 filter outputs or the L3 filter outputs may be used and the content thereof will be described with reference to FIG. 11D.

Figure 11D:
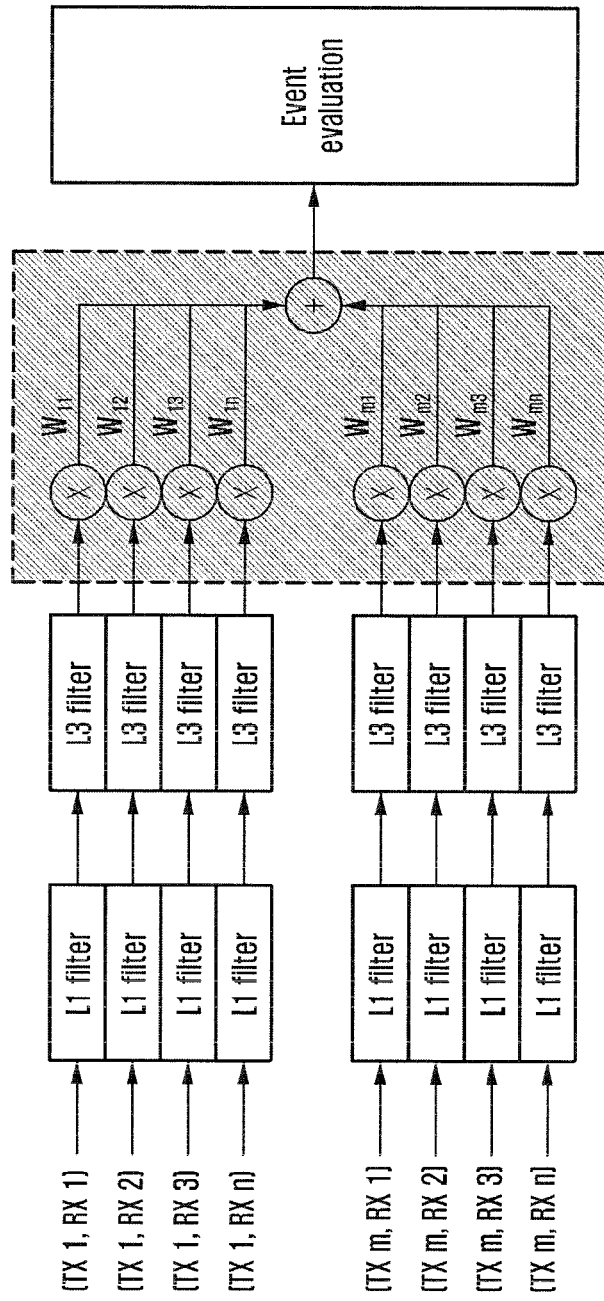

Referring to FIG. 11D, the UE may perform the weighted sum of the L3 filtering outputs generated per beam pair. The 5G-NB may determine a weight wij used at the time of performing the weighted sum to notify the UE of the determined weight wij through the RRC signaling. Meanwhile, the present drawing describes, by way of example, the case in which the weighted sum is performed after the L3 filtering, but as illustrated in FIG. 11B, the UE may use the method described in the present drawing even when the L1 filtering outputs for the cell are determined.

FIGS. 12A, 12B, 12C, 12D, and 12E are diagrams illustrating a method for generating, by a UE, beam measurement information by performing TX beam-specific filtering according to various embodiments of the present disclosure.

Figure 12A:
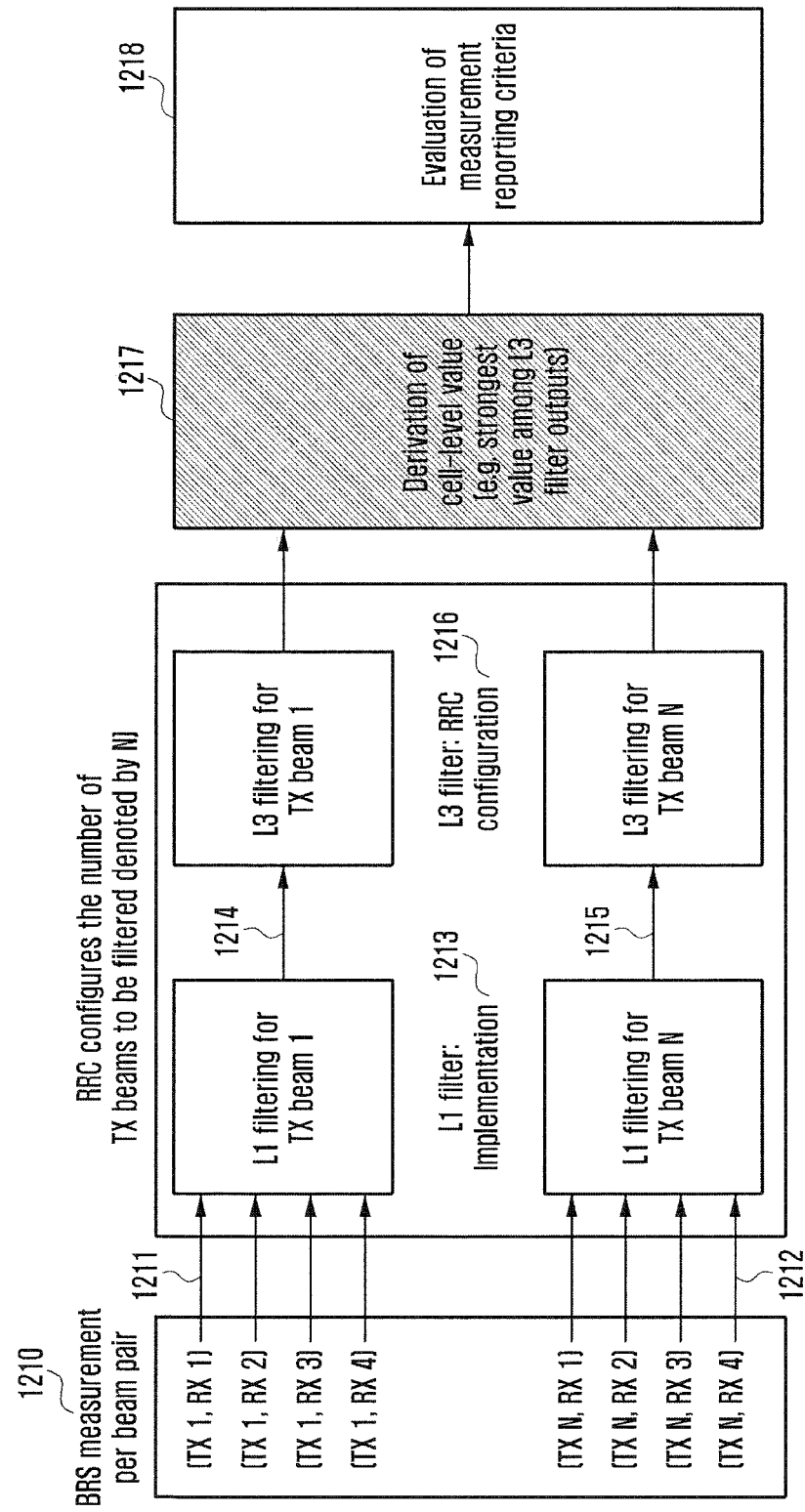
FIGS. 12A, 12B, 12C, 12D, and 12E are diagrams illustrating a method for generating, by a UE, beam measurement information by performing transmitter (TX) beam-specific filtering according to various embodiments of the present disclosure.

Referring to FIG. 12A, the 5G-NB may instruct the UE to perform TX beam-specific filtering.

At this time, the 5G-NB may instruct the UE to perform the TX beam-specific filtering on several TX beams (or on at least several TX beams or at most several TX beams). Further, the 5G-NB may notify the UE of the L3 filtering coefficient, or the like required for the layer 3 filtering.

Referring FIG. 12A, when the UE is instructed to perform the TX beam-specific filtering from the 5G-NB, the UE may measure (1210) the BRSs per beam pair to generate the BRS measurement sample and may input (1211, 1212) the generated BRS measurement samples to the per-beam pair L1 filter to perform (1213) the L1 filtering. At this time, the UE has to know the number of TX beams and as described above, the 5G-NB may notify the UE of the number of TX beams through the RRC signaling.

Further, each of the UEs may input (1214, 1215) the L1 filtering results of each of the TX beams to the L3 filter to perform (1216) the L3 filtering. At this time, the UE may use the L3 filtering coefficient received from the 5G-NB through the RRC configuration to perform the L3 filtering.

Therefore, the L3 filtering outputs are generated as many as the number of 5G-NB's beams and therefore the 5G-NB may instruct the UE to perform the method for deriving cell measurement information (cell-level value). At this time, as the method for deriving cell measurement information, (a) the maximum value, the sum, the weighted sum, or the weighted mean of L3 filter outputs, (b) the sum, the mean, the weighted sum, or the weighted mean of upper k L3 filter outputs in order of the larger value of the L3 filter outputs, and (c) the maximum value, the sum, the mean, the weighted sum, or the weighted mean of the L3 filter outputs equal to or greater than the threshold, or the like may be used. Further, as the method for deriving cell measurement information, a mean, or the like of the beams within the specific value (X dB) from the maximum value may be used.

If the weighted sum (or weighted mean) is used, the 5G-NB may notify the UE of the weight. For example, when the third largest L3 filter output is $RSRP_i$, the weighted sum may be represented like $w1RSRP1+w2RSRP2+w3RSRP3+\ldots$, in which the 5G-NB may notify the UE of $w_i$.

Further, the 5G-NB may instruct the UE to perform the measurement for generating the inputs of the L1 filter on a specific TX beam i using at least some RX beams.

Further, the 5G-NB may instruct the UE to perform the method for generating outputs of an L1 filter for a specific TX beam i. As the possible method, (a) a maximum value, a sum, a mean, a weighted sum, or a weighted mean for an L1 filter input, (b) a sum, a mean, a weighted sum, or a weighted mean for upper k L1 filter inputs in order of the larger value of the L1 filter inputs, (c) a maximum, a sum, a mean, a weighted sum, or a weighted mean for the L1 filter inputs equal to or greater than the threshold, or the like may be used. If the weighted sum (or weighted mean) is used, the 5G-NB may notify the UE of the weight. For example, when the third largest L3 filter output is $RSRP_i$, the weighted sum may be represented like $w1RSRP1+w2RSRP2+w3RSRP3+\ldots$, in which the 5G-NB may notify the UE of $w_i$.

Therefore, the UE may derive (1217) the cell measurement information according to the method received from the 5G-NB and confirm (1218) whether to satisfy the measurement reporting criteria for each cell to report the cell measurement information to the 5G-NB.

Meanwhile, in the case of the TX beam-specific filtering, a portion deriving the 5G-NB' beam level measurement information that is the representative value of each TX beam may be divided into before the L1 filtering, after the L1 filtering, and after the L3 filtering.

Figure 12B:
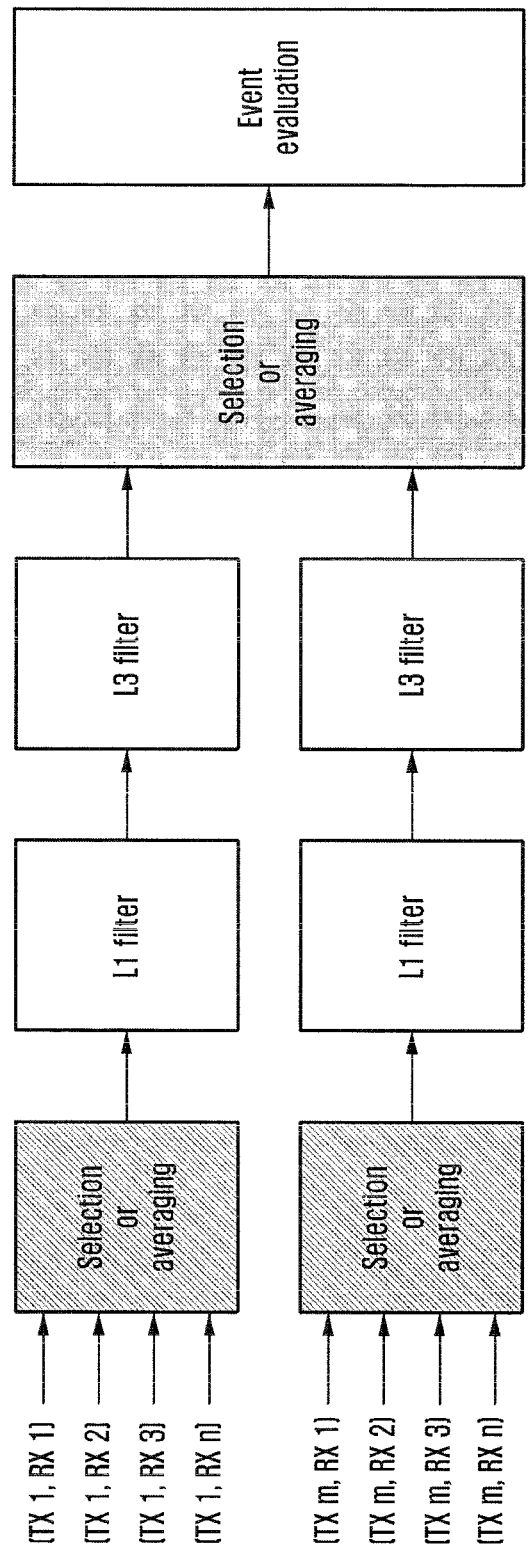

Referring to FIG. 12B, the UE may determine the L1 filtering inputs for each TX beam for the BRS measurement samples generated per beam pair. At this time, the method for generating L1 filtering inputs for each TX beam may use the foregoing methods and therefore the description thereof will be omitted below.

Therefore, the UE may determine the L1 filtering inputs for each TX beam and perform the L1 filtering and the L3 filtering on each of the determined L1 filtering inputs to generate the L3 filtering outputs. Therefore, the L3 filtering outputs may be generated as many as the number of TX beams and the UE may use the foregoing methods to determine the cell measurement information.

Figure 12C:
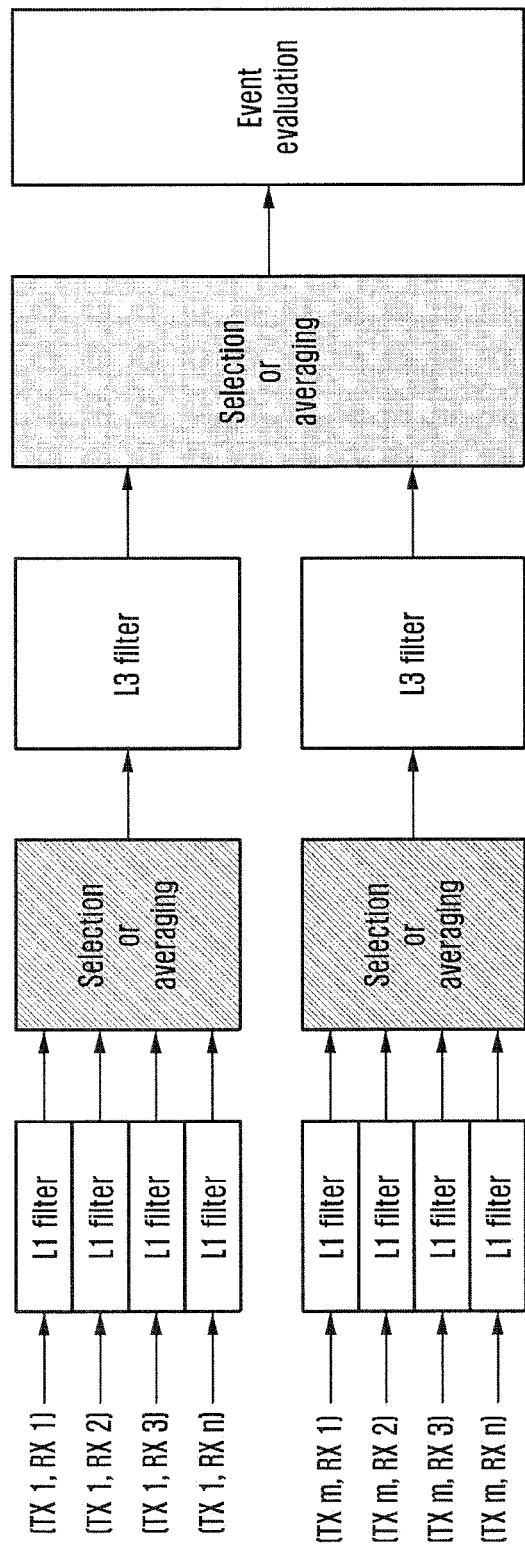

Meanwhile, referring to FIG. 12C, each of the UEs may perform the per-beam pair L1 filtering and then use the L1 filtering outputs generated per beam pair to determine the L1 filtering outputs for each TX beam. At this time, the L1 filtering outputs for each TX beam may be determined by the methods, such as the sum, the mean, the weighted mean, and the weighted sum of the L1 filtering outputs and the sum, the mean, the weighted mean, and the weighted sum of some of the L1 filtering outputs. The content is the same as the foregoing methods and therefore will be omitted below.

Therefore, the UE may determine the L1 filtering outputs for each TX beam and perform the L3 filtering on each of the determined L1 filtering outputs to generate the L3 filtering outputs. At this point, the representative values of the L1 filtering outputs generated for each TX beam may suffer from the L3 filtering, and therefore the L3 filtering outputs may be generated as many as the number of TX beams. Therefore, the UE may use the foregoing methods to determine the cell measurement information.

Figure 12D:
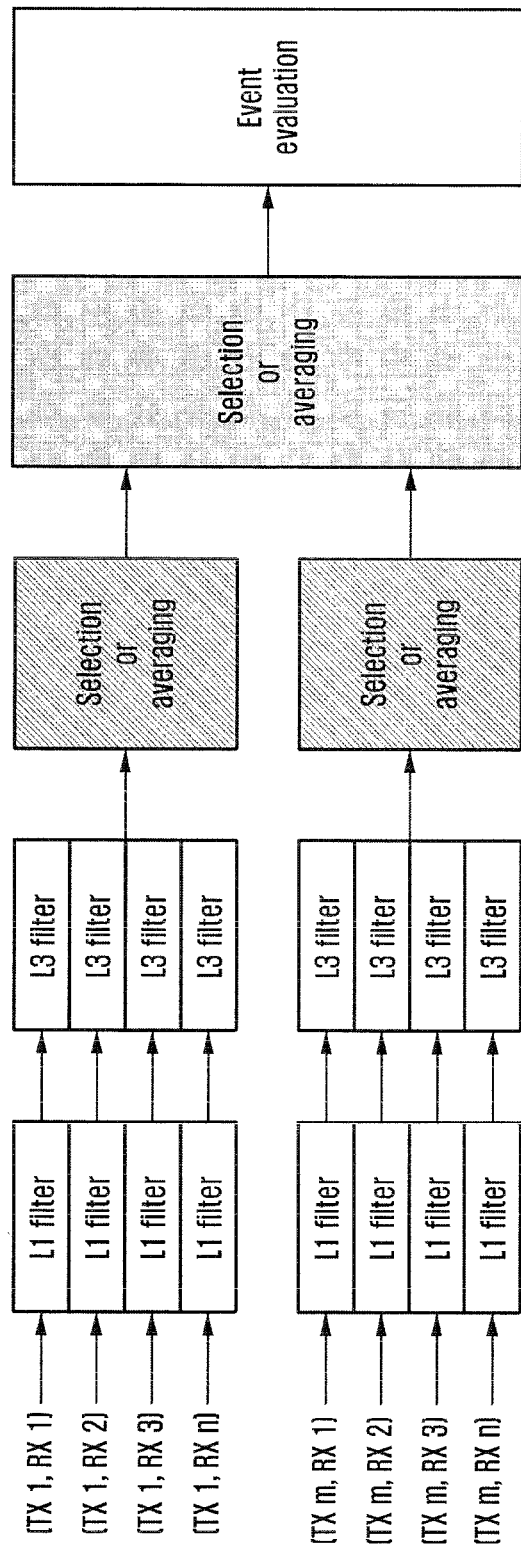

Meanwhile, referring to FIG. 12D, each of the UEs may perform the per-beam pair L1 filtering and then perform the L3 filtering on the L1 filtering outputs generated per beam pair. Further, the UE may use the L3 filtering outputs generated per beam pair to determine the L3 filtering outputs for each 5G-NB's. The method for determining L3 filtering outputs for each TX beam is the same as the foregoing methods and therefore will be omitted below.

Therefore, the L3 filtering outputs for each TX beam may be generated as many as the number of TX beams and the UE may use the foregoing methods to determine the cell measurement information.

In an embodiment of the present disclosure, the L1 filtering inputs for each TX beam, the L1 filtering outputs for each TX beam, and the L3 filtering outputs for each TX beam may be called the TX beam level measurement information.

At this point, as one of the method for deriving TX beam level measurement information that is the representative value of the TX beam, the weighted sum of the inputs of the L1 filter and the outputs of the L1 filter or the L3 filter may be used and the content thereof will be described with reference to FIG. 12E.

Figure 12E:
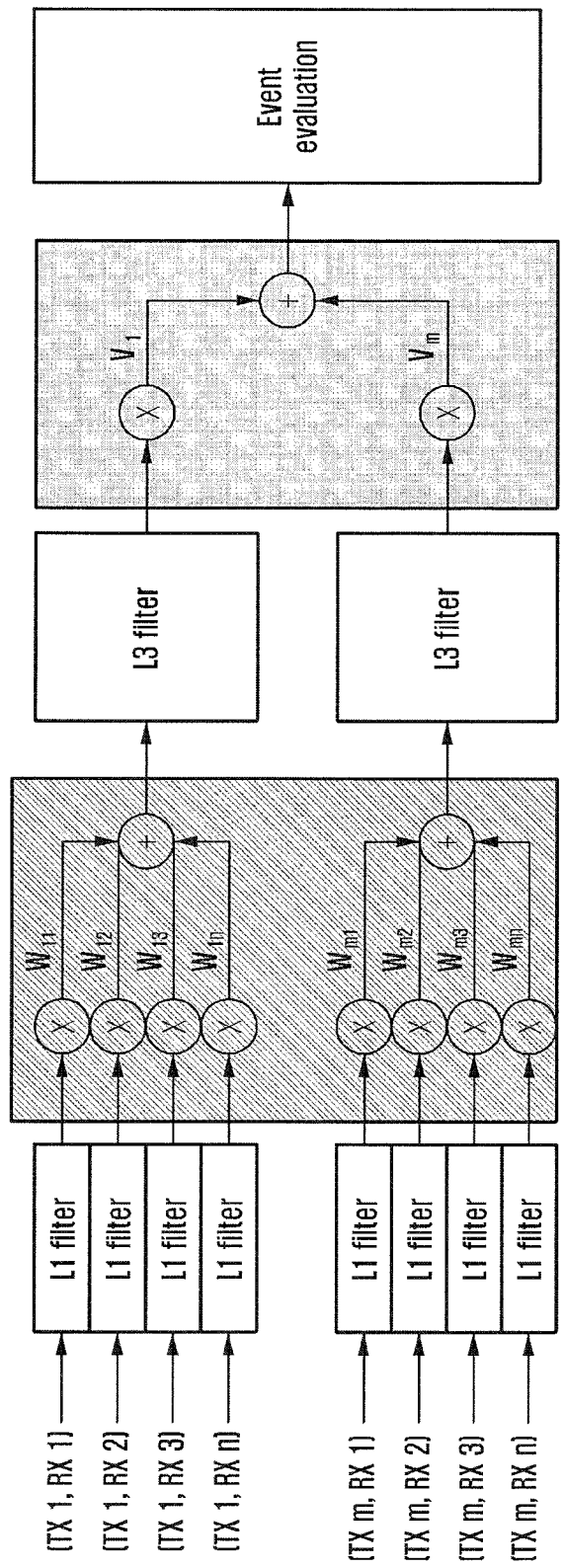

Referring to FIG. 12E, the UE may perform the weighted sum of the L1 filtering inputs, the L1 filtering outputs, or the L3 filtering outputs generated per TX beam. The 5G-NB may determine a weight wij used at the time of performing the weighted sum to notify the UE of the determined weight wij through the RRC signaling.

Further, the portion deriving the cell measurement information that is the representative value of the cell targets the L3 filter outputs after the L3 filtering. Here, one of the methods for deriving a representative value of a cell, the weighted sum of the outputs of the L3 filter and the representative values of the TX beam may be used. The 5G-NB may determine a weight vi used at the time of performing the weighted sum to notify the UE of the determined weight wij through the RRC signaling. Meanwhile, in the present drawing, the method for determining representative values of L1 filtering outputs for each TX beam after L1 filtering is described by way of example, but even before the L1 filtering and after the L3 filtering, the method described in the present drawing may be used.

Figure 13B:
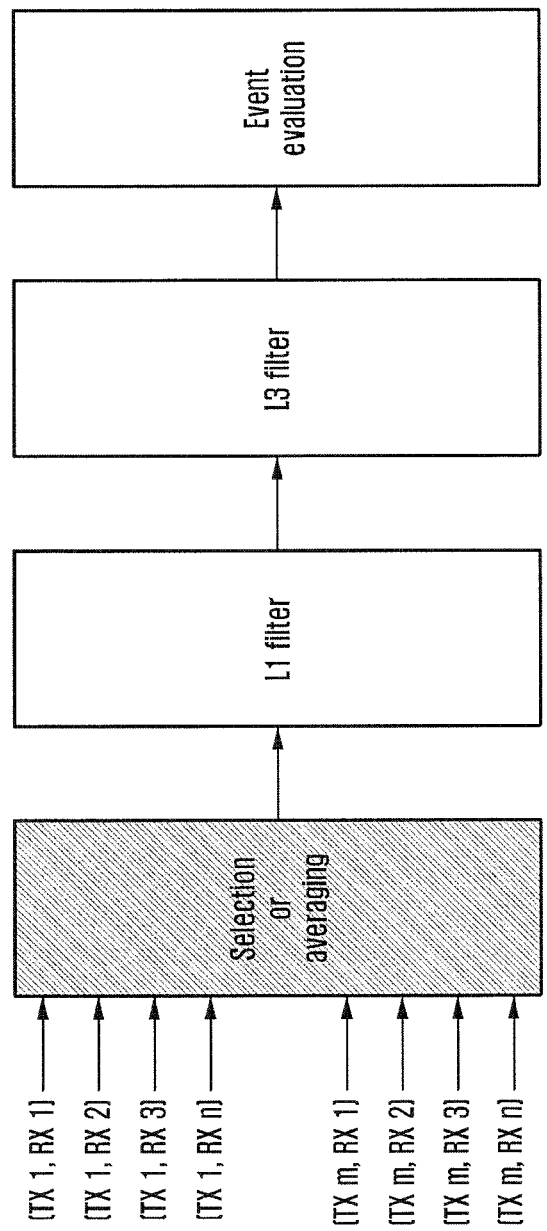

FIGS. 13A and 13B are diagrams illustrating a method for generating, by a UE, beam measurement information by performing per-cell filtering according to various embodiments of the present disclosure.

Referring to FIG. 13A, the 5G-NB may instruct the UE to perform cell-specific filtering.

At this point, the 5G-NB may instruct the UE to perform the cell-specific filtering based on the reflection of the BRS measurement results based on several beam pairs (or reflection of the BRS measurement results based on at least several beam pairs) Further, the 5G-NB may notify the UE of the filtering coefficient, or the like required for the layer 3 filtering.

Referring to FIG. 13A, when the UE is instructed to perform the cell-specific filtering from the 5G-NB, the UE may measure (1310) the BRSs per beam pair to generate the BRS measurement samples and determine (1320) the L1 filtering inputs for each cell. At this point, the 5G-NB may instruct the UE to perform the method for deriving L1 filtering inputs for each cell that is the cell-level value. As the method for determining L1 filtering inputs for each cell, as described above, (a) the maximum value, the sum, the mean, the weighted sum, or the weighted mean of the BRS measurement results based on the beam pair, (b) the sum, the mean, the weighted sum, or the weighted mean of the BRS measurement results based on the upper k beam pairs in order of the larger value, and (c) the maximum value, the sum, the mean, the weighted sum, or the weighted mean of the BRS measurement results based on the beam pair equal to or greater than the threshold, or the like may be used. If the weighted sum (or weighted mean) is used, the 5G-NB may notify the UE of the weight. For example, when the third largest L3 filter output is $RSRP_i$, the weighted sum may be represented like $w1RSRP1+w2RSRP2+w3RSRP3+\ldots$, in which the 5G-NB may notify the UE of wi.

The UE determining the L1 filtering inputs for each cell may input the per-cell metric to the L1 filter to perform (1330) the L1 filtering and input the L1 filtering results to the L3 filter to perform the L3 filtering (1340). At this time, the UE may use the L3 filtering coefficient received from the 5G-NB through the RRC configuration to perform the L3 filtering.

Further, the UE may generate the cell measurement information based on the L3 filtering and confirm whether to satisfy the measurement reporting criteria per cell to report the beam measurement information to the 5G-NB (1350).

Referring to FIG. 13B, the UE may measure the BRSs per beam pair to generate the BRS measurement samples and use the BRS measurement samples to determine the L1 filtering inputs for each cell. The UE may use the L1 filtering inputs derived per cell to perform the L1 filtering and the L3 filtering. The content is the same as above and therefore will be omitted below.

FIGS. 14A, 14B, 14C, and 14D are diagrams illustrating a method for generating, by a UE, beam measurement information by performing RX beam-specific filtering according to various embodiments of the present disclosure.

Figure 14A:
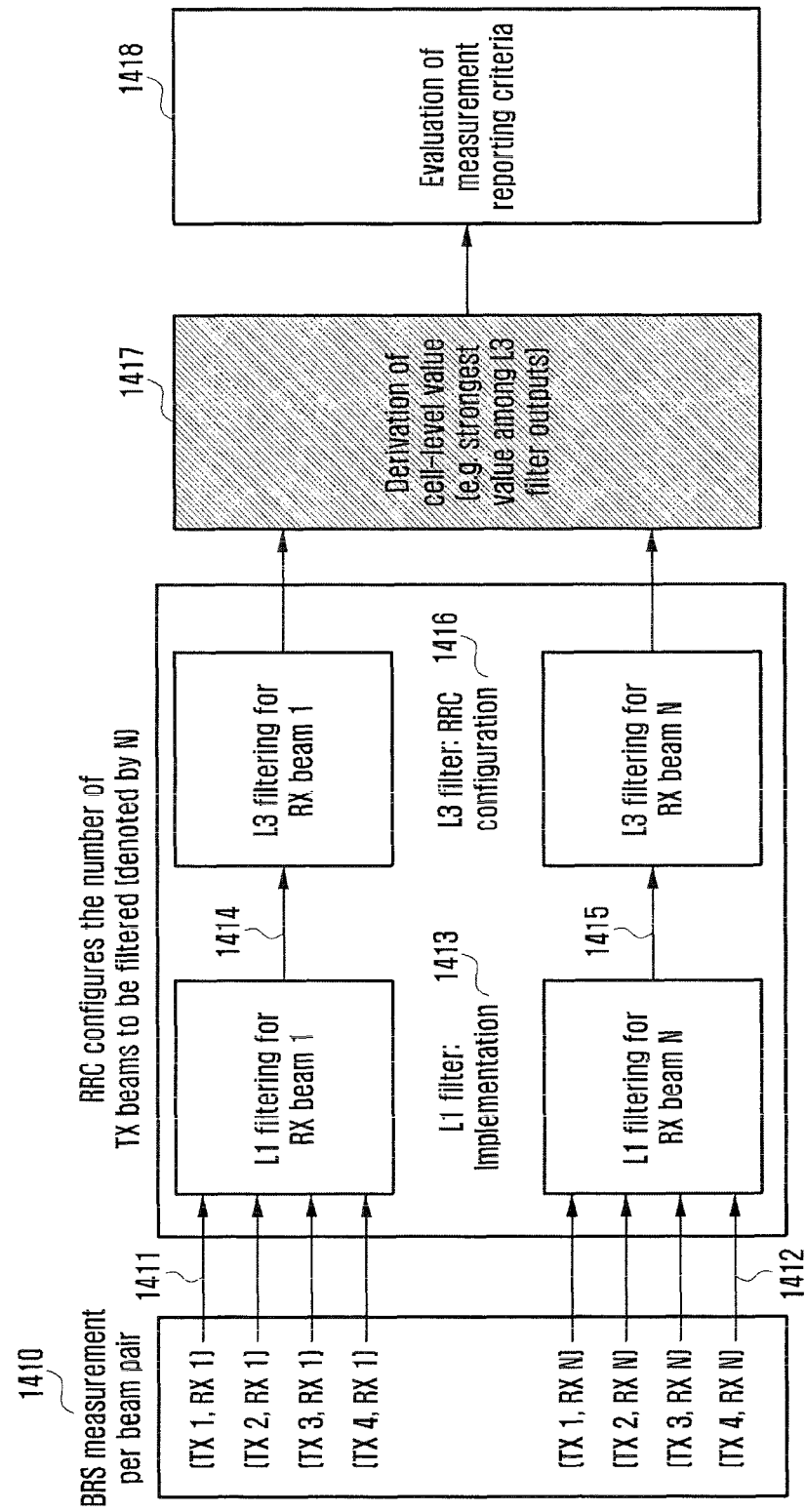
FIGS. 14A, 14B, 14C, and 14D are diagrams illustrating a method for generating, by a UE, beam measurement information by performing receiver (RX) beam-specific filtering according to various embodiments of the present disclosure.

Referring to FIG. 14A, the 5G-NB may instruct the UE to perform RX beam-specific filtering.

At this time, the 5G-NB may instruct the UE to perform the RX beam-specific filtering on several RX beams (or on at least several RX beams). Further, the 5G-NB may notify the UE of the L3 filtering coefficient, or the like required for the layer 3 filtering.

Referring FIG. 14A, when the UE is instructed to perform the RX beam-specific filtering from the 5G-NB, the UE may measure (1410) the BRSs per beam pair to generate the BRS measurement sample and may input (1411, 1412) the generated BRS measurement samples to the per-RX beam L1 filter to perform (1413) the L1 filtering.

Further, each of the UEs may input (1414, 1415) the L1 filtering results of each RX beam to the L3 filter to perform (1416) the L3 filtering. At this time, the UE may use the L3 filtering coefficient received from the 5G-NB through the RRC configuration to perform the L3 filtering.

Therefore, the L3 filtering outputs are generated as many as the number of the UEs and therefore the 5G-NB may instruct the UE to perform the method for deriving a cell-level value. At this time, as the method for deriving per-cell metric, (a) the maximum value, the sum, the mean, or the weighted mean of L3 filter outputs, (b) the sum, the mean, or the weighted mean of upper k L3 filter outputs in order of the larger value of the L3 filter outputs, and (c) the maximum value, the sum, the mean, or the weighted mean of the L3 filter outputs equal to or greater than the threshold, or the like may be used.

If the weighted sum (or weighted mean) is used, the 5G-NB may notify the UE of the weight. For example, when the third largest L3 filter output is RSRPi, the weighted sum may be represented like w1RSRP1+w2RSRP2+ w3RSRP3+ . . . , in which the 5G-NB may notify the UE of wi.

Further, the 5G-NB may instruct the UE to perform the measurement for generating the inputs of the L1 filter on a specific RX beam i using at least some TX beams.

Further, the 5G-NB may instruct the UE to perform the method for generating outputs of an L1 filter for a specific RX beam i. As the possible method, (a) the maximum value, the sum, the mean, the weighted sum, or the weighted mean for an L1 filter input, (b) the sum, the mean, the weighted sum, or the weighted mean for the upper k L1 filter inputs in order of the larger value of the L1 filter inputs, (c) the maximum, the sum, the mean, the weighted sum, or the weighted mean for the L1 filter inputs equal to or greater than the threshold, or the like may be used. For example, when the third largest L3 filter output is RSRPi, the weighted sum may be represented like w1RSRP1+w2RSRP2+ w3RSRP3+ . . . , in which the 5G-NB may notify the UE of wi.

Therefore, the UE may derive (1417) the cell measurement information according to the method received from the 5G-NB and confirm (1418) whether to satisfy the measurement reporting criteria for each cell to report the beam measurement information to the 5G-NB.

Meanwhile, in the case of the RX beam-specific filtering, a portion deriving the RX beam level measurement information that is the representative values of each RX beam may be divided into before the L1 filtering, after the L1 filtering, and after the L3 filtering.

Figure 14B:
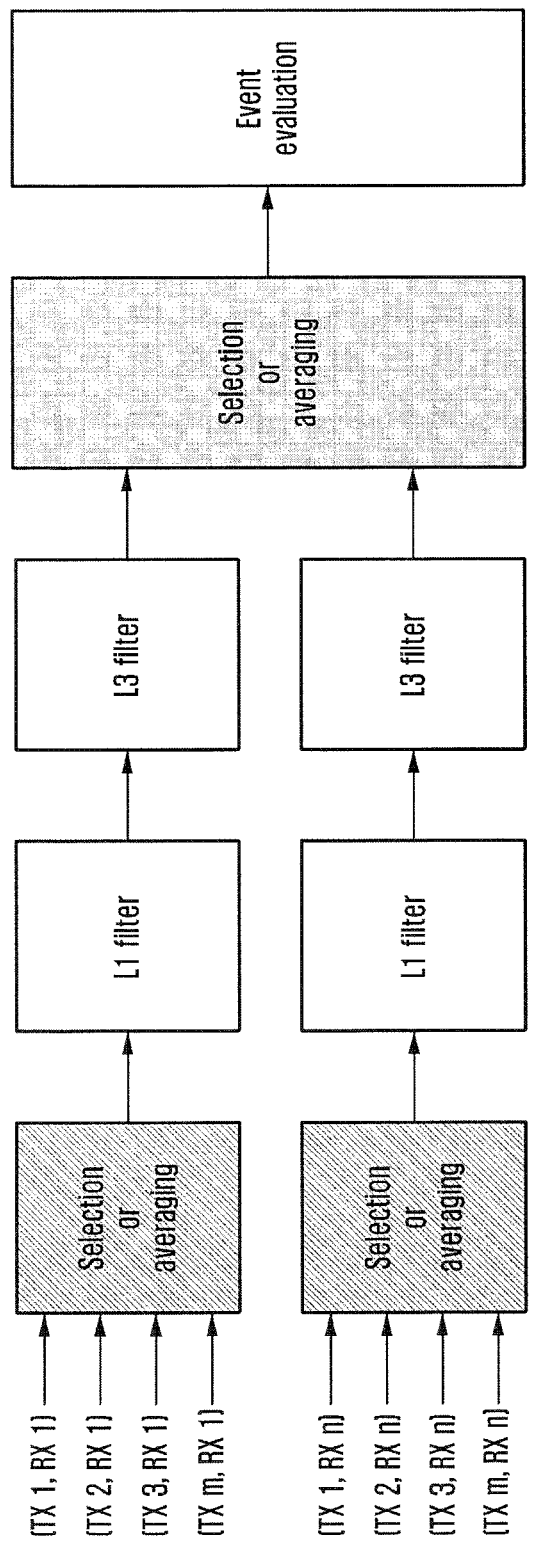

Referring to FIG. 14B, the UE may determine the L1 filtering inputs for each RX beam for the BRS measurement samples generated per beam pair. At this time, the method for generating L1 filtering inputs for each RX beam may use the foregoing methods and therefore the description thereof will be omitted below.

Therefore, the UE may determine the L1 filtering inputs for each RX beam and perform the L1 filtering and the L3 filtering on each of the determined L1 filtering inputs to generate the L3 filtering outputs. Therefore, the L3 filtering outputs may be generated as many as the number of RX beams and the UE may use the foregoing methods to determine the cell measurement information.

Figure 14C:
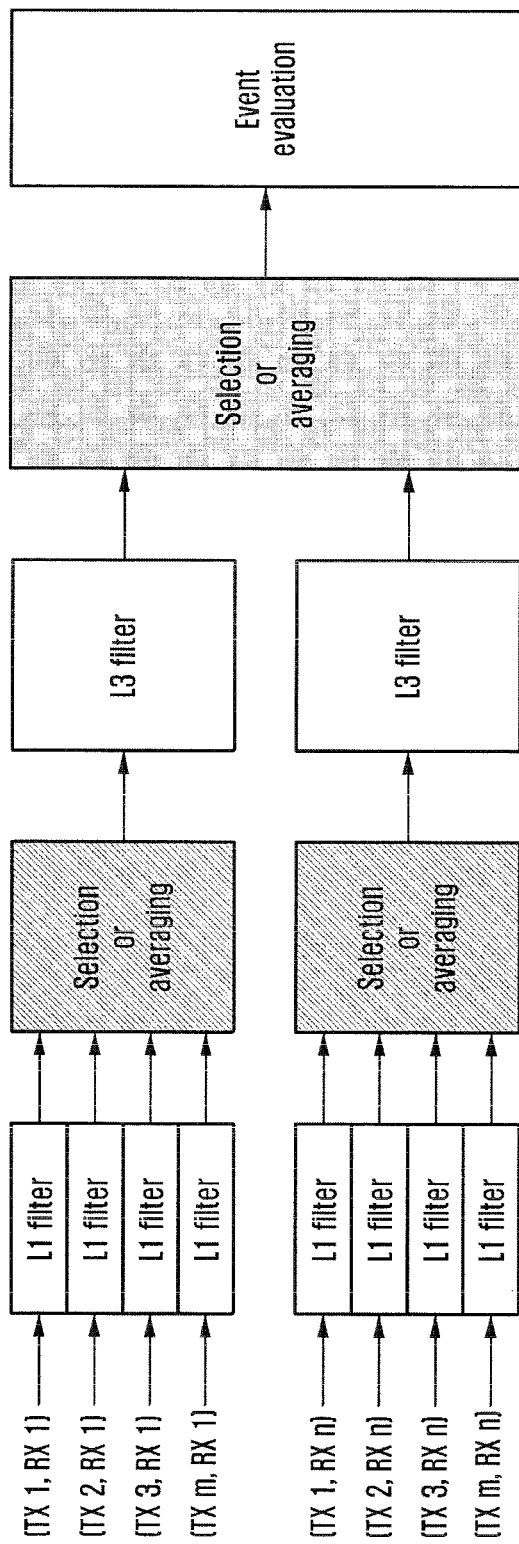

Referring to FIG. 14C, each of the UEs may perform the per-beam pair L1 filtering and then use the L1 filtering outputs generated per beam pair to determine the L1 filtering outputs for each RX beam. In this case, the L1 filtering outputs for each RX beam may be determined by the sum, the mean, the weighted mean, and the weighted sum of the L1 filtering outputs for each beam pair, the sum, the mean, and the weighted mean of some of the L1 filtering outputs for each beam pair, or the like. The content is the same as the foregoing methods and therefore will be omitted below.

Therefore, the UE may determine the L1 filtering outputs for each RX beam and perform the L3 filtering on each of the determined L1 filtering outputs to generate the L3 filtering outputs. At this point, the L1 filtering outputs generated for each RX beam may suffer from the L3 filtering, and therefore the L3 filtering outputs may be generated as many as the number of RX beams. Therefore, the UE may use the foregoing methods to determine the cell measurement information.

Figure 14D:
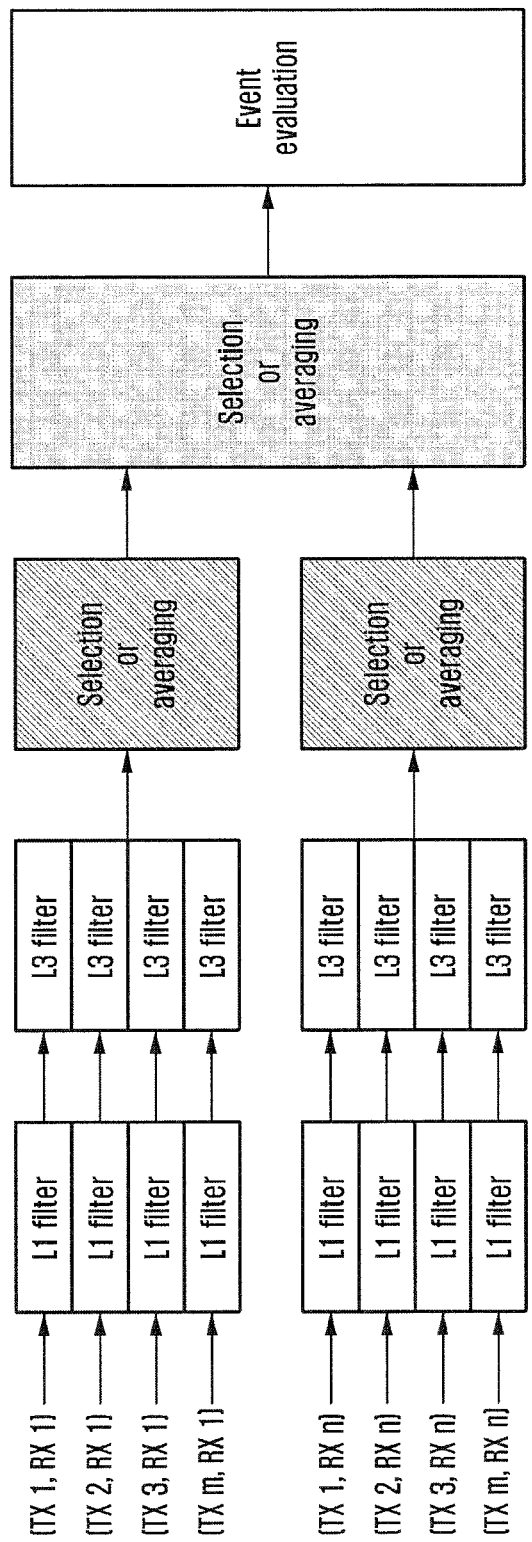

Referring to FIG. 14D, each of the UEs may perform the per-beam pair L1 filtering and then perform the L3 filtering on the L1 filtering outputs generated per beam pair. Further, the UE may use the L3 filtering outputs generated per beam pair to determine the L3 filtering outputs for each RX beam. The method for determining L3 filtering outputs for each RX beam is the same as the foregoing methods and therefore will be omitted below.

Therefore, the L3 filtering outputs may be generated as many as the number of RX beams and the UE may use the foregoing methods to determine the cell measurement information.

In an embodiment of the present disclosure, the L1 filtering inputs for each RX beam, the L1 filtering outputs for each RX beam, and the L3 filtering outputs for each RX beam may be called the RX beam level measurement information.

At this point, as one of the method for deriving RX beam level measurement information that is the representative value of the RX beam, the weighted sum of the inputs of the L1 filter and the outputs of the L1 filter or the L3 filter may be used and the content thereof is the same as described in FIG. 12E.

As described above, the UE may perform the weighted sum of the L1 filtering inputs, the L1 filtering outputs, or the L3 filtering outputs generated per RX beam. The 5G-NB may determine a weight wij used at the time of performing the weighted sum to notify the UE of the determined weight wij through the RRC signaling.

Further, the portion deriving the cell measurement information that is the representative value of the cell targets the L3 filter outputs after the L3 filtering. Here, one of the methods for deriving a representative value of a cell, the weighted sum of the outputs of the L3 filter and the representative values of the RX beam may be used. The 5G-NB may determine a weight vi used at the time of performing the weighted sum to notify the UE of the determined weight wij through the RRC signaling. Meanwhile, in the present drawing, the method for determining representative values of L1 filtering outputs for each RX beam after L1 filtering is described by way of example, but even before the L1 filtering and after the L3 filtering, the method described in the present drawing may be used.

Meanwhile, the 5G-NB may notify the UE of the information described above through the RRC signaling. For example, the RRC signaling may include the measurement configuration (for example, configuration information described in FIG. 6), or the like. Further, when providing the UE capability information to the 5G-NB, the UE may transmit the UE capability information, including a beam pattern. Further, the UE may notify the 5G-NB of the number of the UE's beams, the beam overlapping related information indicating whether adjacent beams overlap in X dB, the beam sweeping information indicating whether to perform the beam sweeping for the BRS measurement, or the like.

FIGS. 15A, 15B, 15C, and 15D are diagrams illustrating a method for generating, by a UE, beam measurement information according to various embodiments of the present disclosure.

Figure 15A:
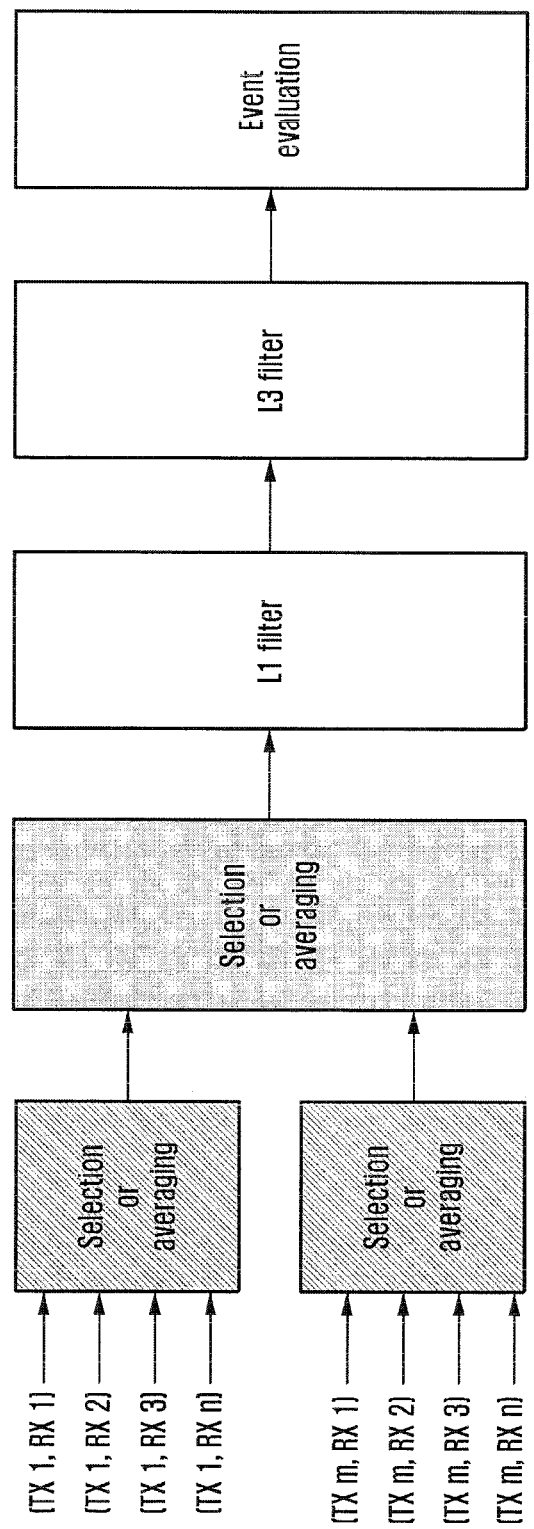
FIGS. 15A, 15B, 15C, and 15D are diagrams illustrating a method for generating, by a UE, beam measurement information according to various embodiments of the present disclosure.

Referring to FIG. 15A, the UE may measure the signal strength of the BRSs received per beam pair.

Further, the UE may derive the measurement value (representative signal strength or mean signal strength) per each TX beam based on the measured signal strength per beam pair. For example, the UE may measure the BRSs per beam pair to generate the BRS measurement samples and may determine the BRS measurement samples per 5G-NB'beam.

At this point, the 5G-NB may provide the UE with parameters used to derive the measurement values (representative signal strength or mean signal strength) for each TX beam. The content is the same as the content described in FIG. 12B.

The UE may derive the L1 filtering inputs (representative signal strength or mean signal strength) for the cell based on the measurement values (representative signal strength or mean signal strength) for each TX beam. At this point, the 5G-NB may provide the UE with parameters used to derive the L1 filtering input values (representative signal strength or mean signal strength) for the cell.

Further, the UE may apply the layer 1 filtering and the layer 3 filtering to the L1 filtering inputs (representative signal strength or mean signal strength) for the cell.

Therefore, the UE may generate the cell measurement information based on the layer 3 filtering outputs and satisfy whether to satisfy an event to perform cell-level mobility (for example; handover, cell addition, cell release) based on the cell measurement information.

Further, in the present drawing, the representative signal strength and the mean signal strength that are the measurement values per TX beam may be interchangeably used with the term TX beam level measurement information.

Figure 15B:
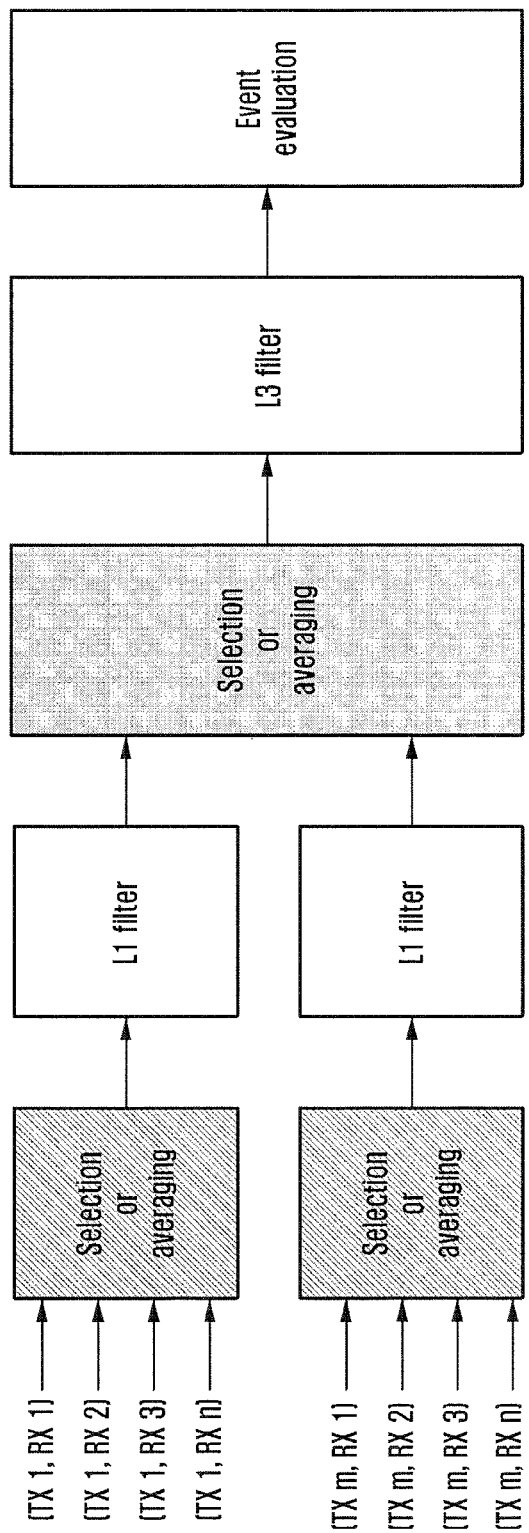

Referring to FIG. 15B, the UE may measure the signal strength of the BRSs received per beam pair.

Further, the UE may derive the measurement values (representative signal strength or mean signal strength) per each TX beam based on the measured signal strength per beam pair. For example, the UE may measure the BRSs per beam pair to generate the BRS measurement samples and may determine the BRS measurement samples per TX beam.

At this point, the 5G-NB may provide the UE with parameters used to derive the measurement values (representative signal strength or mean signal strength) for each TX beam. The content is the same as the content described in FIG. 12B.

The UE may apply the layer 1 filtering to each of the measurement values (representative signal strength or mean signal strength) for each TX beam. At this time, the representative signal strength may mean the signal strength acquired using the foregoing method (sum, weighted sum, weighted mean, mean, or the like.

Further, the UE may derive the L3 filtering inputs (representative signal strength or mean signal strength) for the cell based on the results of the layer 1 filtering for each TX beam.

At this point, the 5G-NB may provide the UE with parameters used to derive the L3 filtering input values (representative signal strength or mean signal strength) for the cell.

The UE may apply the layer 3 filtering to the L3 filtering inputs (representative signal strength or mean signal strength) for the cell.

Therefore, the UE may generate the cell measurement information based on the layer 3 filtering outputs and satisfy whether to satisfy an event to perform cell-level mobility (for example; handover, cell addition, cell release) based on the cell measurement information.

Figure 15C:
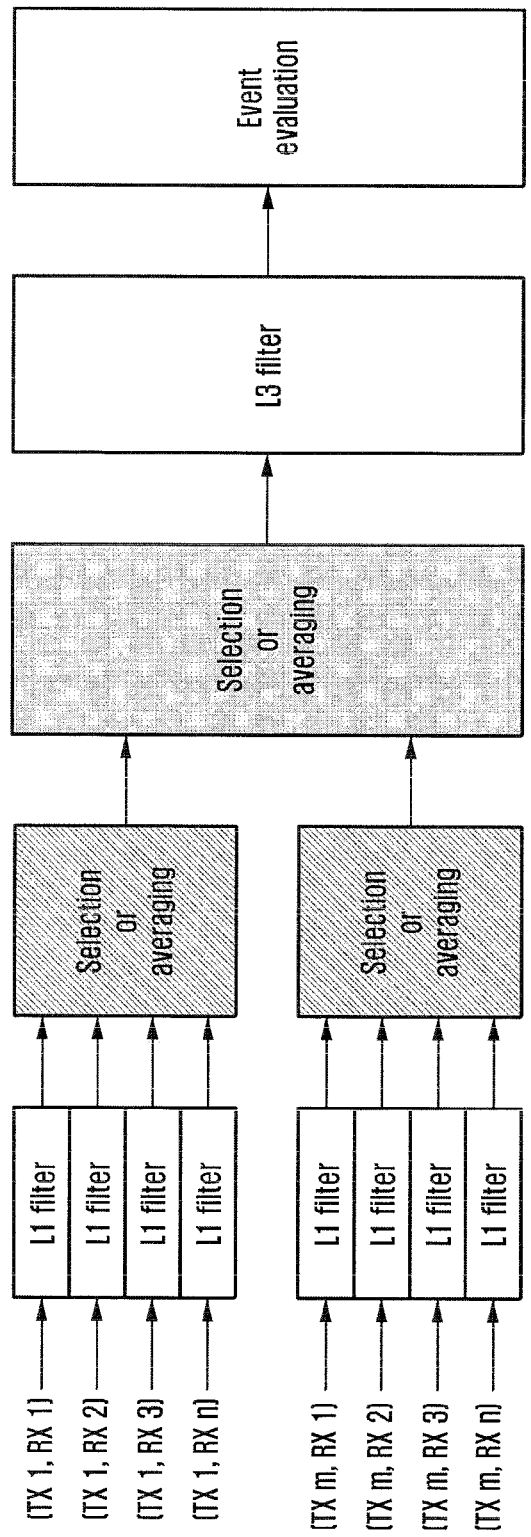
Figure 15D:
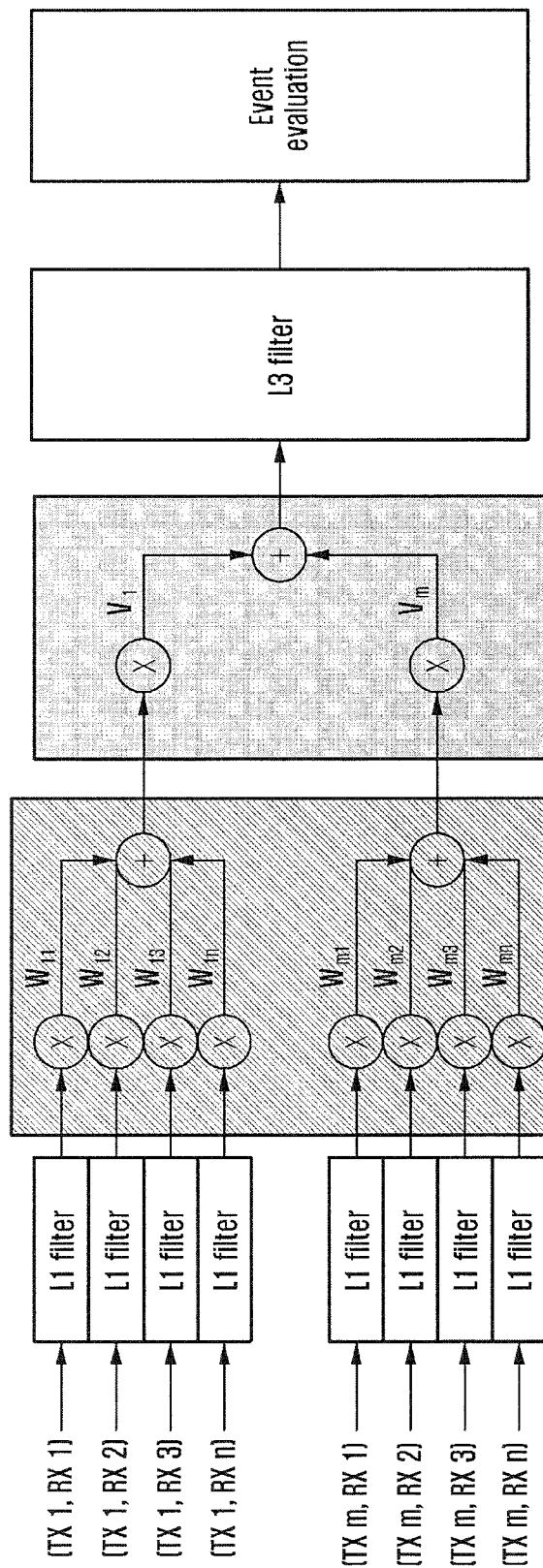

Referring to FIG. 15C, the UE measures the signal strength of the BRSs received per beam pair.

Further, the UE may apply the per-beam pair layer 1 filtering to the signal strengths for each beam pair. For example, the UE may measure the BRSs per beam pair to generate the BRS measurement samples and may perform the per-beam pair layer 1 filtering.

Further, the UE may derive the L1 filtering outputs (representative signal strength or mean signal strength) for each TX beam based on the results of the layer 1 filtering for each beam pair.

At this point, the 5G-NB may provide the UE with parameters used to derive the L1 filtering outputs (representative signal strength or mean signal strength) for each TX beam.

The UE may derive the L3 filtering inputs (representative signal strength or mean signal strength) for the cell based on the L1 filtering outputs (representative signal strength or mean signal strength) for each TX beam. At this point, the 5G-NB may provide the UE with parameters used to derive the L3 filtering input values (representative signal strength or mean signal strength) for the cell.

The UE may apply the layer 3 filtering to the L3 filtering inputs (representative signal strength or mean signal strength) for the cell.

Therefore, the UE may generate the cell measurement information based on the layer 3 filtering outputs and satisfy whether to satisfy an event to perform cell-level mobility (for example; handover, cell addition, cell release) based on the cell measurement information.

Meanwhile, in an embodiment of the present disclosure, the 5G-NB may provide the UE with parameters used to derive the representative values (representative signal strength or mean signal strength) for the cell or the TX beam As described above, the representative value may use the mean, the sum, the weighted sum, the weighted mean, or the like, in which the parameter may mean the weight used for the weighted sum Equation. Further, the 5G-NB may transmit the information indicating by which method the representative values are derived to the UE.

At this point, the weighted sum may be calculated by the following methods, and the content described below is only an example of the weighted sum and therefore the scope of the present disclosure is not limited thereto.

Example 1

$$Y_{TX\_beam\_k} = a_{beam\_pair(k,1)} X_{beam\_pair(k,1)} + a_{beam\_pair(k,2)} X_{beam\_pair(k,2)} + a_{beam\_pair(k,3)} X_{beam\_pair(k,3)} + \cdots + a_{beam\_pair(k,n)} X_{beam\_pair(k,n)}$$

$Y_{TX\_beam\_k}$: The representative signal strength or the mean signal strength for TX beam k of the 5G-NB $X_{beam\_pair(k,1)}$: The signal strength for TX-RX beam pair (k,1) measured by the UE At this point, the (k,1) may mean a radio link formed between the TX beam k of the 5G-NB and the RX beam 1 of the UE.

$a_{beam\_pair}(k,1)$: It is the weight or the coefficient used at the time of performing the weighted sum for Xbeam_pair (k,1) to derive Y TX_beam_k and may be equal to or larger than 0.

Example 2

$$Z_{cell} = b_{TX\_beam\_1} Y_{TX\_beam\_1} + b_{TX\_beam\_2} Y_{TX\_beam\_2} + b_{TX\_beam\_3} Y_{TX\_beam\_3} + \cdots + b_{TX\_beam\_m} Y_{TX\_beam\_m}$$

$Z_{cell}$: The representative signal strength or the mean signal strength for the cell $Y_{TX\_beam\_1}$: The representative signal strength or the mean signal strength for the TX beam 1 of the 5G-NB $b_{TX\_beam\_1}$: It is the weight or the coefficient used at the time of performing the weighted sum for $Y_{TX\_beam\_1}$ to Y derive $Z_{cell}$ and may be equal to or larger than 0

Example 3

$$Z_{cell} = c_{beam\_pair(1,1)} X_{beam\_pair(1,1)} + c_{beam\_pair(1,2)} X_{beam\_pair(1,2)} + c_{beam\_pair(1,3)} X_{beam\_pair(1,3)} + \cdots + c_{beam\_pair(m,n)} X_{beam\_pair(m,n)}$$

$Z_{cell}$: The representative signal strength or the mean signal strength for the cell $X_{beam\_pair(1,1)}$: The signal strength for TX-RX beam pair (1, 1) measured by the UE $c_{beam\_pair(1,1)}$: It is the weight or the coefficient used at the time of performing the weighted sum for $X_{beam\_pair(1,1)}$ to derive $Z_{cell}$ and may be equal to or larger than 0

Example 4

$$Y_{TX\_beam\_k} = a_{beam\_pair\_rank\_1} X_{beam\_pair\_rank\_1} + a_{beam\_pair\_rank\_2} X_{beam\_pair\_rank\_2} + a_{beam\_pair\_rank\_3} X_{beam\_pair\_rank\_3} + \cdots + a_{beam\_pair\_rank\_n} X_{beam\_pair\_rank\_n}$$

$Y_{TX\_beam\_k}$: The representative signal strength or the mean signal strength for TX beam k of the 5G-NB $X_{beam\_pair\_rank\_1}$ The signal strength or the mean signal strength of the beam pair having a first representative signal strength or mean signal strength, among all the beam pairs between the 5G-NB and the UE that is measured by the UE $a_{beam\_pair\_rank\_1}$: It is the weight or the coefficient used at the time of performing the weighted sum for $X_{beam\_pair\_rank\_1}$ to derive $Y_{TX\_beam\_k}$ and may be equal to or larger than 0

Example 5

$$Z_{cell} = b_{TX\_beam\_rank\_1} Y_{TX\_beam\_rank\_1} + b_{TX\_beam\_rank\_2} Y_{TX\_beam\_rank\_2} + b_{TX\_beam\_rank\_3} Y_{TX\_beam\_rank\_3} + \cdots + b_{TX\_beam\_rank\_m} Y_{TX\_beam\_rank\_m}$$

$Z_{cell}$: The representative signal strength or the mean signal strength for the cell $Y_{TX\_beam\_rank\_1}$: The signal strength or the mean signal strength of the TX beam having a first representative signal strength or mean signal strength, among all the TX beams of the 5G-NB $b_{TX\_beam\_rank\_1}$ It is the weight or the coefficient used at the time of performing the weighted sum for $Y_{TX\_beam\_rank\_1}$ to Y derive $Z_{cell}$ and may be equal to or larger than 0

Example 6

$$Z_{cell} = c_{beam\_pair\_rank\_1} X_{beam\_pair\_rank\_1} + c_{beam\_pair\_rank\_2} X_{beam\_pair\_rank\_2} + c_{beam\_pair\_rank\_3} X_{beam\_pair\_rank\_3} + \cdots + c_{beam\_pair\_rank\_n} X_{beam\_pair\_rank\_m*n}$$

$Z_{cell}$: The representative signal strength or the mean signal strength for the cell $X_{beam\_pair\_rank\_1}$: The signal strength or the mean signal strength of the beam pair having a first representative signal strength or mean signal strength, among all the beam pairs between the 5G-NB and the UE that is measured by the UE $c_{beam\_pair\_rank\_1}$: It is the weight or the coefficient used at the time of performing the weighted sum for $X_{beam\_pair\_rank\_1}$ to derive $Z_{cell}$ and may be equal to or larger than 0.

As can be appreciated from the examples, when the UE derives the representative signal strength or the mean signal strength for the cell or the TX beam, the 5G-NB may also allocate a weight to an absolute TX beam or the beam pair. This is shown in the above examples 1 to 3.

Further, the 5G-NB may also allocate a weight to the TX beam showing $1^{st}$, $2^{nd}$, ..., $n^{th}$ good signal strength or the beam pair. This is shown in the above examples 4 to 6.

As described above, the 5G-NB notifies the UE of the weight of the weighted sum and therefore may also designate the number of TX beam measurement results or the number of beam pair measurement results to be used when the UE derives the representative signal strength or the mean signal strength for the cell and the TX beam. For example, the meaning that the weight corresponding to 10 TX beams among 100 TX beam measurement results is larger than 0 and a weight corresponding to 90 TX beams is 0 is that 10 TX beams are considered when the UE derives the representative signal strength or the mean signal strength for the cell and the TX beam (that is, summed depending on the given weight) and the rest TX beams are disregarded.

As described above, an embodiment of the present disclosure proposes various measurement models. According to the measurement model, the UE may include outputs of each block when transmitting the measurement report to the 5G-NB. This may be commonly applied to all the measurement models proposed in an embodiment of the present disclosure. Further, the 5G-NB may also instruct the UE to include the outputs of any block in the measurement report. At this time, the 5G-NB may include the information in the configuration information transmitted to the UE through the RRC signaling.

Meanwhile, to perform the filtering method described above, the 5G-NB has to notify the UE of the weight (that is, coefficients of the weighted sum) for performing the weighted sum. The 5G-NB may notify the UE of the weight for the weighted sum through the RRC signaling. The content will be described with reference to FIGS. 16A and 16B.

Figure 16A:
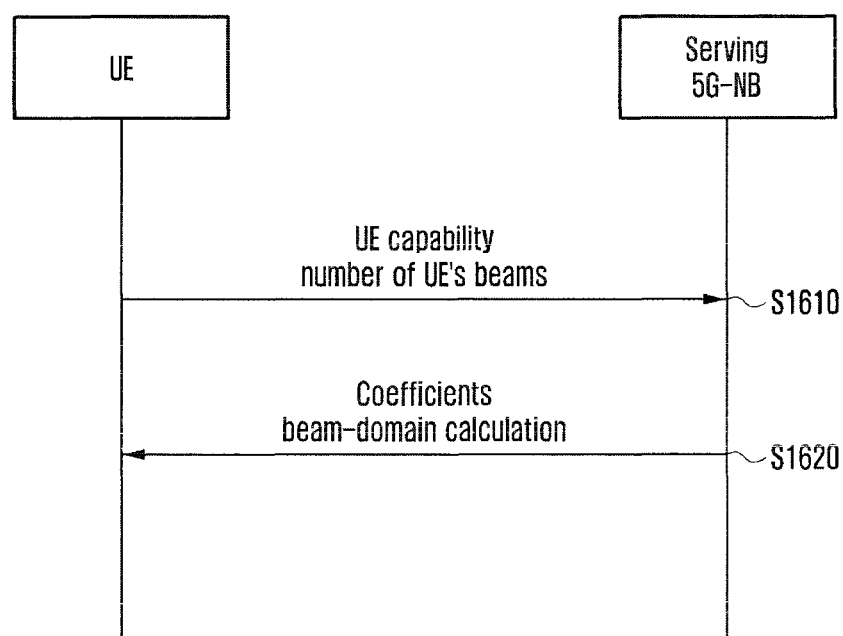
FIGS. 16A and 16B are diagrams illustrating a method for notifying, by a 5G-NB, a UE of a weight according to various embodiments of the present disclosure.
Figure 16B:
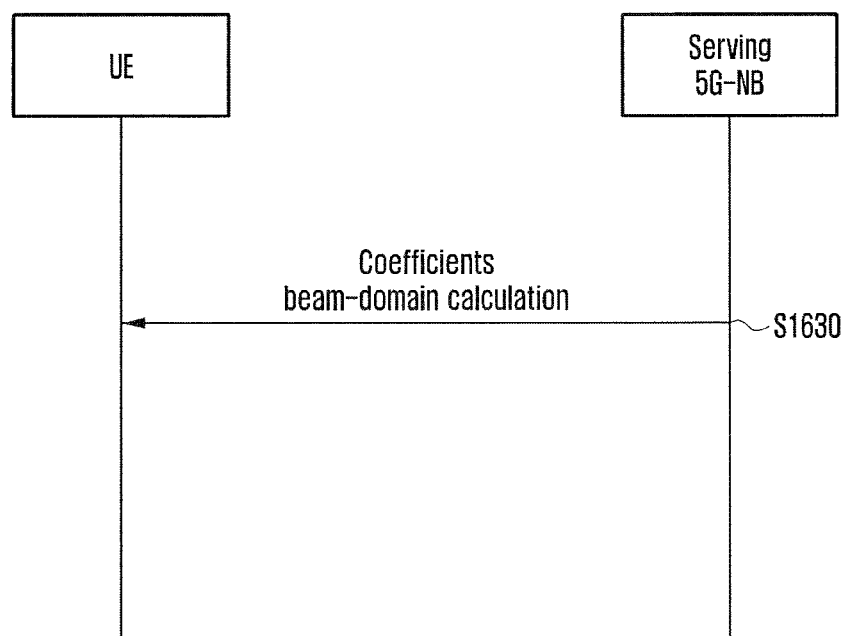

FIGS. 16A and 16B are diagrams illustrating a method for notifying, by a 5G-NB, a UE of a weight according to various embodiments of the present disclosure.

Referring to FIG. 16A, if the 5G-NB has to know the number of the UE's beams prior to notifying the UE of the weight the 5G-NB may determine the number of the UE's beams during the transmission and reception of the UE capability to and from the UE and notify the UE of the weight suitable for the determined number of the UE's beams.

Therefore, the 5G-NB may receive the UE capability including the number of the UE's beams in operation S1610.

Further, in operation S1620, the 5G-NB may determine the weight based on the number of the UE's beams and transmit the configuration information including at least one of the filtering coefficient or the weight to the UE.

Referring to FIG. 16B, if the 5G-NB has to know the number of the UE's beams prior to notifying the UE of the weight, the 5G-NB may immediately notify the UE of the weight. For example, in operation 1630, the 5G-NB may transmit the configuration information including at least one of the filtering coefficient or the weight to the UE.

Meanwhile, as described above, an embodiment of the present disclosure is applied to cell-level operations, such as the handover, the cell addition, and the cell release.

Similarly, the content described in an embodiment of the present disclosure may be applied even to target rating point (TRP) switching (inter-TRP handover), TRP addition, TRP release, or the like that are performed in a transmitting and receiving point (hereinafter, called TRP). For example, if TX beam 1 to TX beam m of the 5G-NB belong to one TRP, the results generated by the foregoing processes may be a value representing the corresponding TRP.

Further, one cell may consist of at least one TRP and the value generated by performing the foregoing process on at least one TRP may be a value representing the corresponding cell.

More specifically, when one cell consists of one TRP (that is, when one 5G-NB is included in the cell), the UE may derive the representative value of the cell level using the beams formed in the 5G-NB or the TRPs and may use the derived representative value for mobility management, such as a handover.

Further, when one cell consists of a plurality of TRPs (that is, when a plurality of 5G-NBs are included in the cell), the UE may derive the representative value of the cell level using all the beams formed in each of the plurality of 5G-NBs or the TRPs and may use the derived representative value for mobility management, such as a handover.

Further, when one cell consists of a plurality of TRPs (that is, when a plurality of 5G-NBs are included in the cell), the UE may derive the representative value of the cell level using some of the beams formed in each of the plurality of 5G-NBs or the TRPs and may use the derived representative value for mobility management such as a handover. Here, the 5G-NB may provide the information on which of the beams to be used to derive the representative value of the cell level to the UE.

Further, the UE may differentiate the cell and the beam using a cell ID and a beam ID that are exclusively allocated to the cell and the beam. Even in the case of the TRP, if there is a TRP ID exclusively allocated to the TRP, the UE may differentiate different TRPs. However, if there is no TRP ID exclusively allocated to one TRP, the UE may not differentiate different TRPs based on the TRP ID. In this case, the 5G-NB may notify the UE of a beam ID corresponding to a specific TRP based on the RRC signaling, the system information, or the like. The content will be described with reference to FIGS. 17A, 17B, 17C, 17D, 17E, 17F, 17G, 17H, and 17I.

FIGS. 17A, 17B, 17C, 17D, 17E, 17F, 17G, 17H, and 17I are diagrams for describing a process of notifying, by a 5G-NB, a UE of beam group information corresponding to TRP according to various embodiments of the present disclosure.

Figure 17A:
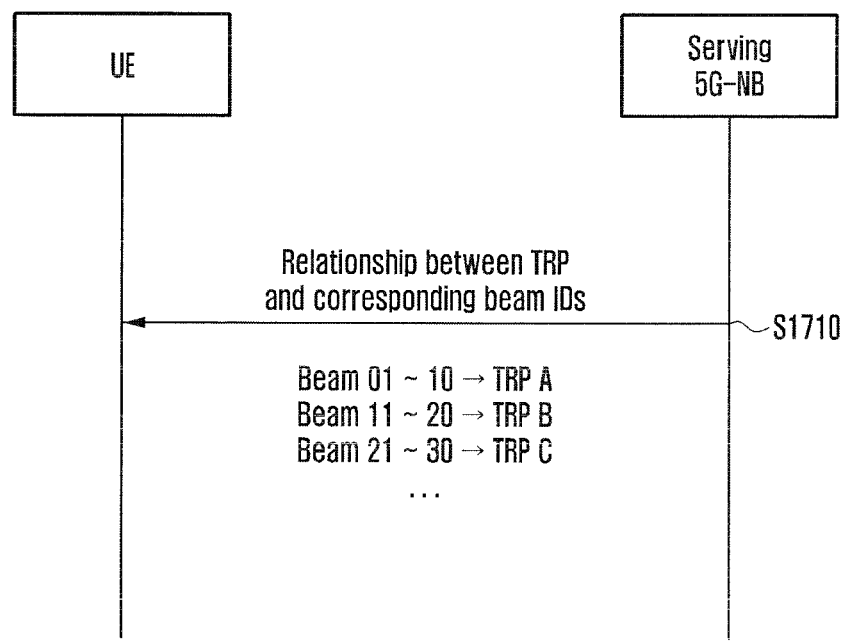
FIGS. 17A, 17B, 17C, 17D, 17E, 17F, 17G, 17H, and 17I are diagrams for describing a process of notifying, by a 5G-NB, a UE of beam group information corresponding to target rating point (TRP) according to various embodiments of the present disclosure.

Referring to FIG. 17A, in operation S1710, the 5G-NB may transmit the beam group information to the UE. The beam group information may mean the information representing the relationship between the beam ID and the TRP.

For example, beam IDs 01 to 10 may be a beam corresponding to TRP A, beam IDs 11 to 20 may be a beam corresponding to TRP B, and beam IDs 21 to 30 may be a beam corresponding to TRP C.

The UE receiving the information may first receive a beam and then confirm the beam ID to confirm to what TRP the corresponding beam belongs based on the confirmed beam ID. Further, the signal strength representing the TRP may be derived by the measured model described above and the inter-TRP handover, the TRP addition, the TRP release, or the like may be performed. However, when a plurality of TRPs are included in one cell, the plurality of TRPs may derive cell representative signals using representative signals of the plurality of TRPs and perform the mobility management, such as a handover using the derived cell representative signals.

So far, the UE describes various methods for deriving cell representative signal strength. To perform the operation, the information that the 5G-NB provides to the UE may include at least of the following contents.

The 5G-NB's beam information to be considered when the UE derives the cell representative strength. At this point, the 5G-NB's beam information may include the following information. Therefore, the UE may receive at least one of the following information and may derive the cell representative signal strength using the beam corresponding to the 5G-NB's beam information.

One beam

N beams

All beams detected by a UE

Beam whose RSRP or RSRQ is equal to or greater than threshold

Up to Nmax beams

If the 5G-NB provides the information on the Nmax to the UE, the UE may derive the cell representative signal strength based on the up to Nmax 5G-NB's beam.

At least Nmin beams

If the 5G-NB provides the information on the Nmin to the UE, the UE derives the cell representative signal strength based on at least Nmin 5G-NB's beam.

Measurement model to be applied when the UE derives the cell representative signal strength Cell specific filtering 5G-NB's beam specific filtering UE's beam specific filtering Beam pair specific filtering More specifically, the index is allocated to the measurement model described in each drawing of the present document and then the 5G-NB may notify the UE of the corresponding relationship between the measurement model and the index. The 5G-NB notifies the UE of the index and thus may instruct the UE to derive the cell representative signal strength depending on the measurement model corresponding to the corresponding index.

Calculation method to be applied when the UE derives (i) the cell representative signal strength, (ii) the representative signal strength for the 5G-NB's beam, or (iii) the representative signal strength for the UE's beam.

Sum $$R\_cell = R\_beam,1 + R\_beam,2 + \ldots + R\_beam,N$$

Here, the R_cell represents the cell representative signal strength and the R_beam, i represents signal strength of an i-th beam Mean $$R\_cell = (R\_beam,1 + R\_beam,2 + \ldots + R\_beam,N)/N$$

Weighted sum (or weighted mean) for first beam $$R\_cell = w\_1 * R\_beam,1 + w\_2 * R\_beam,2 + \ldots + w\_N * R\_beam,N$$

Here, w_i may mean the weight applied to R_beam, i. Further, the first beam may mean a beam having an identifier unchanged per beam Weighted sum (or weighted mean) for second beam $$R\_cell = w\_s1 * R\_beam,s1 + w\_s2 * R\_beam,s2 + \ldots + w\_sN * R\_beam,sN$$

Here, R_beam, si may mean the signal having the greatest signal strength and w_si may mean the weight applied to the R_beam, si. Further, the second beam may mean a beam having a temporary identifier in order of beamy quality.

The above listed information, that is, the 5G-NB's beam information, the measurement model, the calculation method, or the like that are to be considered at the time of deriving the cell representative signal strength may also be identically and differently applied to a connected mode UE and an idle mode UE. Further, it may be identically or differently applied to the UE having different device characteristics (UE capability, or the like). Further, even in the case of the UE having the same device characteristics, it may be identically or differently applied to each UE depending on cell deployment, channel characteristics between the UE and the 5G-NB, or the like.

Further, the measurement report to allow the UE to perform the measurement and derive the cell representative signal strength and then report it to the 5G-NB includes at least one of the following information.

ID and cell representative signal of a cell in which the UE performs the measurement ID and signal strength of a beam having the greatest RSRP or RSRQ IDs and signal strength of N beams in order of the greatest RSRP or RSRQ The number, IDs, and signal strength of beams having signal strength within X Db (or dBm) from the signal strength of the beam having the greatest RSRP or RSRQ, in which the 5G-NB may provide the information on the X value to the UE.

The number, IDs, and signal strength of beams whose the RSRP or the RSRQ is equal to or greater than the threshold ID of TRP to which the beam reported to the 5G-NB by the UE belongs ID of a beam group to which the beam reported to the 5G-NB by the UE belongs.

So far, an embodiment of the present disclosure describes a method for allowing UE to measure a plurality of beams belonging to one cell to derive representative signal strength of a cell.

This may be identically applied to a method for allowing UE to measure a plurality of beams belonging to TRP to derive representative signal strength for TRP. Here, the information (that is, to which TRP any beam belongs) on a plurality of beams belonging to one TRP may be provided to the UE through the RRC message, or the like.

Further, this may be identically applied to a method for allowing UE to measure a plurality of beams belonging to any beam group to derive representative signal strength for any beam group. Here, the 5G-NB provides the information (that is, to which beam group any beam belongs) on the plurality of beams belonging to any beam group to the UE through the RRC message, or the like.

Generally, the connected mode UE may individually divide the 5G-NB's beams. For example, each of the 5G-NB's beams {1, 2, 3, 4, . . . n} may be divided by the beam ID or the antenna port and the measurement therefor may be performed.

However, the idle mode UE may not individually divide the 5G-NB's beams. The reason is that the channel including the beam related information like a physical broadcast channel (PBCH) to allow the UE to individually divide the 5G-NB's beam needs to be included but the idle mode UE does not generally decode the information.

Basically, the idle mode UE may receive synchronization signals, such as a primary synchronization signal (PSS) and a secondary synchronization signal (SSS).

Further, the 5G-NB may broadcast the synchronization signal through a composite beam. Here, the broadcast through the composite beam means that the 5G-NB simultaneously uses the plurality of beams to transmit the same signal.

For example, if the 5G-NB transmits the synchronization signal through beams {1, 4, 7, . . . , 3n+1} for a certain time, transmits the synchronization signal through beams {2, 5, 8, . . . , 3n+2} for a certain time, and transmits the synchronization signal through beams {3, 6, 9, . . . , 3n+3} for a certain time (n=1, 2, 3, . . . ), the UE may recognize the beams {1, 4, 7, . . . , 3n+1} as one composite beam and the beams {3, 6, 9, . . . , 3n+3} as one composite beam and does not divide each of the individual beams within the composite beam.

Therefore, the idle mode UE does not perform the measurement for each of the individual beams of the 5G-NB but considers the composite beam as one independent beam and may perform the measurement therefor. Therefore, the measurement model for deriving cell representative signal strength proposed in an embodiment of the present disclosure may be used even when it is operated based on the composite beam.

As one example, the UE may recognize power of the synchronization signal received at a specific time or in a symbol or a subframe as received power of a signal that the 5G-NB transmits through one composite beam consisting of several individual beams. The content will be described with reference to FIG. 17B.

Figure 17B:
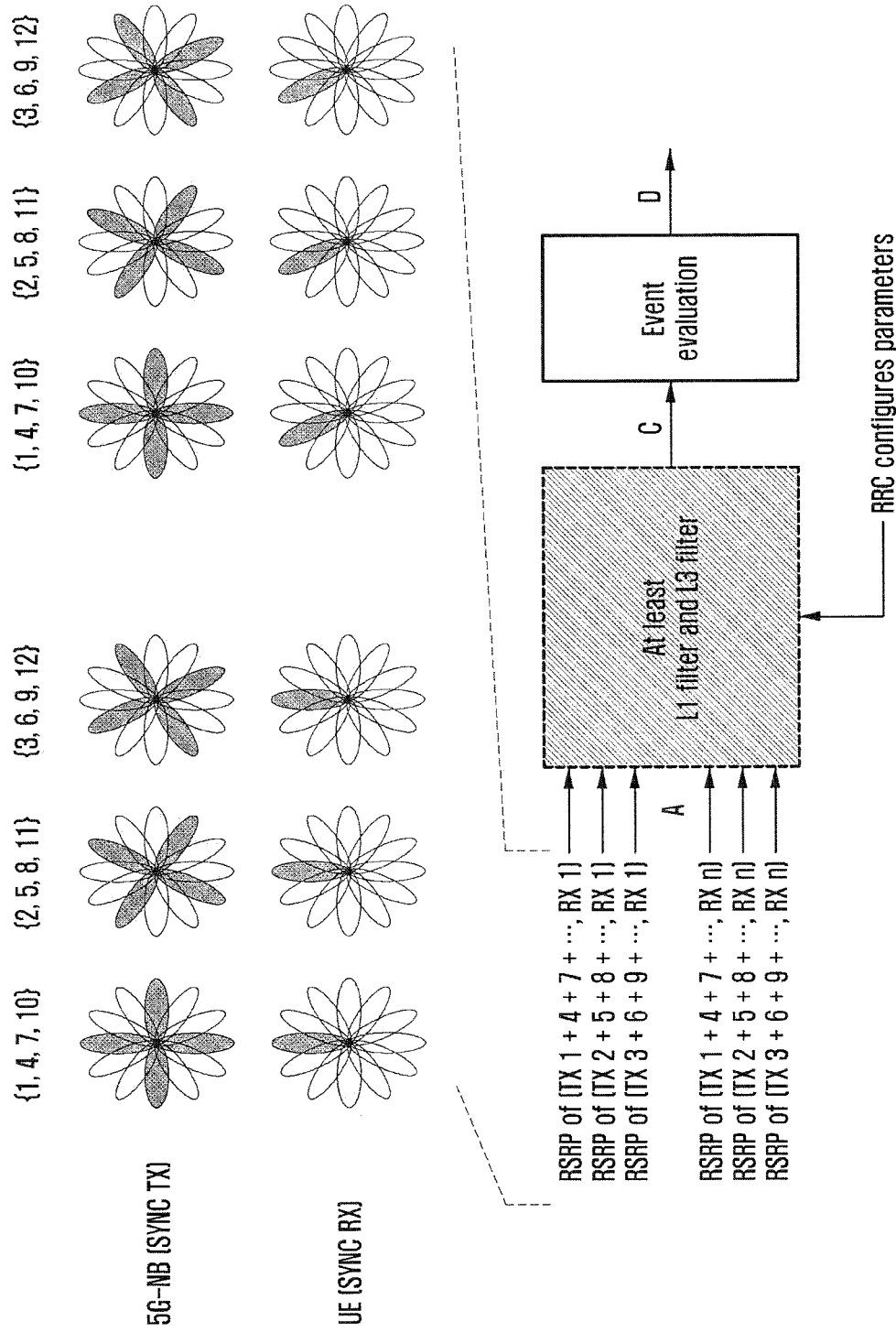

FIG. 17B is a diagram illustrating a method for using a composite beam according to an embodiment of the present disclosure.

Referring to FIG. 17B, the 5G-NB may transmit the synchronization signal per composite beam and the idle mode UE may receive the same. Here, the composite beam is as follows.

Composite beam 1: individual beams {1, 4, 7, 10}
Composite beam 2: individual beams {2, 5, 8, 11}
Composite beam 3: individual beams {3, 6, 9, 12}

Here, as the method for dividing, by a UE, a composite beam, there is a method for dividing a synchronization signal based on a received symbol location. For example, the signal strength of the synchronization signal measured at a first symbol may be divided into the signal strength of the composite beam 1, the signal strength of the synchronization signal measured at a second symbol may be divided into the signal strength of the composite beam 2, the signal strength of the synchronization signal measured at a third symbol may be divided into the signal strength of the composite beam 3, or the like.

As such, the UE may measure the RSRP or the RSRQ per the composite beam and applies the measurement model proposed in an embodiment of the present disclosure to be able to the cell representative signal strength.

Meanwhile, the 5G-NB may notify the UE of the information (relevant parameter, threshold, beam related information, operation mode, or the like) that the UE needs to know in performing all the operations described so far by using the following method.

RRC message
RRCConnectionReconfiguration, RRCConnectionSetup, or the like
MeasConfig, MeasObject, ReportConfig, or the like
MeasResults, Measurement report, or the like Handover command, or the like
System information
physical downlink control channel (PDCCH)
physical broadcast channel (PBCH)

Further, the term "beam" used in the present document mainly means the 5G-NB's beam but is not necessarily limited thereto. Therefore, the term "beam" may also mean the 5G-NB's beam, the UE's beam, and the beam between the 5G-NB and the UE and even the latter case may also be applied as the same principle as the case meaning the 5G-NB's beam.

As described above, in the LTE system, the UE may perform the L1 filtering and the L3 filtering in a cell unit. Here, the 5G-NB may instruct the UE to perform the L3 filtering through the RRC message, or the like.

Hereinafter, differently from the LTE system operated in an omni-directional beam unit, a method for performing, by a UE, RRM measurement when the L3 filtering is selectively applied in a 5G new radio (NR) system operated in a directional beam unit will be described.

First, an embodiment of the present disclosure may include an operation of allowing a 5G-NB to instruct UE whether to perform the L3 filtering at the time of deriving a cell-level RRM measurement result.

If the 5G-NB instructs the UE to perform the L3 filtering for the cell-level RRM measurement, the UE may derive the L3 filtering output of time t based on the weighted mean of the L3 filtering output of time t−1 the L1 filter output of time t. This is shown in the following Equation 1.

$$L3\_output(t)=a*L3\_output(t-1)+(1-a)*L1\_output(t) \quad \text{Equation 1}$$

At this point, the meaning of the parameter included in the above Equation is as follows.

L3_output(t): L3 filtering output that the UE is derives at the time t when performing the cell-level RRM measurement.

L1_output(t): L1 filtering output that the UE derives at the time t when performing the cell-level RRM measurement.

a: Weight applied when the UE performs the weighted mean.

Further, an embodiment of the present disclosure may include an operation of allowing a 5G-NB to instruct UE whether to perform the L3 filtering (or any filtering other than L2 filtering or L1 filtering) at the time of deriving the beam-level RRM measurement result. This may also be performed independent of the operation of instructing whether to perform L1 filtering at the time of deriving a beam-level RRM measurement result and may also be performed having correlation. Hereinafter, an example of instructing whether to perform L3 filtering at the time of performing the cell level measurement and the beam level measurement will be described.

Figure 17C:
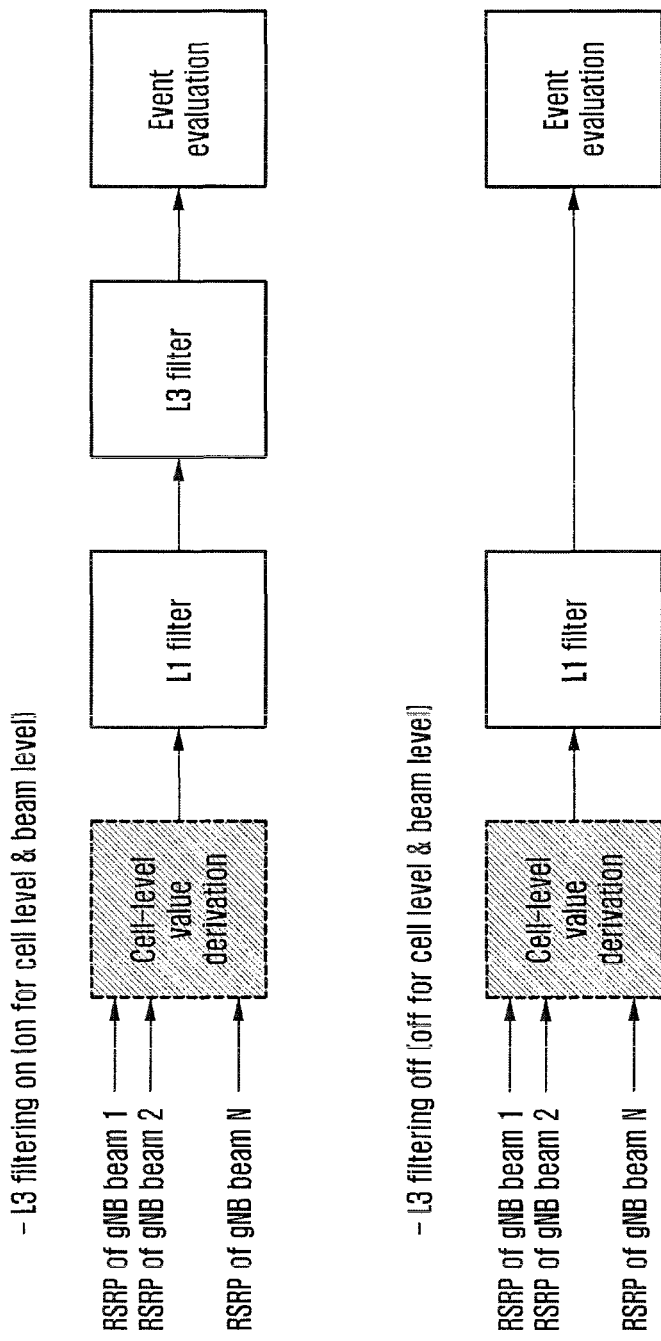

FIG. 17C is a diagram illustrating a method of a case of deriving a cell level measurement result prior to L1 filtering according to an embodiment of the present disclosure.

Referring to FIG. 17C, if the UE performs the L1 filtering and the L3 filtering in the state in which one cell measurement result is derived from the plurality of 5G-NB's beam measurement results before the UE performs the L1 filtering, L3 filtering on/off for cell-level RRM measurement and L3 filtering on/off for beam-level RRM measurement need not to be divided.

However, if one cell measurement result is derived from the plurality of 5G-NB's beam measurement result after the UE performs the L1 filtering or the L3 filtering, the UE may consider cases as shown in the following Table 1.

TABLE 1

|                     | Case 1 | Case 2 | Case 3 | Case 4 |
|---------------------|--------|--------|--------|--------|
| Per-cell L3 filter  | Off    | Off    | On     | On     |
| Per-beam L3 filter  | Off    | On     | Off    | On     |

Figure 17D:
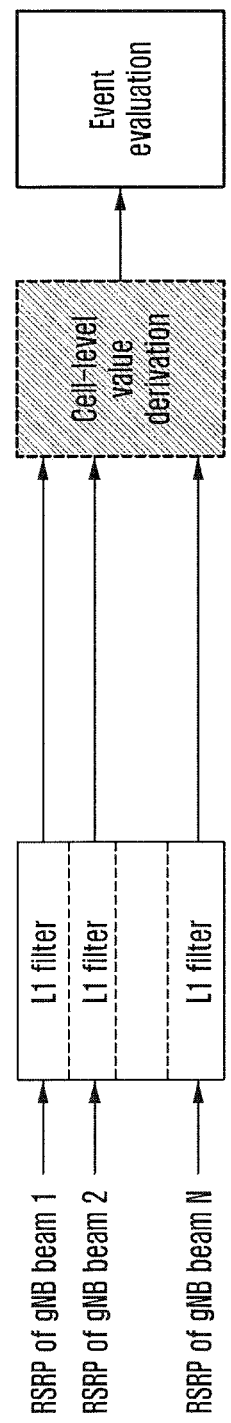

FIG. 17D is a diagram illustrating a method for generating cell measurement information in case 1 according to an embodiment of the present disclosure.

Referring to FIG. 17D, a method for generating cell measurement information when both of per-cell L3 filter and the per-beam L3 filter are turned off will be described.

If both of the per-cell L3 filtering and the per-beam L3 filtering are turned off, the UE may perform the RRM measurement by a method for deriving cell measurement information that is a cell representative value after per-5G-NB's L1 filtering.

Figure 17E:
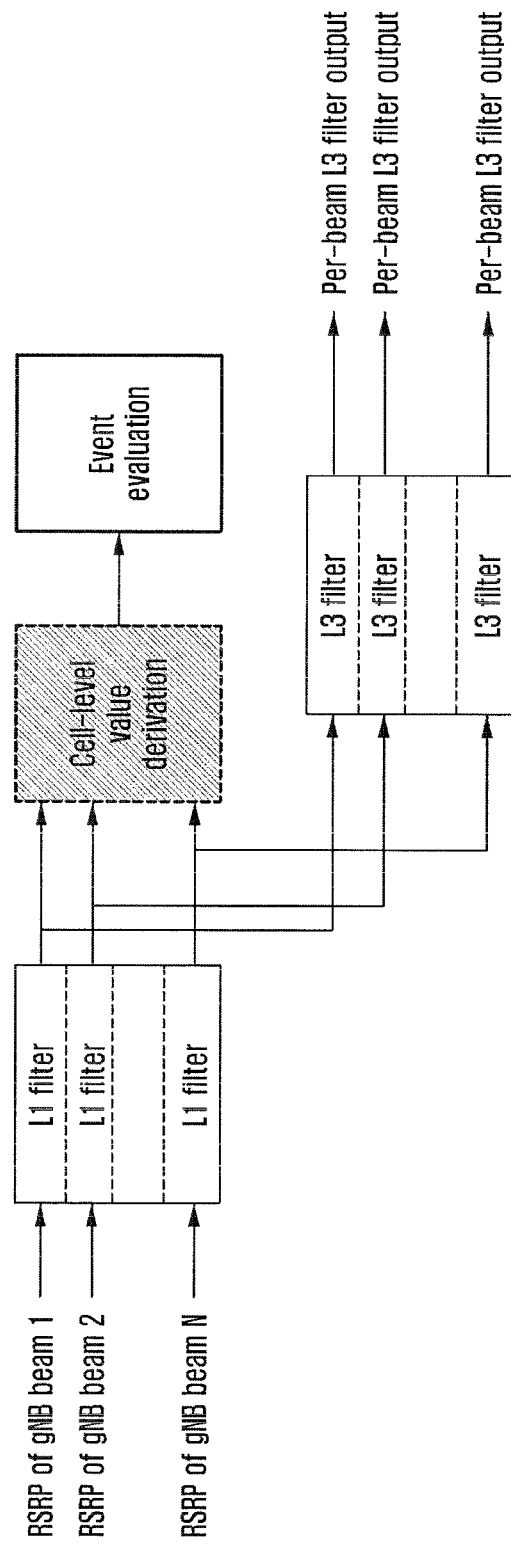

FIG. 17E is a diagram illustrating a method for generating cell measurement information in case 2 according to an embodiment of the present disclosure.

Referring to FIG. 17E, a method for generating cell measurement information when per-cell L3 filter is turned off and the per-beam L3 filter is turned on will be described.

When the per-cell L3 filtering is turned off and the per-beam L3 filtering is turned on, the per-cell L3 filtering and the per-beam L3 filtering need to be separated. First, the UE may perform the per-5G-NB's beam L1 filtering. If the UE performs the per-5G-NB's beam L1 filtering and then performs the per-5G-NB's beam L3 filtering, the UE may derive the per-5G-NB's beam L3 filtering. In parallel with this, the UE may use the per-5G-NB's beam L1 filtering results to derive the cell representative value.

Figure 17F:
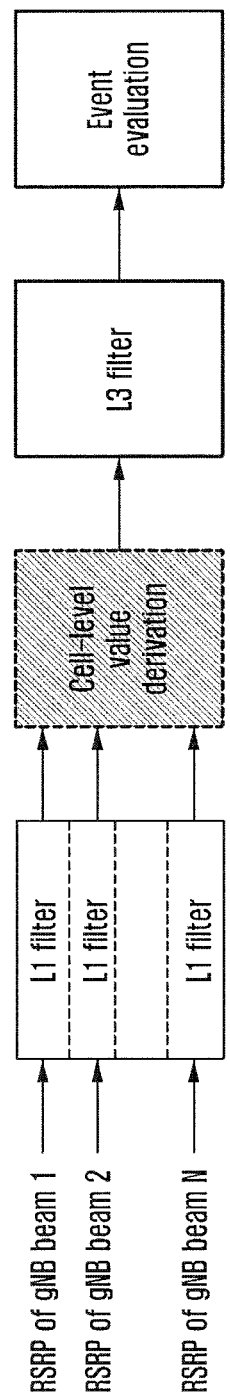

FIG. 17F is a diagram illustrating a method for generating cell measurement information in case 3 according to an embodiment of the present disclosure.

Referring to FIG. 17F, a method for generating cell measurement information when the per-cell L3 filter is turned on and the per-beam L3 filter is turned off will be described.

If the per-cell L3 filtering is turned on and the per-beam L3 filtering is turned off, the UE may perform the per-5G-NB's beam L1 filtering and then derive the cell representative value (per-cell L1 filtering outputs or per-cell L3 filtering inputs). Further, the RRM measurement may be performed by the method for applying the per-cell L3 filtering to the derived cell representative value.

Figure 17G:
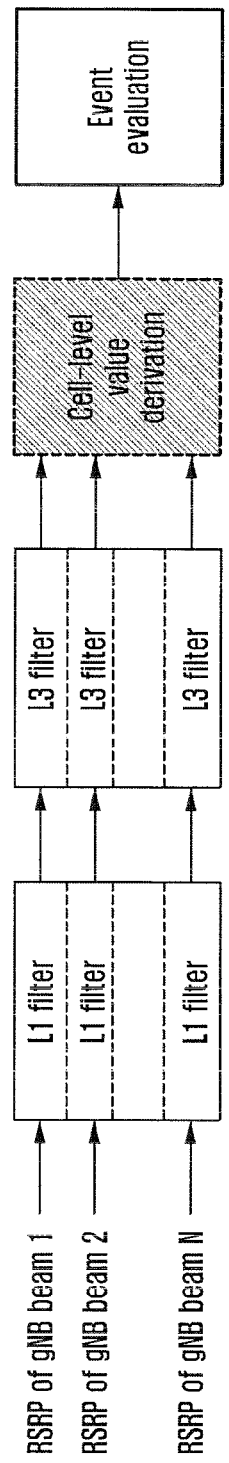

FIG. 17G is a diagram illustrating a method for generating cell measurement information in case 4 according to an embodiment of the present disclosure.

Referring to FIG. 17G, a method for generating cell measurement information when the per-cell L3 filter is turned on and the per-beam L3 filter is turned on will be described.

If the per-cell L3 filtering is turned on and the per-beam L3 filtering is also turned on, the UE may perform the per-5G-NB's beam L1 filtering and then perform the per-5G-NB's beam L3 filtering based on the result.

Further, the RRM measurement may be performed by the method for deriving a cell representative value based on the per-5G-NB's beam L3 filtering.

The L3 filter described above may be expressed by Equation depending on the same principle as the L3 filter defined in the LTE standard Meanwhile, in the mobile communication system based on beamforming considered in an embodiment of the present disclosure, that is, in the system in which the 5G-NB uses at least one beam through analog/hybrid beamforming and the UE also uses at least one beam through the analog/hybrid beamforming, as illustrated in FIGS. 2A, 2B, 2C, only when the UE sequentially (or in parallel) receives, through all the UE's beams, the reference signals that the 5G-NB sequentially (or in parallel) transmits through all the beams, the UE may understand the signal strength for all the beam pairs between the UE and the 5G-NB. Further, only when the UE understands the signal strength for all the beam pairs between the UE and the 5G-NB, the UE may understand a 5G-NB's best beam, a UE's best beam, a best beam pair between the UE and the 5G-NB, and the signal strength therefor. Therefore, the full beam sweeping is necessarily required to derive quality of the beam pair to be used for data transmission and reception, quality for the 5G-NB's beam, and quality of the cell.

Here, for the UE and the 5G-NB to perform the full beam sweeping, the 5G-NB needs to perform the TX beam sweeping for transmission of the reference signal and the UE needs to perform the RX beam sweeping for reception of the reference signal.

Therefore, it is taken time to perform the full beam sweeping, which may be called a full sweep interval and a full sweep period. Further, the full sweep interval may be called a full beam sweeping period.

Here, the full beam sweep period may be determined by at least one of the number of the UE's beams, the number of 5G-NB's beams, and the reference signal transmission period. If the full sweep period is long, the UE seems to measure the quality of the cell (quality of the beam pair or quality of the 5G-NB's beam) at a long time interval, and therefore mobility performance like a handover success rate may be considered to be decreased.

Among the factors of affecting the full beam sweep period, the number of the UE's beams and the number of 5G-NB's beams may be determined by the implementation of the 5G-NB. Further, the reference signal transmission period of the 5G-NB may be directly configured by the 5G-NB. Therefore, an embodiment of the present disclosure proposes a method for controlling a reference signal transmission period based on mobility performance, such as a handover success rate of the UE and the number of the UE's and 5G-NB's beams. The content will be described with reference to FIGS. 17A, 17B, 17C, 17D, 17E, 17F, 17G, 17H, and 17I.

Figure 17H:
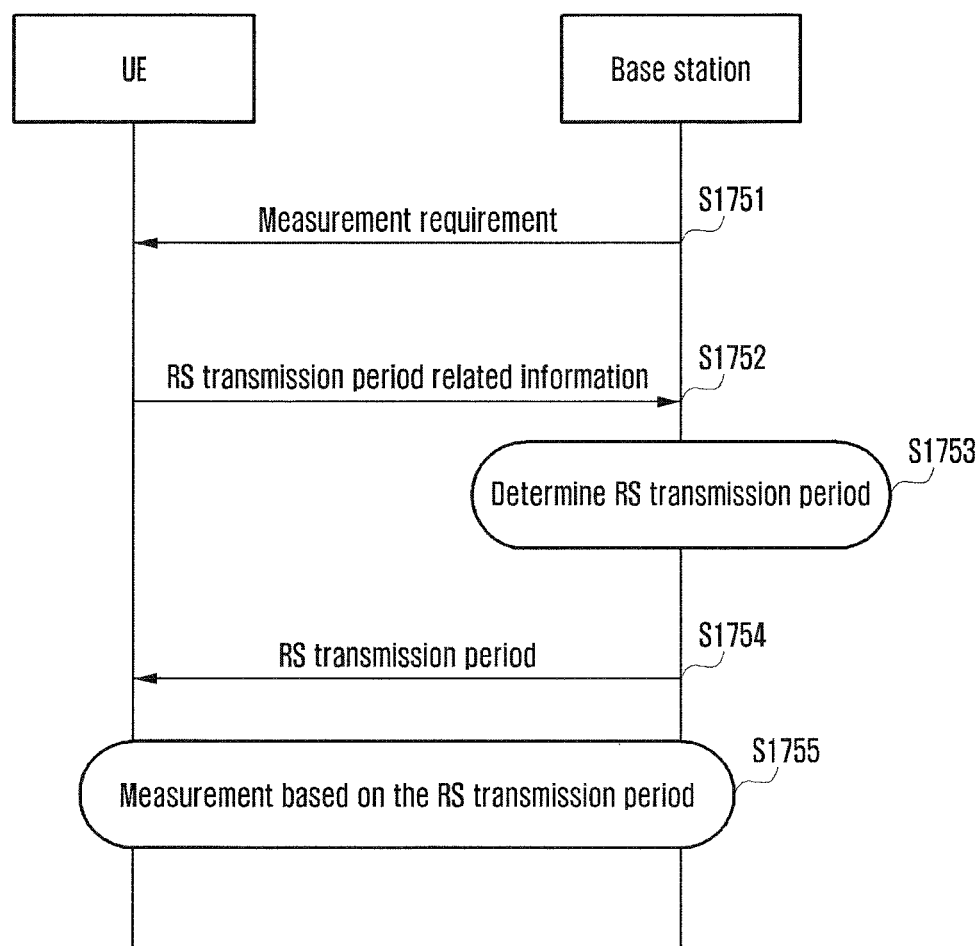

FIG. 17H is a diagram illustrating a method for determining a reference signal transmission period according to an embodiment of the present disclosure.

Referring to FIG. 17H, in operation S1751, the 5G-NB provides the information on the measurement requirement to the UE. Here, the information on the measurement requirement may include at least one of the following matters.

Information on whether to perform the L1 filtering by measuring several physical layer samples for the UE to obtain the reliable measurement result.

Information on whether to update the L1 filtering result within several seconds for the UE to obtain the reliable measurement result.

Information on whether to update the L3 filtering result within several seconds for the UE to obtain the reliable measurement result.

Information on whether to complete the full beam sweeping within several seconds for the UE to obtain the reliable measurement result.

The above information may be provided to the UE by the 5G-NB and may be determined in advance.

In operation S1752, the UE provides the information required to determine the reference signal transmission period to the 5G-NB. In the present drawing, this may be called reference signal transmission period related information. Here, the information provided to the 5G-NB by the UE may include any one of the following matters.

The number of the UE'S beams

Sweeping period information on UE's beam

If the information described in operation S1751 is not the information provided to the UE by the 5G-NB but is defined in the standard in advance, the UE may notify the 5G-NB of the measurement requirement information specified in the standard.

Average handover failure probability or a radio link failure (RLF) generation frequency experienced within a certain time in the past from the present time Further, in operation S1753, the 5G-NB may determine the reference signal transmission period. The 5G-NB may determine the reference signal transmission period based on the information provided to the UE in operation S1751, the information provided from the UE in operation S1752, the number of 5G-NB's beams, or the like.

For example, the 5G-NB may determine the reference signal transmission period so that the full beam sweeping period is equal to or less than the threshold.

As another example, if the average handover failure probability of the UE is increased, the 5G-NB may make the reference signal transmission period short. The content thereof will be described with reference to FIG. 17I.

Figure 17I:
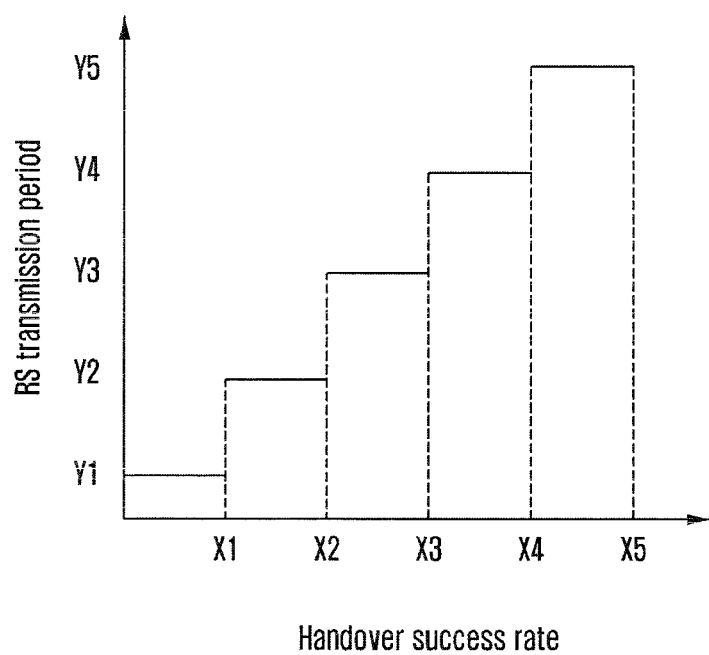

FIG. 17I is a diagram illustrating a method for determining, by a 5G-NB, a reference signal transmission period of the UE according to an embodiment of the present disclosure.

FIG. 17I illustrates an example of showing the relationship between the average handover failure probability experienced by the UE and the reference signal transmission period transmitted by the 5G-NB. For example, the 5G-NB may set the reference signal transmission period to be short as the handover failure probability of the UE is increased.

Returning to the description of FIG. 17H, as an embodiment of the present disclosure, the 5G-NB may make the reference signal transmission period short when the RLF generation frequency of the UE is increased.

Further, in operation S1754, the 5G-NB may notify the UE of the reference signal transmission period.

In operation S1755, the 5G-NB may transmit the reference signal depending on the reference signal transmission period and in operation S1756, the UE receives and measures the reference signal depending on the corresponding period and then performs the RRM measurement procedure.

The information provided to the UE by the 5G-NB in operations S1751 and S1754 may also be transmitted through UE-dedicated signaling transmitted by a unicast scheme per UE and may also be transmitted through broadcast signaling commonly transmitted to all the UEs within the cell.

Meanwhile, in the mobile communication system based on beamforming, to perform the mobility management, such as a handover, the 5G-NB's beams used by the UE may be different to transmit and receive the 5G-NB's beams measured by the UE and data. For example, the mobility management is performed by measuring, by the UE, the BRS but the transmission and reception of data may be performed by measuring a beam transmitting the BRS or a beam transmitting a beam refinement reference signal (BRRS). The content will be described below.

Figure 18:
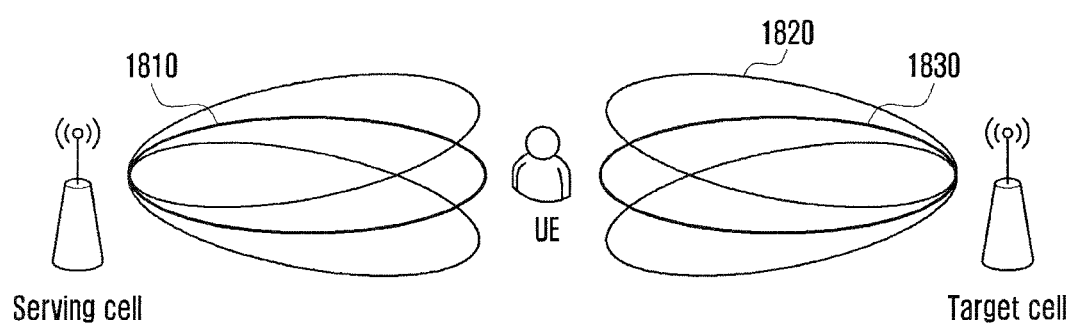
FIG. 18 is a diagram for describing a handover of a UE to a target cell according to an embodiment of the present disclosure.

FIG. 18 is a diagram for describing a handover of the UE to a target cell according to an embodiment of the present disclosure.

The BRRS is to address the issue of excessive resource consumption occurring when it periodically transmits the BRS. More specifically, when the 5G-NB periodically transmits the BRS, there is a problem in that a lot of resources are consumed. Therefore, the 5G-NB may periodically transmit some of the BRSs and when the UE selects one of the BRSs, the 5G-NB may transmit the BRRS based on the BRS. At this time, the 5G-NB may transmit the BRRS according to the request of the UE. Therefore, the UE may measure the BRS and the BRRS selected by the UE and select a beam transmitting a reference signal having better signal strength.

Referring to FIG. 18, the UE transmits and receives data through a beam (hereinafter, BRRS beam) 1810 transmitting BRRS of a currently serving cell.

Further, the UE may continuously measure the beam transmitting the BRS for the mobility management including the handover.

At this time, the UE may measure the BRS received from the target 5G-NB and may be handed over to the target cell when the value measuring the BRS received from the target 5G-NB is larger than the value measuring the BRS received from the serving 5G-NB.

Further, the UE is handed over to the target cell and then may measure a BRRS beam 1830 of the target cell depending on the scheduling of the 5G-NB and transmit the measured BRRS beam to the 5G-NB. Therefore, the 5G-NB may compare the measurement result of the BRSS beam 1830 of the target cell with a BRS beam 1820 of the target cell and when the measurement result of the BRRS beam 1830 is better than the measurement result of the BRS beam 1820, may transmit and receive data using the BRRS beam.

Therefore, to transmit and receive the 5G-NB's beam measured by the UE for handover and the data, the 5G-NB's beam used by the UE may be changed.

However, in the case of using the BRRS beam, a delay may occur and the content thereof will be described with reference to FIG. 19.

Figure 19:
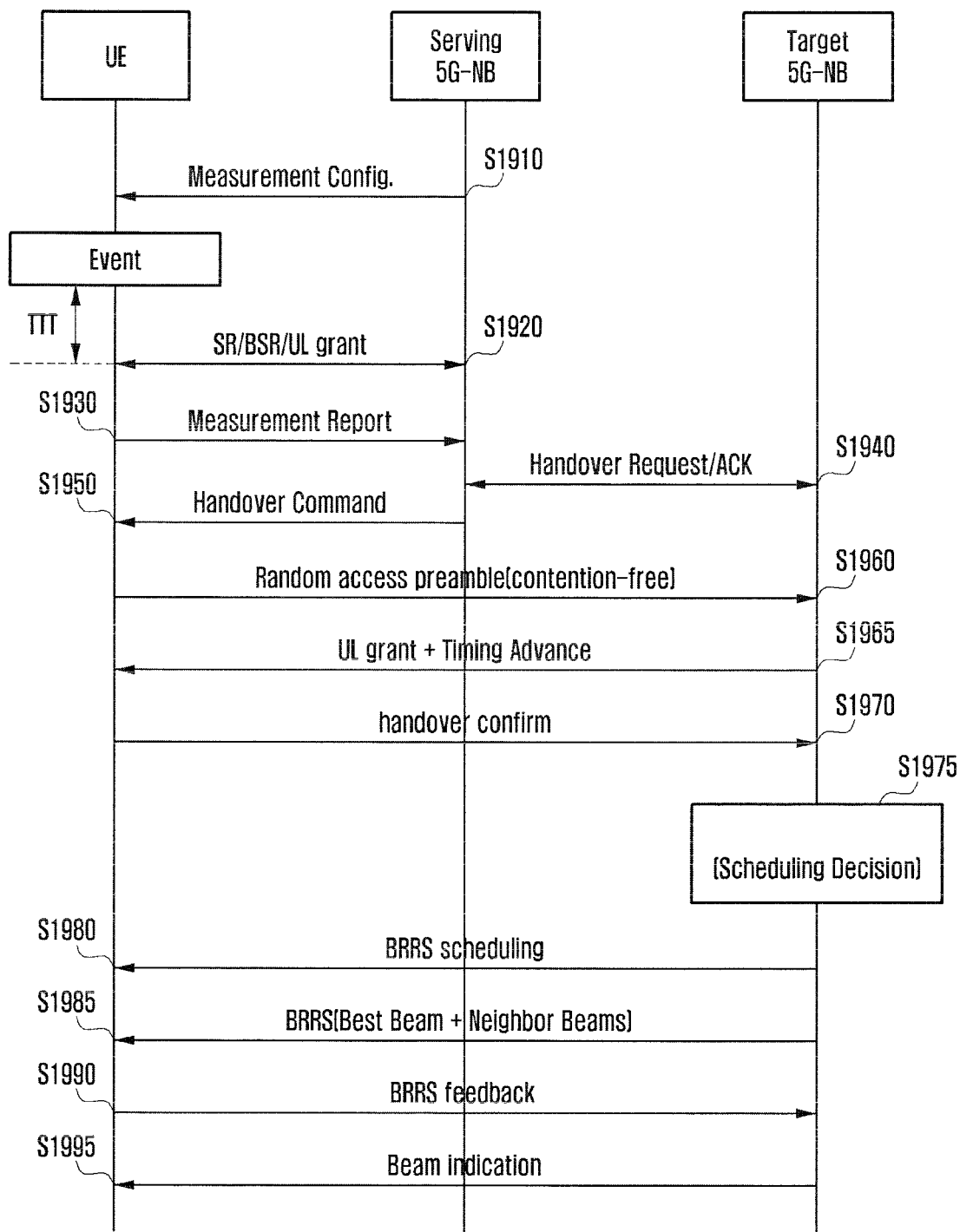
FIG. 19 is a diagram illustrating a process of performing handover using BRS according to an embodiment of the present disclosure.

FIG. 19 is a diagram illustrating a process of performing handover using BRS according to an embodiment of the present disclosure.

The UE transmits and receive data through the beam transmitting the BRRS of the currently serving 5G-NB.

Further, the UE may continuously measure the beam transmitting the BRS for the mobility management including the handover.

At this time, the beam transmitting the BRRS may be more excellent than the beam transmitting the BRS in terms of the RSRP or the RSRQ or the SINR in the viewpoint of the UE. However, when the UE is first connected to the 5G-NB to use the BRRS, the delay is required. The reason is that the 5G-NB always transmits the BRS, but the BRRS is not always transmitted but is transmitted only in the case in which the 5G-NB performs the scheduling. Therefore, the UE has the BRS measurement results even before connected to the 5G-NB but does not have the BRRS measurement results, such that the UE may not use the BRRS beam before the BRRS scheduling.

Referring to FIG. 19, in operation S1910, the UE may receive the measurement configuration information. Therefore, the UE may perform the measurement based on the measurement configuration information received from the 5G-NB.

When the measurement reporting event is generated and is maintained for a certain time TTT, in operation S1920, the UE may request a scheduling request (SR), a buffer status report (BSR), an uplink grant, or the like to the 5G-NB.

Further, in operation S1930, the UE may report the measurement result. If it is determined that a handover condition (RSRPtarget>RSRPserving+delta) is satisfied as the result of measuring the BRS by the UE, the UE may perform the measurement reporting to its own serving 5G-NB and the serving 5G-NB may perform the handover through the information exchange with the target 5G-NB.

For this purpose, in operation S1940, the serving 5G-NB may transmit a handover request message and receive a handover request ACK message from the target 5G-NB.

Further, in operation S1950, the serving 5G-NB may transmit a handover command message to the UE. The serving 5G-NB may provide the UE with the information required for the UE to perform the handover through the handover command message.

Therefore, in operation S1960, the UE may use the information included in the handover command message to be connected to the target 5G-NB to transmit a random access preamble.

The target 5G-NB receives the random access preamble, and then in operation S1965, the UE allocate an uplink grant required to transmit a handover confirm message to the UE and may transmit timing advance (TA) to the UE.

Further, if the handover is completed, in operation S1970, the UE may transmit the handover confirm message to the target UE.

Meanwhile, the UE is handed over to the 5G-NB and then may transmit and transmit data through the beam transmitting the BRS of the 5G-NB at first.

Here, the BRS beam first allocated from the target 5G-NB and used by the UE may have better performance or poorer performance than the BRRS beam used in the serving 5G-NB.

In operation 1975, the target 5G-NB may decide to schedule the UE. At this time, the target 5G-NB may determine whether to perform the BRRS scheduling on the UE.

If the 5G-NB provides the BRRS scheduling to the UE, the UE may measure the BRRS that the 5G-NB transmits and may report the measured result to the 5G-NB.

More specifically, the 5G-NB may schedule the BRRS for the UE in operation S1980 and transmit the BRRS to the UE in operation S1985.

As a result, the UE may measure the BRRS in operation S1990 and feedback the measured result to the 5G-NB.

The 5G-NB receives the BRRS measurement result from the UE and allocates the corresponding beam to the UE if there is a better BRRS beam than a beam that is being used by the current UE. Further, in operation 1995, the 5G-NB may transmit an indicator indicating a beam allocated to the UE to the UE.

At this time, as described above, the handover to the target 5G-NB is performed and then the data are transmitted and received through the beam transmitting the BRS of the 5G-NB, and therefore after the handover is performed, the UE performance may be reduced for a certain time. The reason is that the BRS beam of the target 5G-NB is better than the BRS beam of the serving 5G-NB and therefore the handover is triggered but the BRS beam of the target 5G-NB may not be poorer than the BRRS beam of the serving 5G-NB used by the UE just before the handover. Therefore, an embodiment of the present disclosure proposes a method for allowing UE to have BRRS serviced from a target 5G-NB as fast as possible at the time of handover. The content will be described with reference to FIG. 20.

Figure 20:
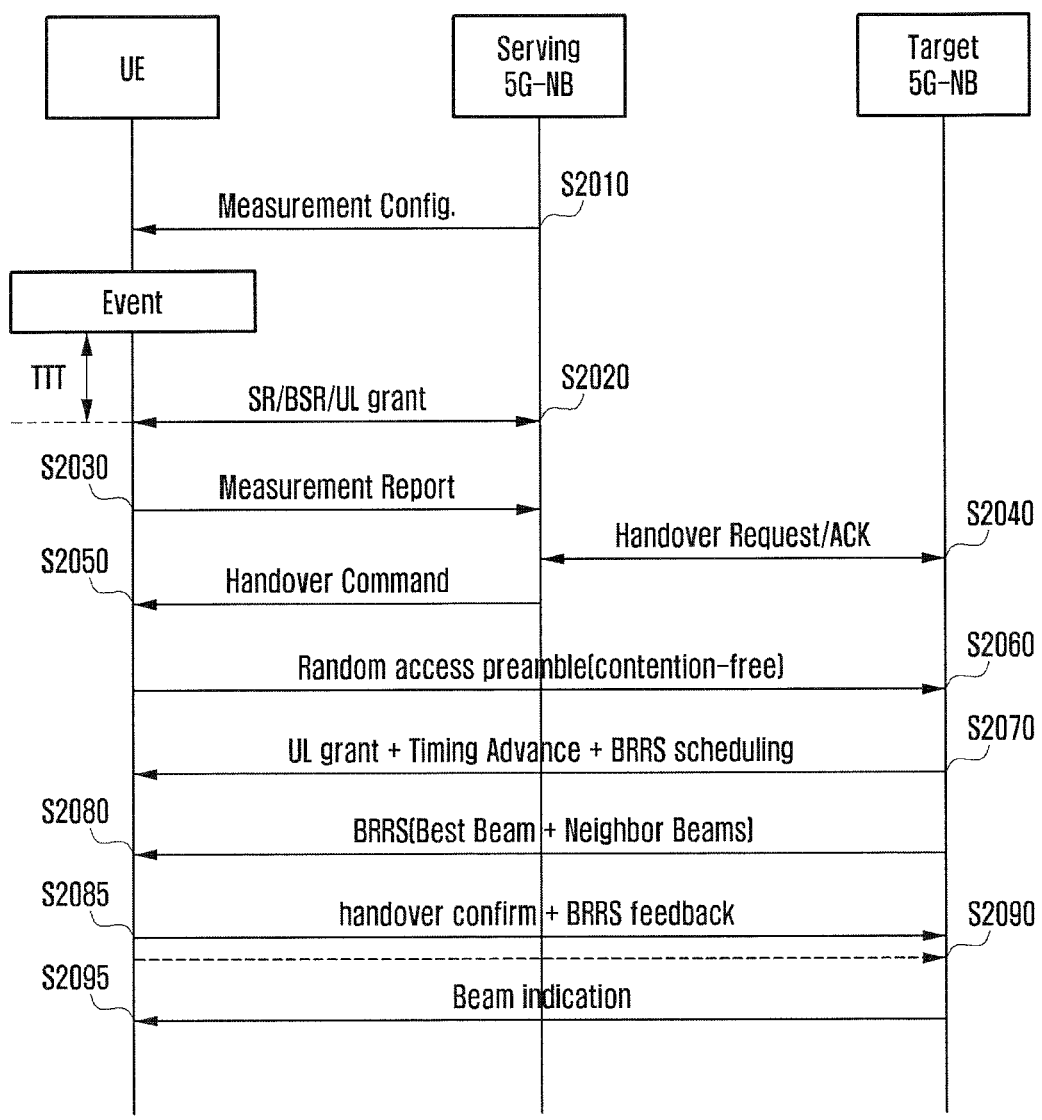
FIG. 20 is a diagram illustrating a method for scheduling BRS according to an embodiment of the present disclosure.

FIG. 20 is a diagram illustrating a method for scheduling BRS according to an embodiment of the present disclosure.

Referring to FIG. 20, if it is determined that the handover condition is satisfied as the result of measuring the BRS by the UE, the UE performs the measurement reporting on the serving 5G-NB and the serving 5G-NB performs the handover procedure through the information exchange with the target 5G-NB.

Further, the serving 5G-NB may provide the UE with the information required for the UE to perform the handover through the handover command message.

Therefore, the UE may use the information included in the handover command message to transmit the random access preamble to the target 5G-NB.

At this time, operations S2010 to S2060 of FIG. 20 are the same as the operations S1910 to S1960 of FIG. 19, and therefore the content thereof will be omitted.

The target 5G-NB receives the random access preamble from the UE and then in operation S2070, the UE may allocate a UL resource required to transmit the handover confirm message and transmit UL timing advance information. Further, in an embodiment of the present disclosure, it is possible to schedule the BRRS for the UE together with the information. At this time, the target 5G-NB may schedule the BRRS for the UE through a random access response.

Here, the BRRS scheduling information may include the following information.

BRRS transmission timing

The BRRS transmission timing may be transmitted in a subframe index, an offset from the current timing, or the like.

BRRS transmission time/frequency resource location

The number of BRRS transmission antenna ports

Resource information used at the time of feeding back the measurement result after the reception of the BRRS Further, the target 5G-NB may transmit the BRRS in operation S2080. The target 5G-NB may transmit the BRRS according to the scheduling information provided to the UE.

In operation S2085, the UE transmits the handover confirm message to the target 5G-NB.

If the BRRS measurement result feedback is ready at the transmission timing of the handover confirm message, the UE may transmit the corresponding feedback by including it in the handover confirm message or a MAC header.

If the BRRS measurement result feedback is not ready at the feedback message transmission timing, in operation S2090, the UE may separately transmit the corresponding feedback at notification timing of the 5G-NB.

The 5G-NB is reported the BRRS measurement result from the UE and thus may allocate an appropriate BRRS beam to the UE. Further, in operation 2095, the 5G-NB may transmit an indicator indicating a beam allocated to the UE to the UE.

Therefore, according to the operation of an embodiment of the present disclosure, the UE is handed over and then may be quickly allocated the BRRS beam from the target 5G-NB. By the method, the reduction in the UE performance after the handover may be avoided.

Figure 21:
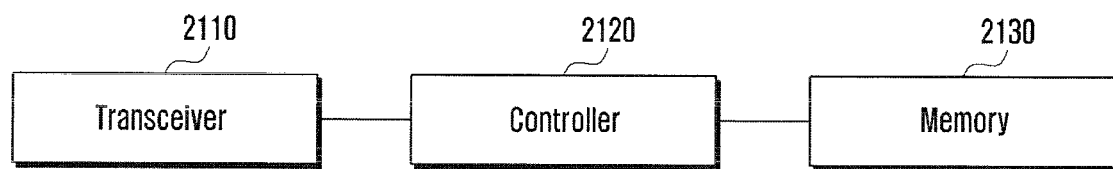
FIG. 21 is a diagram illustrating a configuration of a UE according to an embodiment of the present disclosure.

FIG. 21 is a diagram illustrating a configuration of a UE according to an embodiment of the present disclosure.

Referring to FIG. 21, the UE may be configured to include a transceiver 2110, a controller 2120, and a memory 2130. For example, when defining a controller in the specification, it may be stated that "the controller may be a circuit, an application-specific integrated circuit or at least one processor."

The transceiver 2110 may transceive a signal to and from another network entity. The transceiver 2110 may receive the measurement configuration information from the 5G-NB and transmit the generated cell measurement information to the 5G-NB.

The controller 2120 may transmit the UE capability to the 5G-NB. The controller 2120 may notify the 5G-NB of the number of the UE's beams based on the UE capability. Further, the UE capability may include the number of the UE's beams, beam overlapping related information indicating whether adjacent beams overlap in X dB, the beam sweeping information indicating whether to perform the beam sweeping for the BRS measurement, or the like.

The controller 2120 may receive the measurement configuration information from the 5G-NB. Further, the controller 2120 may receive the BRS based on the measurement configuration information. At this time, the controller 2102 may receive the BRSs per the beam pair consisting of the 5G-NB's beam and the UE's beam.

Further, the controller 2120 may measure the channel status based on the BRS. The controller 2120 may measure the channel statuses per beam pair to generate the beam measurement information. At this point, the beam measurement information may include the signal strength of the BRS, the signal quality of the BRS, or the like.

Further, the controller 2120 may generate the cell measurement information. The controller 2120 may filter the generated beam measurement information and may use a method for performing a mean, a sum, a weighted sum, a weighted mean, or the like on all or some of beam measurement information generated per a plurality of beam pairs to generate cell measurement information.

Further, the controller 2120 may use a method for performing the mean, the sum, the weighted sum, the weighted mean, or the like on all or some of a plurality of beam measurement information generated per beam pair to generate measurement information on a transmit beam level or measurement information on a receive beam level.

At this time, the process of generating the cell measurement information and the process of generating the measurement information on the transmit beam level or the measurement information on the receive beam level may be performed before and after the layer 1 filtering and before and after the layer 3 filtering and the content thereof is the same as above.

The controller 2120 may determine whether to satisfy the reporting condition and if the reporting condition is satisfied, may report the generated cell measurement information to the 5G-NB. Therefore, the 5G-NB may use the beam measurement information to determine whether to perform the operations of the handover, the cell addition, the cell change, or the like using the beam measurement information.

Further, according to an embodiment of the present disclosure, if the handover condition is satisfied as a result of measuring the BRS, the controller 2120 may perform the measurement reporting to the 5G-NB and perform the handover procedure. Therefore, the controller 2120 may receive the information required to perform the handover through the handover command message and may use the information included in the handover command message to transmit the random access preamble.

Further, the controller 2120 may be allocated the UL resource from the 5G-NB and may receive the UL timing advance information. Further, the controller 2120 may receive the BRRS scheduling information together with the information.

Further, the controller 2120 may receive the BRRS. The controller 2120 may transmit the BRRS according to the scheduling information.

The controller 2120 transmits the handover confirm message to the target 5G-NB. If the BRRS measurement result feedback is ready at the transmission timing of the handover confirm message, the controller 2120 may transmit the corresponding feedback by including it in the handover confirm message or a MAC header.

If the BRRS measurement result feedback is not ready at the feedback message transmission timing, the controller 2120 may separately transmit the corresponding feedback at notification timing of the 5G-NB.

Therefore, the controller 2120 may be allocated an appropriate BRRS beam and may receive an indicator indicating the allocated beam.

Further, the controller 2120 may control the operation of the UE proposed in an embodiment of the present disclosure.

The memory 2130 may store the information generated or transmitted and received according to the operation of the UE. The memory 2130 may store the measurement configuration information received from the 5G-NB and store the measured result based on the measurement configuration information. Further, the memory 2130 may also store the results of each operation block.

Figure 22:
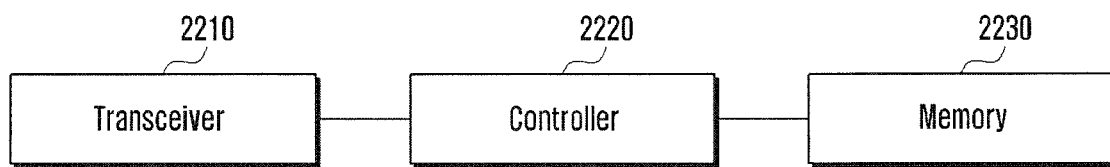
FIG. 22 is a block diagram illustrating a configuration of a 5G-NB according to an embodiment of the present disclosure.

FIG. 22 is a block diagram illustrating a configuration of a 5G-NB according to an embodiment of the present disclosure.

Referring to FIG. 22, the 5G-NB may be configured to include a transceiver 2210, a controller 2220, and a memory 2230.

The transceiver 2210 may transceive a signal to and from another network entity. The transceiver 2210 may transmit the measurement configuration information to the UE and receive the generated cell measurement information from the UE.

The controller 2220 may receive the UE capability. The controller 2220 may confirm the number of the UE's beams based on the UE capability. Further, the UE capability may include the number of the UE's beams, beam overlapping related information indicating whether adjacent beams overlap in X dB, the beam sweeping information indicating whether to perform the beam sweeping for the BRS measurement, or the like.

The controller 2220 may transmit the measurement configuration information to the UE. Further, the controller 2220 may transmit the BRS based on the measurement configuration information. At this time, the UE may receive the BRSs per the beam pair consisting of the 5G-NB's beam and the UE's beam.

The controller 2220 may receive the cell measurement information generated by the UE. Therefore, the controller 2220 may use the beam measurement information to determine whether to perform the operations of the handover, the cell addition, the cell change, or the like using the beam measurement information.

Further, according to an embodiment of the present disclosure, if the handover condition is satisfied as a result of measuring the BRS, the controller 2220 may receive the measurement reporting and perform the handover procedure. Therefore, the controller 2220 may transmit the information required to perform the handover through the handover command message and may use the information included in the handover command message to transmit the random access preamble transmitted from the UE.

Further, the controller 2220 may allocate the UL resource required for the UE to transmit the handover confirm message and provide the UL timing advance information. Further, the controller 2220 may schedule the BRRS for the UE information together with the information.

Further, the controller 2220 may transmit the BRRS. The controller 2220 may transmit the BRRS according to the scheduling information provided to the UE.

The controller 2220 may receive the handover confirm message from the UE. If the BRRS measurement result feedback is ready at the handover confirm message transmission timing, the controller 2220 may receive the handover confirm message including the corresponding feedback.

If the BRRS measurement result feedback is not ready at the feedback message transmission timing, the controller 2220 may separately receive the corresponding feedback.

Therefore, the controller 2220 may be allocated an appropriate BRRS beam and may receive an indicator indicating the beam allocated to the UE.

Further, the controller 2120 may control the operation of the 5G-NB proposed in an embodiment of the present disclosure.

The memory 2230 may store the information generated or transmitted and received according to the operation of the 5G-NB. The memory 2230 may store the measurement configuration information to be transmitted to the UE and store the cell measurement information received from the UE.

According to the present disclosure, it is possible for the 5G-NB to effectively control the mobility management of the UE by providing the method for generating, by a UE, cell measurement information using a plurality of beam measurement information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a user equipment (UE) in a communication system, the method comprising:
   receiving, from a base station, measurement configuration information including a maximum number of beam measurement results;
   obtaining, based on the measurement configuration information, beam measurement results by measuring at least one beam associated with a cell;
   obtaining a cell measurement result as an average of highest beam measurement results above a threshold based on a total number of averaged beam measurement results that does not exceed the maximum number of beam measurement results; and
   transmitting, to the base station, a measurement report based on the cell measurement result.

2. The method of claim 1, wherein the threshold is included in the measurement configuration information.

3. The method of claim 1,
   wherein the cell measurement result is filtered based on a previous filtered beam measurement result, and
   wherein the measurement configuration information includes a filtering coefficient that is used to filter the cell measurement result.

4. The method of claim 1, wherein the transmitting of the measurement report further comprises:
   transmitting, to the base station, the measurement report in case that a reporting condition is satisfied.

5. The method of claim 1, wherein the cell measurement result is used to determine cell level mobility.

6. A method performed by a base station in a communication system, the method comprising:
transmitting, to a user equipment (UE), measurement configuration information including a maximum number of beam measurement results; and
receiving, from the UE, a measurement report based on a cell measurement result, the cell measurement result being determined as an average of highest beam measurement results above a threshold associated with a cell based on a total number of averaged beam measurement results that does not exceed the maximum number of beam measurement results.

7. The method of claim 6, wherein the threshold is included in the measurement configuration information.

8. The method of claim 6,
wherein the cell measurement result is filtered based on a previous filtered beam measurement result, and
wherein the measurement configuration information includes a filtering coefficient that is used to filter the cell measurement result.

9. The method of claim 6, wherein receiving the measurement report further comprising receiving, from the UE, the measurement report in case that a reporting condition is satisfied.

10. The method of claim 6, wherein the cell measurement result is used to determine cell level mobility.

11. A user equipment (UE) in a communication system, the UE comprising:
a transceiver; and
a controller coupled with the transceiver and configured to:
receive, from a base station, measurement configuration information including a maximum number of beam measurement results,
obtain, based on the measurement configuration information, beam measurement results by measuring at least one beam associated with a cell,
obtain a cell measurement result as an average of highest beam measurement results above a threshold based on a total number of averaged beam measurement results that does not exceed the maximum number of beam measurement results, and
transmit, to the base station, a measurement report based on the cell measurement result.

12. The UE of claim 11, wherein the threshold is included in the measurement configuration information.

13. The UE of claim 11,
wherein the cell measurement result is filtered based on a previous filtered beam measurement result, and
wherein the measurement configuration information includes a filtering coefficient that is used to filter the cell measurement result.

14. The UE of claim 11, wherein the controller is configured to transmit, to the base station, the measurement report in case that a reporting condition is satisfied.

15. The UE of claim 11, wherein the cell measurement result is used to determine cell level mobility.

16. A base station in a communication system, the base station comprising:
a transceiver; and
a controller coupled with the transceiver and configured to:
transmit, to a user equipment (UE), measurement configuration information including a maximum number of beam measurement results, and
receive, from the UE, a measurement report based on a cell measurement result, the cell measurement result being determined as an average of highest beam measurement results above a threshold associated with a cell based on a total number of averaged beam measurement results that does not exceed the maximum number of beam measurement results.

17. The base station of claim 16, wherein the threshold is included in the measurement configuration information.

18. The base station of claim 16,
wherein the cell measurement result is filtered based on a previous filtered beam measurement result, and
wherein the measurement configuration information includes a filtering coefficient that is used to filter the cell measurement result.

19. The base station of claim 16, wherein the controller is configured to receive, from the UE, the measurement report in case that a reporting condition is satisfied.

20. The base station of claim 16, wherein the cell measurement result is used to determine cell level mobility.

* * * * *